United States Patent [19]
Dunkelmann et al.

[11] 3,856,772
[45] Dec. 24, 1974

[54] AZO DYES OF THE DIAMINO PYRIMIDINE SERIES

[75] Inventors: Guenter Dunkelmann; Johannes Dehnert, both of Ludwigshafen, both of Germany

[73] Assignee: Badische Anilin- & Soda-Fabrik Aktiengesellschaft, Ludwigshafen/Rhine, Germany

[22] Filed: Jan. 19, 1973

[21] Appl. No.: 325,216

[52] U.S. Cl.................. 260/154, 260/196, 260/205, 260/206, 260/207.1, 260/247.2 A, 260/247.2 B, 260/247.5 D, 260/256.4 N, 260/692
[51] Int. Cl........................ C09b 29/36, C09b 31/14
[58] Field of Search..................................... 260/154

[56] References Cited
UNITED STATES PATENTS

| | | |
|---|---|---|
| 3,531,456 | 9/1970 | Ackermann et al. ............... 260/154 |
| 3,531,457 | 9/1970 | Ackermann et al. ............... 260/154 |
| 3,531,458 | 9/1970 | Ackermann et al. ............... 260/154 |
| 3,532,682 | 10/1970 | Ackermann et al. ............... 260/154 |

Primary Examiner—Lorraine A. Weinberger
Assistant Examiner—C. F. Warren
Attorney, Agent, or Firm—Johnston, Keil, Thompson & Shurtleff

[57] ABSTRACT

Azo dyes of the diaminopyrimidine series which may be exemplified by the formula

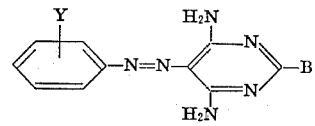

or

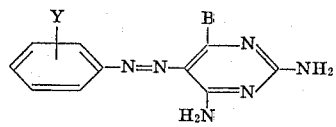

are useful as disperse dyes for synthetic fibers, particularly polyesters. The dyes give yellow to blue violet shades having excellent fastness properties.

10 Claims, No Drawings

AZO DYES OF THE DIAMINO PYRIMIDINE SERIES

The invention relates to dyes of the formula (I):

$$D—N=N—A \quad (I)$$

in which D is the radical of a diazotizable aniline bearing at least one electron-attracting substituent or the radical of a diazotizable aminonaphthalene, aminodiphenyl, aminoazobenzene, aminoanthraquinone or heterocyclic amine; A is a radical of the formula:

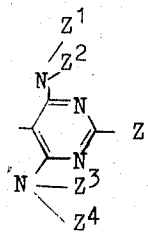 or 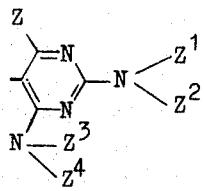

Z is hydrogen or an unsubstituted or substituted aliphatic, cycloaliphatic, araliphatic, aromatic or heterocyclic radical;

$Z^1$ is hydrogen or an unsubstituted or substituted aliphatic, cycloaliphatic, araliphatic or aromatic radical;

$Z^2$ is hydrogen or an unsubstituted or substituted aliphatic radical or $Z^1$ and $Z^2$ together with the nitrogen are a heterocyclic radical, and in which, independently of each other, $Z^3$ has the same meanings as $Z^1$, $Z^4$ has the same meanings as $Z^2$, $Z^3$ and $Z^4$ together with the nitrogen have the same meanings as $Z^1$ and $Z^2$ together with the nitrogen have, and one of the radicals $Z^1$ to $Z^4$ is other than hydrogen The invention relates particularly to dyes of the formula (Ia):

$$D^1—N=N—A^1 \quad (Ia)$$

in which $D^1$ is the radical of a diazo component (bearing an electron-attracting substituent) of the benzene series or a diazo component of the naphthalene, diphenyl, benzothiazole, benzoisothiazole, thiazole, thiadiazole, thiophene, triazole, benzotriazole, indazole, pyrazole, azobenzene or anthraquinone series;

$A^1$ is a radical of the formula

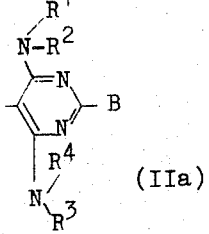 (IIa) or 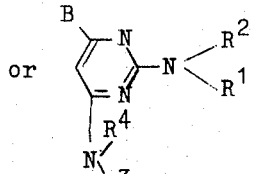 (IIb)

B is hydrogen, alkyl, alkenyl, alkyl bearing cyano, hydroxy, alkoxy, alkanoyloxy or phenoxy as a substituent, aralkyl, cycloalkyl, phenyl or phenyl bearing alkyl, halogen, alkoxy, nitro, cyano, alkoxycarbonyl, carbamoyl or sulfamido as a substituent;

$R^1$ is hydrogen, alkyl of one to eight carbon atoms, cyanoalkyl of two to seven carbon atoms, hydroxyalkyl of two to nine carbon atoms, alkoxyalkyl of a total of three to 13 carbon atoms, cycloalkoxyalkyl, aralkoxyalkyl of up to 15 carbon atoms, phenoxyalkyl of a total of up to 12 carbon atoms, carbalkoxyalkyl of a total of three to 15 atoms, acyloxyalkyl of a total of up to 17 carbon atoms, phenyl, phenyl bearing hydroxy, chlorine, methyl, ethyl, β-hydroxyethyl, methoxy, ethoxy, β-hydroxyethoxy, cyano or dialkylamino as a substituent, cycloalkyl, bicycloalkyl, polycycloalkyl, unsubstituted or substituted aralkyl, or ω-N-pyrrolidonylalkyl of two to six carbon atoms in the alkyl;

$R^2$ is hydrogen, alkyl of one to eight carbon atoms, aralkyl, hydroxyalkyl of two to seven carbon atoms, or acyloxyalkyl of a total of up to 15 carbon atoms, and $R^1$ and $R^2$ together with the nitrogen may be the radical of pyrrolidine, piperidine, morpholine, piperazine, N-methylpiperazine or N-β-hydroxyethylpiperazine and the alkyl chains of the substituted alkyl radicals $R^1$ and $R^2$ may be interrupted by oxygen atoms and, independently of one another, $R^4$ has the same meanings as $R^2$, $R^3$ has the same meanings as $R^1$, and $R^4$ and $R^3$ together have the same meanings as $R^2$ and $R^1$ together, but one of the radicals $R^1$, $R^2$, $R^3$ and $R^4$ is other than hydrogen.

The following are examples of substituents for the radical D of the diazo components:

in the benzene series:

chlorine, bromine, nitro, cyano, trifluoromethyl, acetyl, propionyl, benzoyl, nitrobenzoyl, methylsulfonyl, ethylsulfonyl, phenylsulfonyl, p-(β-hydroxyethyl)-phenylsulfonyl, carbomethoxy, carboethoxy, carbobutoxy, carbo-β-methoxyethoxy, carbo-β-ethylhexoxy, carbo-β-hydroxyethoxy, unsubstituted, N-monosubstituted or N-disubstituted carbamoyl or sulfamido, methyl, ethyl, methoxy and ethoxy.

Examples of N-substituents of the carbamoyl or sulfonamido radicals are methyl, ethyl, propyl, butyl, β-ethylhexyl, cyclohexyl, benzyl, phenylethyl, β-hydroxyethyl, β-hydroxypropyl, β-methoxyethyl, γ-methoxypropyl and γ-ethoxypropyl and also pyrrolidide, piperidide and morpholide.

Electron-attracting substituents of which at least one is present in the diazo component of the benzene series include, for the purposes of this invention, nitro, cyano, alkanoyl, aroyl, alkylsulfonyl, phenylsulfonyl, carbalkoxy and unsubstituted or substituted carbamoyl or sulfamoyl and also sulfonic ester groups. Examples of substituents in addition to those already mentioned are: acetyl, propionyl, benzoyl, chlorobenzoyl, nitrobenzoyl, methylsulfonyl, ethylsulfonyl, carbomethoxy, -ethoxy, -β-methoxyethoxy, -butoxy, and -β-ethylhexoxy, N-methylcarbamoyl, N-ethyl-, N-butyl-, N-β-ethylhexyl-, N,N-dimethyl-, N,N-diethyl-, N,N-dibutyl-, N-methyl- N-β-hydroxyethyl-, N-β-hydroxyethyl- or N,N-di-β-hydroxyethylcarbamoyl, the corresponding sulfamoyl derivatives and the methyl-, ethyl- or phenylsulfonic acid esters.

In the azobenzene series:

chlorine, bromine, nitro, cyano, carbomethoxy, carboethoxy, methyl, ethyl, methoxy, ethoxy, hydroxy, acetylamino, formyl, β-hydroxyethoxy and ethoxycarbonylamino.

In the anthraquinone series:

halogen, particularly chlorine and bromine.

In the heterocyclic series:

chlorine, bromine, nitro, cyano, methyl, ethyl, phenyl, methoxy, ethoxy, methylmercapto, β-carbomethoxyethylmercapto, β-carboethoxyethylmercapto, carbomethoxy, carboethoxy, acetyl, methylsulfonyl and ethylsulfonyl.

Examples of radicals B, other than hydrogen, are:

alkyl of one to seven carbon atoms, cyanoethyl, methoxyethyl, ethoxyethyl, phenoxyethyl, benzyl, phenylethyl, cyclohexyl, phenyl, methylphenyl, chlorophenyl, methoxyphenyl, ethoxyphenyl, nitrophenyl, carbamoylphenyl and sulfamoylphenyl. The amido groups may also bear one or two substituents on the nitrogen, for example alkyl (CH₃, C₂H₅ or C₄H₉), cyclohexyl or phenyl.

Examples of individual radicals $R^1$ and $R^3$ are:

1. Unsubstituted or substituted alkyl CH₃, C₂H₅, n—C₃H₇, i—C₃H₇, n-C₄H₉, i-C₄H₉, C₆H₁₃, CH₂-CH-C₄H₉, CH₂CH₂OH, (CH₂)₃OH, CH₂CHOH,
                              |                                           |
                              C₂H₅                                        CH₃

CH-CH₂OH, (CH₂)₄OH, (CH₂)₆OH, CH-(CH₂)₃C(CH₃)₂, (CH₂)₂(CH₂)₂OH,
|                              |                  |
CH₃                            CH₃                OH (CH₂)₃O(CH₂)₄OH, (CH₂)₃OC₂H₄OH, (CH₂)₃OC₂H₄OCH₃, (CH₂)₃OC₂H₄OC₂H₅, (CH₂)₃OC₂H₄OCH(CH₃)₂, (CH₂)₃OC₂H₄OC₄H₉, (CH₂)₃OC₂H₄OCH₂C₆H₅, (CH₂)₃OC₂H₄OC₂H₄C₆H₅, (CH₂)₃OC₂H₄O-⟨H⟩, (CH₂)₃OC₂H₄OC₆H₅, (CH₂)₃OCH-CH₂-OCH₃, (CH₂)₃OCHCH₂OH, (CH₂)₃OCHCH₂OC₄H₉,
        |                    |                   |
        CH₃                  CH₃                 CH₃

(CH₂)₃OCH₂CH-OCH₃, (CH₂)₃OCHCH₂OC₂H₅,
             |              |
             CH₃            CH₃ the corresponding radicals in which the grouping:

-OC₂H₄-, -OCH₂CH- or -OCH-CH₂-
              |              |
              CH₃            CH₃ is present twice, three times or four times,

CH₂CH₂OCH₃, CH₂CH₂OC₂H₅, CH₂CH₂OC₃H₇, CH₂CH₂OC₄H₉, CH₂CH₂OC₆H₅,
(CH₂)₃OCH₃, (CH₂)₃OC₂H₅, (CH₂)₃OC₃H₇, (CH₂)₃OC₄H₉,
(CH₂)₃OCH₂CHC₄H₉, (CH₂)₃OC₆H₁₃, (CH₂)₃OC₈H₁₇, (CH₂)₃ O-⟨H⟩,
          |
          C₂H₅

(CH₂)₃OCH₂C₆H₅, (CH₂)₃OC₂H₄C₆H₅, (CH₂)₃OC₆H₅, -CHCH₂OCH₃,
                                                   |
                                                   CH₃

CHCH₂OC₄H₉, CHCH₂OC₆H₅, CHCH₂OCH₂C₆H₅, CH₂CHOCH₃, CH₂-CH-OC₂H₅,
|            |           |              |              |
CH₃          CH₃         CH₃            CH₃            CH₃

CH₂CH-OC₄H₉, CH₂CH-OC₂H₄C₆H₅, CH₂CH-OC₆H₅, CH₂-⟨H⟩-CH₂OH,
    |            |                |
    CH₃          CH₃              CH₃

(CH₂)₂CN, (CH₂)₅CN, (CH₂)₆CN and (CH₂)₇CN 2. unsubstituted or substituted cycloalkyl or polycycloalkyl radicals:

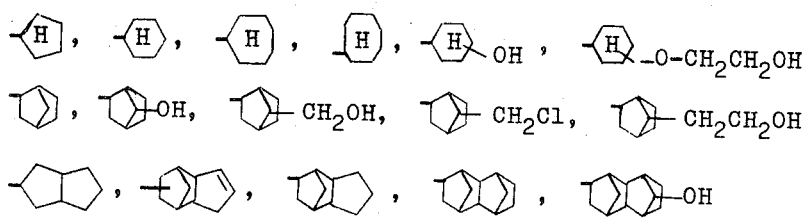
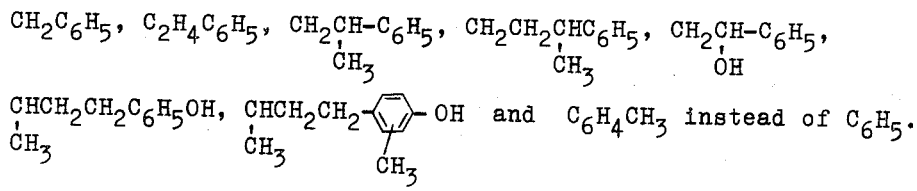

3. Aralkyl radicals:

CH₂C₆H₅, C₂H₄C₆H₅, CH₂CH-C₆H₅, CH₂CH₂CHC₆H₅, CH₂CH-C₆H₅,
                       |              |              |
                       CH₃            CH₃            OH

CHCH₂CH₂C₆H₅OH, CHCH₂-⟨⟩-OH and C₆H₄CH₃ instead of C₆H₅.
|                |        |
CH₃              CH₃      CH₃

4. unsubstituted or substituted phenyl radicals:
C₆H₅, C₆H₄CH₃, C₆H₃(CH₃)₂, C₆H₄OCH₃, C₆H₄OC₂H₅, C₆H₄OH, C₆H₄OCH₂CH₂OH and C₆H₄Cl, 5.
CH₂CH=CH₂, (CH₂)₂COOH, (CH₂)₅COOH and
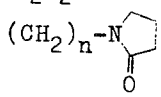

where n is 2, 3, 4 or 6.

6. carboxyalkyl and carbalkoxyalkyl radicals:
CH$_2$—COOE, CH$_2$—CH$_2$—COOE, (CH$_2$)$_5$—COOE or (CH$_2$)$_2$—O—CO—(CH$_2$)$_2$—COOE where E may be for example hydrogen, methyl, ethyl, propyl, benzyl, β-hydroxyethyl, ω-hydroxyhexyl, δ-hydroxybutyl, β-methoxyethyl, γ-methoxypropyl, γ-ethoxypropyl, β-phenoxyethyl or β-hydroxyethoxyethyl;

7. Acyloxyalkyl radicals:

CH$_2$-CH$_2$-O-acyl, (CH$_2$)$_3$-O-acyl, CH$_2$-CH-O-acyl, (CH$_2$)$_6$-O-acyl,
                                              |
                                              CH$_3$ (CH$_2$)$_2$-O-(CH$_2$)$_2$-O-acyl or (CH$_2$)$_3$-O-(CH$_2$)$_4$-O-acyl, where acyl is for example CO-H, CO-CH$_3$, CO-C$_2$H$_5$, CO-CH-(CH$_2$)$_3$-CH$_3$, CO-CH$_2$-Cl,
                                                                                    |
                                                                                    C$_2$H$_5$ CO-⟨⟩, CO-CH$_2$-CO-CH$_3$, CO-CH=CH$_2$, CO-CH=CH-⟨⟩, CO-CH=CH-COOH, CO-(CH$_2$)$_2$-COOH, CO-(CH$_2$)$_2$-COOC$_2$H$_5$, CO-CH$_2$-O-⟨⟩, CO-⟨H⟩, CO-CH$_2$-⟨⟩, COOC$_2$H$_5$, or CO-NH-⟨⟩.

Suitable radicals R$^2$ and R$^4$ may be the alkyl, hydroxyalkyl, acyloxyalkyl and aralkyl radicals specified for R$^1$ and R$^3$.

The radical D may be derived for example from the following amines:

o-nitroaniline, m-nitroaniline, p-nitroaniline, o-cyanoaniline, m-cyanoaniline, p-cyanoaniline, 2,4-dicyanoaniline, 2-chloro-4-nitroaniline, 2-bromo-4-nitroaniline, 2-cyano-4-nitroaniline, 2-methylsulfonyl-4-nitroaniline, 2-methyl-4-nitroaniline, 2-methoxy-4-nitroaniline, 4-chloro-2-nitroaniline, 4-methyl-2-nitroaniline, 4-methoxy-2-nitroaniline, 2-chloro-5-aminobenzonitrile, 2-amino-5-chlorobenzonitrile, 1-amino-2-nitrobenzene-4-sulfonic-n-butylamide or -β-methoxyethylamide, 2,4-dinitroaniline, 2,4-dinitro-6-chloroaniline, 2,4-dinitro-6-bromoaniline, 2,4-dinitro-6-cyanoaniline, 1-amino-2,4-dinitrobenzene-6-methylsulfone, 2,6-dichloro-4-nitroaniline, 2,6-dibromo-4-nitroaniline, 2-chloro-6-bromo-4-nitroaniline, 2,6-dicyano-4-nitroaniline, 2-cyano-4-nitro-6-chloroaniline, 2-cyano-4-nitro-6-bromoaniline, 1-aminobenzene-4-methylsulfone, 1-amino-2,6-dibromobenzene-4-methylsulfone, 1-amino-2,6-dichlorobenzene-4-methylsulfone, 1-amino-2,6-dinitrobenzene-6-carboxylic methyl ester, 1-amino-2,6-dinitrobenzene-6-carboxylic methyl ester, 1-amino-2,6-dinitrobenzene-6-carboxylic β-methoxyethyl ester, propyl 3,5-dichloroanthranilate, β-methoxyethyl, 3,5-dibromoanthranilate, 4-aminoacetophenone, 4-aminobenzophenone, 2-aminobenzophenone, 2-aminodiphenylsulfone, the methyl, ethyl, propyl, butyl, isobutyl, β-ethylhexyl, cyclohexyl, benzyl, phenyl, β-methoxyethyl, β-ethoxyethyl, β-butoxyethyl, methyldiglycol, ethyldiglycol, methyltriglycol, ethyltriglycol, β-hydroxyethyl, β-acetoxyethyl, β-(β'-hydroxyethoxy)-ethyl, β-hydroxypropyl, γ-hydroxypropyl, ω-hydroxybutyl, and ω-hydroxyhexyl esters of 2-aminobenzoic acid, 3-aminobenzoic acid and 4-aminobenzoic acid, the methyl, isobutyl, methyldiglycol, β-methoxyethyl, β-butoxyethyl and β-acetoxyethyl esters of 5-nitroanthranilic acid, the dimethyl, diethyl, dipropyl and dibutyl esters of 3-aminophthalic acid, 4-aminophthalic acid, 5-aminoisophthalic acid and aminoterephthalic acid, the amide, methylamide, propylamide, butylamide, isobutylamide, cyclohexylamide, β-ethylhexylamide, γ-methoxypropylamide, γ-ethoxypropylamide and anilide of 3-aminobenzoic acid and 4-aminobenzoic acid, the dimethylamide, diethylamide, pyrrolidide, morpholide and N-methyl-N-β-hydroxyethylamide of 2-aminobenzoic acid, 3-aminobenzoic acid and 4-aminobenzoic acid, the diamide or bis-γ-methoxypropylamide of 5-aminoisophthalic acid, the bis-diethylamide of aminoterephthalic acid, the imide, β-hydroxyethylimide, γ-hydroxypropylimide, phenylimide and p-tolylimide of 3-aminophthalic acid and 4-aminophthalic acid, the β-hydroxyethylimide of 3-amino-6-nitrophthalic acid, the dimethylamide, diethylamide, pyrrolidide, morpholide and N-methylanilide of 2-aminobenzenesulfonic acid, 3-aminobenzenesulfonic acid and 4-aminobenzenesulfonic acid, the 2'-aminophenyl, 3'-aminophenyl and 4'-aminophenyl esters of methylsulfonic acid, the 2'-aminophenyl, 3'-aminophenyl and 4'-aminophenyl esters of ethylsulfonic acid, the 2'-aminophenyl, 3'-aminophenyl and 4'-aminophenyl esters of butylsulfonic acid, the 2'-aminophenyl, 3'-aminophenyl and 4'-aminophenyl esters of benzenesulfonic acid, the ethylimide, butylimide, β-methoxyethylimide and γ-methoxypropylimide of 4-aminonaphthalic acid, 1-aminonaphthalene, 2-aminonaphthalene, 1-amino-2-ethoxynaphthalene, 2-aminodiphenyl, 4-aminodiphenyl, 1-aminoanthraquinone, 1-amino-4-chloroanthraquinone, 3-aminodiphenylene oxide, 4-aminodiphenylene oxide, 2-aminobenzothiazole, 2-amino-6-methylsulfonylbenzothiazole, 2-amino-6-nitrobenzothiazole, 5,6-dichloro-2-aminobenzothiazole, 6,7-dichloro-2-aminobenzothiazole, 4-amino-5-bromo-7-nitro-1,2-benzoisothiazole, 3-amino-5-nitro-2,1-benzoisothiazole, 3-amino-5-nitro-7-bromo-2,1-benzoisothiazole, 2-aminothiazole, 2-amino-5-nitrothiazole, 2-amino-4-methylthiazole, 2-amino-4-methylthiazole-5-carboxylic acid ethyl ester, 2-amino-4-methyl-5-acetylthiazole, 2-amino-3-cyano-4-methylthiophene-5-carbxylic acid esters, 2-phenyl-5-amino-1,3,4-thiadiazole, 3-methylmercapto-5-amino-1,2,4-thiadiazole, 3-β-carbomethoxyethylmercapto-5-amino-1,2,4- thiadiazole, 3-amino-1,2,4-triazole, 4-amino-7-nitrobenzotriazole, 3-aminoindazole, 3-amino-5-chloroindazole, 3-amino-5-nitroindazole, 1-benzyl-5-aminopyrazole and 1-phenyl-5-aminopyrazole.

Examples of suitable diazo components of the aminoazo series are:

4-aminoazobenzene, 2′,3-dimethyl-4-aminoazobenzene, 3′,2-dimethyl-4-aminoazobenzene, 2,5-dimethyl-4-aminoazobenzene, 2-methyl-5-methoxy-4-aminoazobenzene, 2-methyl-4′,5-dimethoxy-4-aminoazobenzene, 4′-chloro-2-methyl-5-methoxy-4-aminoazobenzene, 4′-nitro-2-methyl-5-methoxy-4-aminoazobenzene, 4′-hydroxy-2-methyl-5-methoxy-4-aminoazobenzene, 4′-(β-hydroxyethoxy)-2-methyl-5-methoxy-4-aminoazobenzene, 4′-hydroxy-2,2′-dimethyl-5-methoxy-4-aminoazobenzene, 4′-hydroxy-2,2′-dimethyl-5-methoxy-4-aminoazobenzene, 4′-hydroxy-4-aminoazobenzene, 4′-hydroxy-2′-methyl-4-aminoazobenzene, 4′-hydroxy-3′-methyl-4-aminoazobenzene, 2′-hydroxy-5′-methyl-4-aminoazobenzene, 4′-hydroxy-2-methoxy-4-aminoazobenzene, 4′-hydroxy-2′-chloro-4-aminoazobenzene, 4′-hydroxy-2,5-dimethoxy-4-aminoazobenzene, 4′-hydroxy-2,6-dichloro-4-aminoazobenzene, 4-hydroxy-3-methoxy-4-aminoazobenzene, 4′-chloro-2-methyl-4-aminoazobenzene, 4′-formyl-2-methyl-4-aminoazobenzene, 4′-(ethoxycarbonylamino)-2-methyl-4-aminoazobenzene, 2,5-dimethoxy-4-aminoazobenzene, 4′-chloro-2,5-dimethoxy-4-aminoazobenzene, 4′-nitro-2,5-dimethoxy-4-aminoazobenzene, 4′-(hydroxyethoxy)-2,5-dimethoxy-4-aminoazobenzene, 4′-chloro-2,5-dimethyl-4-aminoazobenzene, 4′-methoxy-2,5-dimethyl-4-aminoazobenzene, 4′-nitro-4-aminoazobenzene, 3,5-dibromo-4-aminoazobenzene, 2,3′-dichloro-4-aminoazobenzene, 3-methoxy-4-aminoazobenzene, 1-phenylazo-4-aminonaphthalene, and 1-phenylazo-3-ethoxy-4-aminonaphthalene.

Dyes of the formula (I) may be prepared by reacting a diazo compound of an amine of the general formula (III):

$$D-NH_2 \quad (III)$$

with a coupling component of the general formula (IV):

$$H-A \quad (IV)$$

where A and D have the meanings given above.

Diazotization of the amine may be carried out by a conventional method. Coupling may also be carried out conventionally in an aqueous medium, with or without the addition of a solvent, under weakly to strongly acid conditions.

For the production of the coupling components of formula (IV) a compound of formula (Va) or (Vb)

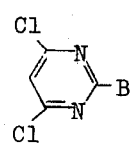
(Va)

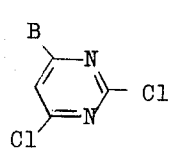
(Vb)

may be reacted with an amine of the general formula (VI)

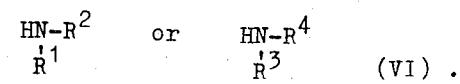
(VI).

Primary or secondary amines may be used. By suitable choice of the reaction conditions it is also possible to replace the chlorine atoms of the compound of the formula (V) in stages so that monosubstitution products or disubstitution products may be isolated. The reaction conditions which affect the exchange of the chlorine atoms are the temperature, the amine component, the molar ratio of the reactants and the diluent or solvent.

The compounds of formula (Va) are converted in the first stage of the reaction into 4-chloro-6-aminopyrimidine derivatives which can be reacted, with or without intermediate isolation, to form 4,6-diaminopyrimidines with the same or different amine radicals. Compounds of formula (Vb) give in the first reaction stage a mixture of 2-chloro-4-aminopyrimidine and 2-amino-4-chloropyrimidine derivatives in which the remaining chlorine atom may be replaced by the same or another amine. Either uniform compounds or mixtures are thus obtained.

For the synthesis of coupling components with the radical of formula (IIb) it is also possible for example to react a compound of the formula (VII)

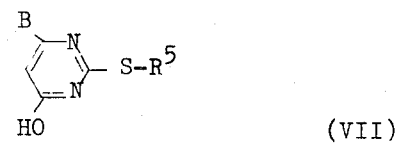
(VII)

in which $R^5$ is preferably methyl or ethyl, with a primary or secondary amine of the general formula (VI) to form a 2-aminopyrimidine derivative of the formula (VIII):

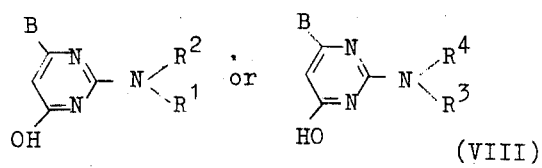
(VIII)

Compounds of formula (VIII) are also accessible from suitably substituted guanidines and β-keto esters. The hydroxyl group in the intermediate (VIII) may be replaced by conventional reagents such as phosphorus oxychloride, phosphorus trichloride, phosphorus pentachloride, thionyl chloride or phosgene by a chlorine atom which may then be replaced by a primary or secondary amine.

When compounds of formula (V) are reacted with a mixture of different amines with complete replacement of the chlorine atoms, mixtures of coupling components are obtained. The mixtures of dyes which can be prepared therefrom may, with suitable choice of the amines and their relative proportions in the mixtures, have a substantially better affinity for synthetic fibers than a single dye of the mixture.

When ammonia or a volatile amine such as methylamine or ethylamine is used as the amine component for the preparation of the coupling component of the formula (IV) it is advisable to use solutions of these amines or of ammonia in a solvent which is inert under the reaction conditions. Suitable solvents, depending on the reaction temperatures, are water, methanol, ethanol, ethylene glycol, ethylene glycol monomethyl or dimethyl ether, dimethylformamide or N-methylpyrrolidone, It is possible however to use the liquified amine under superatmospheric pressure without any solvent.

An excess of the amine or acid-bindng agents conventionally used such as tertiary amines, magnesium oxide, alcoholates or alkalies may be used to bind the hydrogen chloride liberated in the reaction.

Examples of amines of formula (VI) are:

ammonia, allylamine, methylamine, ethylamine, n-propylamine, isopropylamine, n-butylamine, isobutylamine, tert.-butylamine, isoamylamine, n-hexylamine, isohexylamine, n-octylamine, isooctylamine, β-ethylbutylamine, β-ethylhexylamine, cyclohexylamine, β-hydroxyethylamine, β-hydroxypropylamine, γ-hydroxypropylamine, ω-hydroxyhexylamine, β-methoxyethylamine, β-ethoxyethylamine, β-butoxyethylamine, γ-(β'-ethylhexoxy)-propylamine, β-(β'-hydroxyethoxy)-ethylamine, γ-(β'-phenoxyethoxy)-propylamine, γ-(β-hydroxybutoxy)-propylamine, γ-ethoxypropylamine, γ-methoxypropylamine, γ-isopropoxypropylamine, β-amino-β-ethyl-β, γ-propanediol, β-methyl-β-aminopropanol, N-methyl-N-β-hydroxyethylamine, N-ethyl-N-β-hydroxyethylamine, diethanolamine, dimethylamine, diethylamine, dipropylamine, morpholine, piperidine, pyrrolidine, thiomorpholine-S-dioxide, β-aminoethylthiomorpholine-S-dioxide, N-γ-aminopropylpyrrolidone, aniline, o-toluidine, m-toluidine, p-toluidine, o-methoxyaniline, m-methoxyaniline, p-methoxyaniline, o-chloroaniline, m-chloroaniline, p-chloroaniline, o-cyanoaniline, m-cyanoaniline, p-cyanoaniline, o-ethoxyaniline, m-ethoxyaniline, p-ethoxyaniline, o-ethylaniline, m-ethylaniline, p-ethylaniline, the methylamide or β-methoxyethylamide of p-aminobenzoic acid, 4-(β-hydroxyethyl)-aniline, 4-(β-hydroxyethoxy)-aniline, N-β-hydroxyethylaniline, N-methylaniline, benzylamine, β-phenylethylamine or β-phenyl-β-hydroxyethylamine, and also aminoacetic acid, β-aminopropionic acid, ω-aminocaproic acid and esters of the same. The amines belonging to the radicals specified in the case of $R^1$ and $R^3$ are also suitable.

When the dyes of the formula (I) according to the invention contain one or more than one ester group in the radicals $R^1$, $R^2$, $R^3$ or $R^4$ the production of the compounds of formula (I) may in principle be carried out according to the said methods if the corresponding ester group(s) is(are) contained in the coupling component. In some cases it is advantageous however to introduce the acid radical acyl into the finished dye of the formula (I). The free acids, their anhydrides, chlorides or esters are suitable for the purpose and it is advantageous to add an inert diluent or solvent such as monochlorobenzene, dichlorobenzene or trichlorobenzene, tetrahydrofuran, dioxane, dimethylformamide, N-methylpyrrolidone and pyridine.

In esterification with a free acid it may be of advantage to add an inorganic or organic catalyst, for example hydrogen chloride gas or p-toluenesulfonic acid and to allow the water formed to escape by evaporation from the reaction mixture. When acid anhydrides or acid chlorides are used for the esterification, the corresponding acids may in special cases be used as solvent.

Thus the reaction with acetic anhydride may be carried out in glacial acetic acid. When using acid chlorides as the esterifying agent it is advantageous to add acid-binding agents to the reaction mixture, for example sodium carbonate, sodium acetate, magnesium oxide or pyridine.

The following are specific examples of esterifying agents:

formic acid, acetic acid, propionic acid, α-ethylhexanoic acid, chloroacetic acid, phenylacetic acid, phenoxyacetic acid, acrylic acid, benzoic acid, and the esters, anhydrides or chlorides of these acids, and also ethyl chloroformate, diketene, methyl isocyanate and phenyl isocyanate.

What has been said about the production of dyes containing acyloxyalkyl radicals also applies to compounds of formula (I) which contain one or more than one carbalkoxyalkyl group in the radicals $R^1$, $R^2$, $R^3$ or $R^4$. Esterification of the finished dye is carried out by methods known from the literature, for example with acid catalysis in excess alcohol and distillation of the water of reaction. Examples of suitable acid catalysts are p-toluenesulfonic acid and acid ion exchangers. Examples of alcohols are methanol, ethanol, propanol, benzyl alcohol, ethylene glycol, ethylene glycol methyl or phenyl ether, diglycol, triglycol, 1,4-butanediol and 1,6-hexanediol.

Particular industrial value attaches to dyes and dye mixtures of the general formulae (Ib) and (Ic):-

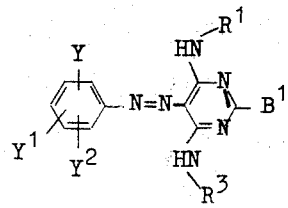

(Ib)

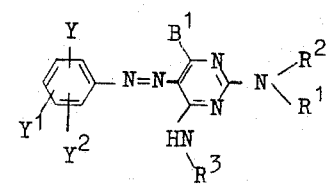

(Ic)

in which $B^1$ is hydrogen, methyl, ethyl, propyl, butyl, α-ethylpentyl, benzyl, phenyl or phenyl bearing methyl, ethyl, methoxy, ethoxy, chloro or nitro as a substituent;

Y is nitro, cyano, chloro, bromo, carbomethoxy, carboethoxy, methylsulfonyl, ethylsulfonyl, methyl, methoxy, phenylazo, p-nitrophenylazo, p-hydroxyphenylazo, p-methoxyphenylazo, p-chlorophenylazo or methylphenylazo;

$Y^1$ is hydrogen, nitro, chloro, bromo, cyano, methyl, methoxy, carbomethoxy, carboethoxy, methylsulfonyl or ethylsulfonyl;

$Y^2$ is hydrogen, chloro, bromo, cyano, methyl, methoxy, carbomethoxy or carboethoxy; and R¹, R² and R³ have the meanings given above.

Particularly preferred radicals B¹ are hydrogen, methyl, ethyl, n-propyl, isopropyl, n-butyl, isobutyl, benzyl or phenyl.

Examples of preferred radicals R¹ to R⁴ are:

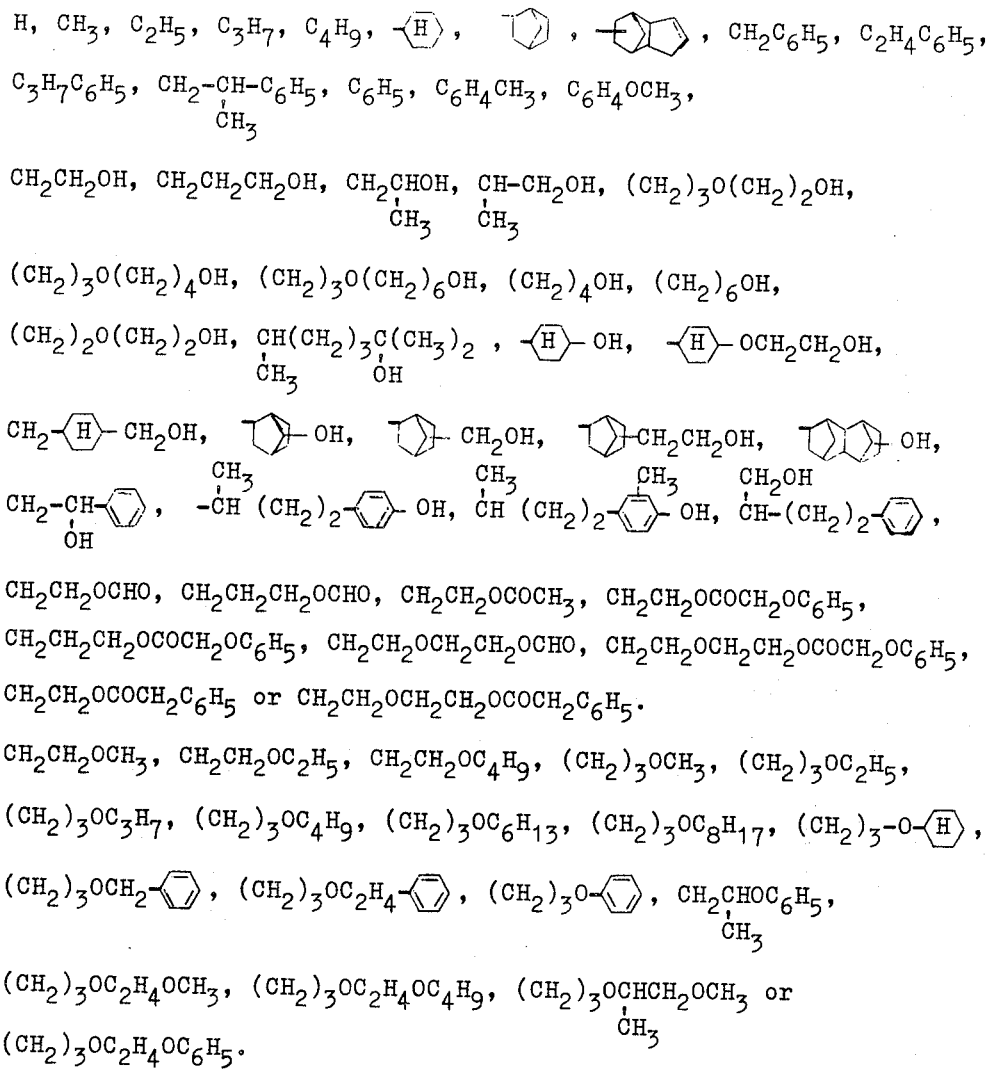

Moreover dyes are preferred which contain a radical of the formula

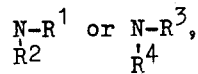

these being derived from radicals of pyrrolidine, piperidine or morpholine. The coupling components for the dyes of formula (I) are preferably chosen so that at least one oxygen atom is contained in one of the radicals R¹ to R⁴.

The corresponding dyes which contain as diazo components benzothiazole, benzoisothiazole, thiazole, thiadiazole or thiophene, each of which may bear, as substituent, nitro, chloro, bromo, cyano, methyl, methylmercapto, β-carbomethoxyethylmercapto, β-carboethoxyethylmercapto, carbomethoxy, carboethoxy or acetyl are particularly valuable.

The following are given as examples from among particularly valuable diazo components:

4-nitroaniline, 2-chloro-4-nitroaniline, 2-bromo-4-nitroaniline, 2-cyano-4-nitroaniline, 2-methoxy-4-nitroaniline, 2-amino-5-nitrophenylsulfonic acid dimethylamide, 2-amino-5-nitrophenylsulfonic acid butylamide, 2-amino-5-nitrophenylsulfonic acid β-methoxyethylamide, 2-aminobenzonitrile, 3-chloro-4-aminobenzonitrile, 2-chloro-5-aminobenzonitrile, 2-amino-5-chlorobenzonitrile, 2,5-dichloro-4-aminobenzonitrile, 1-amino-2,4-dicyanobenzene, 1-amino-2,4-dicyano-6-chlorobenzene, 2-chloro-4-amino-5-nitrobenzonitrile, 2-amino-3-chloro-5-nitrobenzonitrile, 2-amino-3-bromo-5-nitrobenzonitrile, 2,6-dicyano-4-nitroaniline, 2,5-dichloro-4-nitroaniline, 2,6-dichloro-4-nitroaniline, 2,6-dibromo-4-nitroaniline, 2-chloro-6-bromo-4-nitroaniline, 2,4-dinitroaniline, 2,4-dinitro-6-chloroaniline, 2,4-dinitro-6-bromoaniline, 2-amino-3,5-dinitrobenzonitrile, 1-amino-4-nitrobenzene-2-methylsulfone, 1-amino-4-nitrobenzene-2-ethylsulfone, 4-methylsulfonylaniline, 1-amino-2-chlorobenzene-4-methylsulfone, 1-amino-2,6-dibromobenzene-4-methylsulfone, 1-amino-2,6-dichlorobenzene-4-methylsulfone, 4-aminobenzoic acid esters, 2-amino-5-nitrobenzoic esters, 2-amino-3-chloro-5-nitrobenzoic acid esters, 2-amino-3,5-dichlorobenzoic acid esters, 2-amino-3,5- dibromobenzoic acid esters, 2-amino-3,5-dinitrobenzoic acid methyl or β-methoxyethyl ester, diethyl aminoterephthalate, 4-aminoazobenzene, 2,3'-dimethyl-4-aminoazobenzene, 2'3-dimethyl-4-aminoazobenzene, 2,5-dimethyl-4-aminoazobenzene, 4'-hydroxy-2'-methyl-4-aminoazobenzene, 3,5-dibromo-4-aminoazobenzene, 2-methyl-5-methoxy-4-aminoazobenzene, 4'-chloro-2-methyl-5-methoxy-4-aminoazobenzene, 4'-nitro-2-methyl-5-methoxy-4-aminoazobenzene and 4'-nitro-2,5-dimethoxy-4-aminoazobenzene.

The following are examples of particularly valuable heterocyclic diazo components:

2-aminothiazole, 2-amino-5-nitrothiazole, 2-amino-4-methyl-5-nitrothiazole, 2-amino-4-methylthiazole-5-carboxylic ethyl ester, 2-amino-4-methyl-5-acetylthiazole, 2-amino-5-phenyl-1,3,4-thiadiazole, 3-phenyl-5-amino-1,2,4-thiadiazole, 3-methylmercapto-5-amino-1,2,4-thiadiazole, 3-β-carbomethoxyethylmercapto-5-amino-1,2,4-thiadiazole, 3-β-carboethoxyethylmercapto-5-amino-1,2,4-thiadiazole, 2-amino-6-nitrobenzothiazole, 2-amino-3-cyano-4-methylthiophene-5-carboxylic esters, 3-amino-5-nitro-2,1-benzoisothiazole, 3-amino-5-nitro-7-chloro-2,1-benzoisothiazole, 3-amino-5-nitro-7-bromo-2,1-benzoisothiazole, 4-amino-7-nitro-1,2-benzoisothiazole, 4-amino-5-bromo-1,2-benzoisothiazole, 4-amino-5-bromo-7-nitro-1,2-benzoisothiazole and 4-amino-5-cyano-7-nitro-1,2-benzoisothiazole.

The new dyes are yellow to blue and are suitable for dyeing textile materials of acrylonitrile polymers, synthetic polyamides, cellulose esters such as secondary acetate or triacetate, and particularly synthetic linear polyesters such as polyethylene glycol terephthalate or polymers having an analogous chemical constitution. Deep colorations are obtained which have good fastness properties.

The following Examples illustrate the invention. Parts and percentages are by weight unless stated otherwise.

EXAMPLE 1

75 parts of 2-phenyl-4,6-dichloropyrimidine is introduced into 75 parts of β-hydroxypropylamine which has been heated to 80°C. The reaction mixture is then heated to 150°C and kept at this temperature for 14 hours. The mixture is worked up by stirring it into 1,000 parts of ice-water so that the 4,6-bis-(β-hydroxypropylamino)-2-phenylpyrimidine separates as a highly viscous oil which crystallizes throughout after a few hours. The melting point of the product is 144°C.

EXAMPLE 2

A mixture of 100 parts by volume of ethanol, 20 parts of triethylamine and 16.5 parts of β-methoxyethylamine is heated to 70°C and then 52 parts of 2-(p-chlorophenyl)-4,6-dichloropyrimidine is introduced. For the production of 2-(p-chlorophenyl)-4-(β-methoxyethylamino)-6-chloropyrimidine the reaction mixture is boiled under reflux for 6 hours and then stirred into 1,000 parts of water. The crude product is at first oily and crystallizes throughout in the course of a few hours. It has a melting point of 65°C.

53 parts of the compound thus obtained and having the formula:

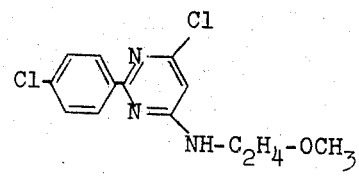

is heated with 42 parts of β-(β'-hydroxyethoxy)-ethylamine for 12 hours at 170°C. 1,000 parts of water is then added to the reaction mixture and the oily product which separates and which has the probable formula:

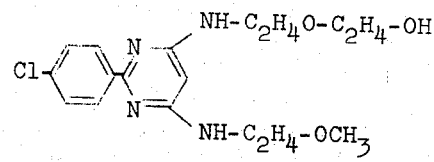

is isolated from the supernatant aqueous phase. The pyrimidine derivative may be used immediately for coupling after it has been dissolved in methanol.

EXAMPLE 3

128 parts of 2-phenyl-4-(γ-hydroxypropylamino)-6-chloropyrimidine (prepared analogously to the first paragraph of Example 2) and 160 parts of γ-ethoxypropylamine are heated for 8 hours in an autoclave at 170°C. The reaction mixture is introduced into 2,000 parts of water and the oily diaminopyrimidine formed having the formula:

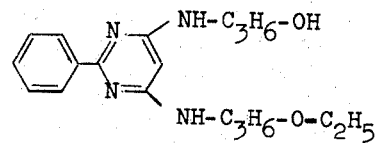

is separated by decanting the aqueous phase. It may be used immediately for coupling. The reaction product contains a small amount of 4,6-bis-(γ-ethoxypropylamino)-2-phenylpyrimidine which has probably been formed by exchange of the aminopropanol radical for γ-ethoxypropylamine.

A chromatographically uniform pyrimidine of the above formula is obtained by reaction of 2-phenyl-4,6-dichloropyrimidine with (1) γ-ethoxypropylamine and (2) γ-hydroxypropylamine in the manner described above.

EXAMPLE 4

112.5 parts of 2-phenyl-4,6-dichloropyrimidine is introduced at 0°C into 650 parts of concentrated sulfuric acid. Then within 2 hours 30 minutes at 0°C a mixture of 65 parts of 98% nitric acid and 90 parts of concentrated sulfuric acid is dripped in, the whole is stirred for another hour at 0°C and the mixture is then poured carefully into ice. The 2-m-nitrophenyl-4,6-dichloropyrimidine obtained has a melting point of 133° to 135° C after it has been recrystallized from dioxane.

In order to exchange the chlorine atoms, 135 g of the product thus obtained is heated with 56 parts of γ-hydroxypropylamine for 4 hours at 170°C. The diaminopyrimidine of the formula:

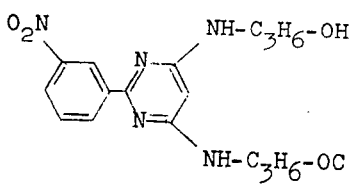

is used for coupling after the reaction mixture has been poured into water and the aqueous phase decanted.

EXAMPLE 5

For the production of a coupling component mixture 67.5 parts of 2-phenyl-4,6-dichloropyrimidine is introduced at 60°C into a mixture of 37.5 parts of γ-hydroxypropylamine and 44.5 parts of γ-methoxypropylamine. The mixture is then heated for 13 hours under reflux and poured into water as usual. The oil obtained is a mixture of three coupling components having the probable formulae:

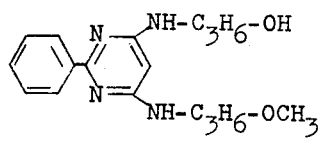 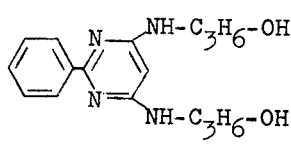 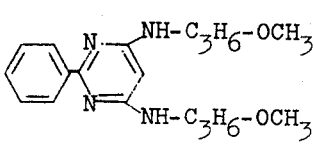

EXAMPLE 6

63 parts of 2-methyl-4,6-dihydroxypyrimidine and 230 parts of phosphorus oxychloride are boiled under reflux for 90 minutes. The reaction mixture is then poured onto ice and after the aqueous phase has been buffered with sodium acetate the deposited 2-methyl-4,6-dichloropyrimidine is filtered off. While the residue is still moist it is introduced into 180 parts of γ-methoxypropylamine and the whole is heated to refluxing temperature until quantitative reaction has taken place. After cooling, 200 parts by volume of dioxane is added to the reaction mixture, the deposited γ-methoxypropylamine hydrochloride is suction filtered and the filtrate is evaporated at subatmospheric pressure. The pyrimidine derivative of the formula:

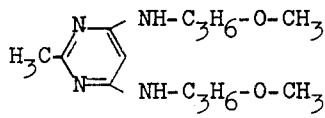

remains as a viscous oil which slowly crystallizes.

EXAMPLE 7

100 parts of 2-piperidino-4-hydroxy-6-methylpyrimidine is introduced into 250 parts of phosphorus oxychloride and the mixture is then boiled under reflux for one hour. The pyrimidine derivative of the formula:

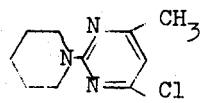

is precipitated, by pouring the reaction mixture into ice-water, as an oil which slowly crystallizes.

48.5 parts of the product thus obtained is heated with 75 parts of γ-hydroxypropylamine for 11 hours at 120°C. After conventional working up the compound of the formula

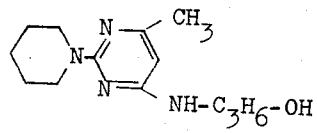

is obtained as a crystalline substance having a melting point of 58° to 60°C.

EXAMPLE 8

45.2 parts of 2-diethylamino-4-hydroxy-6-methylpyrimidine (prepared from N,N-diethylguanidine and ethyl acetoacetate) is boiled under reflux with 50 parts of phosphorus oxychloride and 1 part of pyridine for 1 hour. The reaction mixture is then fractionated at subatmospheric pressure. The 2-ethylamino-4-chloro-6-methylpyrimidine passes over at 87° to 88°C at 0.5 mm. It is worked up analogously to the second paragraph of Example 7.

EXAMPLE 9

63 parts of 4-methyluracil is boiled under reflux with 230 parts of phosphorus oxychloride for 45 minutes. After conventional working up the 4-methyl-2,6-dichloropyrimidine while it is still moist is introduced while cooling into 180 parts of γ-methoxypropylamine. The reaction mixture is heated for 3 hours at 115°C, and then excess amine is distilled off. To remove the γ-methoxypropylamine hydrochloride the residue is stirred with dioxane, the precipitated salt is suction filtered and the filtrate is distilled after evaporation of the solvent. The diaminopyrimidine of the formula:

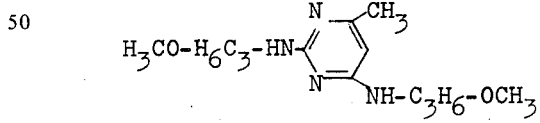

passes over at 199°C at 0.25 mm Hg.

EXAMPLE 10

To diazotize 6-chloro-2,4-dinitroaniline, 11 parts of the amine is introduced at 0°C into a mixture of 30 parts of concentrated sulfuric acid and 16 parts of nitrosylsulfuric acid and stirred for another 3 hours at 0° to 5°C. When diazotization is finished the sulfuric acid solution is added in portions to a mixture of 15 parts of the pyridimidine derivative (obtained according to Example 1) dissolved in 50 parts by volume of formamide, 30 parts by volume of 10% hydrochloric acid and 400 parts of ice. After the excess sulfuric acid has been buffered with sodium acetate solution to a pH of from 1 to 2 the coupling is ended within a short time. The deposited dye of the formula:

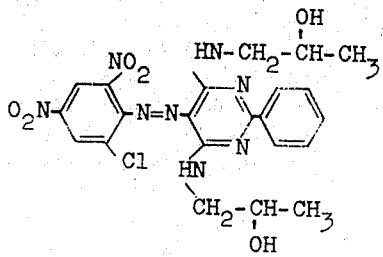

is suction filtered, washed with hot water and then dried at 60°C under subatmospheric pressure. After it has been ground a dark brown powder is obtained which gives neutral red shades having very good fastness properties when dyed onto polyester fibers.

EXAMPLE 11

8 parts of 2-amino-5-nitrobenzonitrile is diazotized at 0°C in 46 parts of concentrated sulfuric acid and 16 parts of nitrosylsulfuric acid. After 6 hours the diazonium salt solution is poured into ice-water, any undissolved product is filtered off and the filtrate is allowed to flow into a solution of 16.5 parts of 2-phenyl-4-($\beta$-hydroxyethylamino)-6-($\gamma$-isopropoxypropylamino)-pyrimidine in 100 parts by volume of formamide, 25 parts by volume of 10% hydrochloric acid and 500 parts of ice. The coupling mixture is brought to pH for 2 to 3 with sodium acetate and after the end of the reaction the deposited dye is isolated by filtration. The compound, whose composition corresponds to the formula:

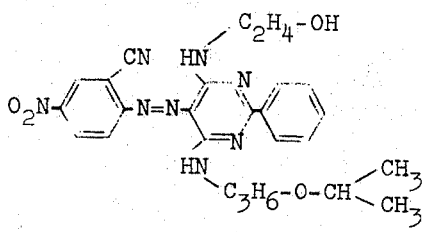

dyes polyethylene glycol terephthalate fibers scarlet shades having outstanding fastness to light and dry-heat pleating and setting.

EXAMPLE 12

4.2 parts of o-aminobenzonitrile is dissolved in 100 parts by volume of water and 10 parts by volume of concentrated hydrochloric acid, then 100 parts of ice is added and diazotization is carried out conventionally with sodium nitrite. The diazonium salt solution obtained is clarified and added at 0° to 5°C to a solution of 13 parts of the pyrimidine derivative obtained according to Example 2 in 100 parts by volume of formamide and 500 parts of ice water. The pH of the mixture is then raised to from 4 to 5. After coupling is over the deposited yellow precipitate is isolated, washed, dried and ground. The dye whose composition corresponds to the formula:

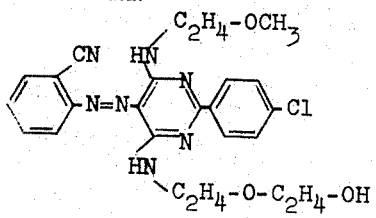

dyes polyester cloth yellow shades having very good fastness properties.

EXAMPLE 13

12 parts of 2-amino-3-bromo-5-nitrobenzonitrile is diazotized by the process described in Example 10. The mixture obtained is then dripped into a mixture of 14 parts of 2-methyl-4,6-bis-($\gamma$-methoxypropylamino)-pyrimidine (Example 6), 20 parts by volume of concentrated hydrochloric acid, 150 parts by volume of formamide and 500 parts of ice-water and the pH of the solution is kept at about 4.

The precipitated dye of the formula:

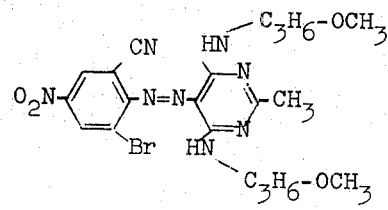

dyes polyethylene glycol terephthalate materials fast red shades.

EXAMPLE 14

6.9 parts of p-aminoazobenzene is intimately ground with 15 parts by volume of concentrated hydrochloric acid and left for 12 hours at room temperature. The paste is then suspended in 350 parts of water, the appropriate amount of sodium nitrite is added and the whole is stirred for 4 hours at room temperature. The filtered diazonium salt solution is then added to a mixture of 11.5 parts of the coupling component mixture obtained according to Example 5 (dissolved in 100 parts by volume of formamide with an addition of 20 parts by volume of concentrated hydrochloric acid) and 500 parts of ice. After the coupling mixture has been buffered to pH 5 the whole is stirred for a few hours and the dye is then isolated in conventional manner. The product is shown by thin-layer chromatography to consist of three substances of the probable formulae:

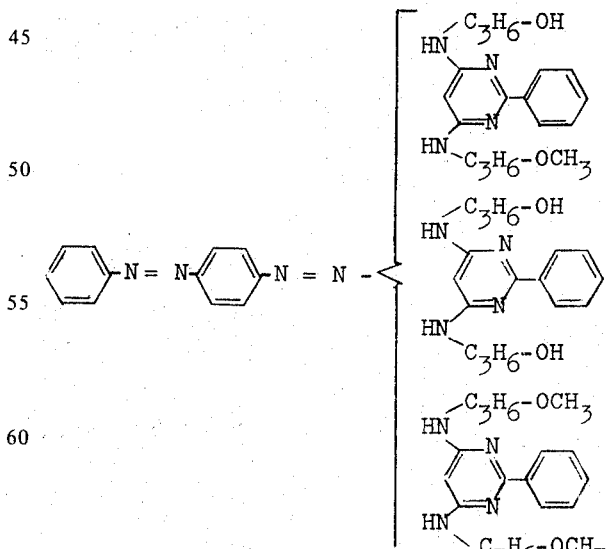

and gives deep orange shades having good fastness properties on polyester fibers. The following dyes or dye mixtures are obtained analogously to the methods described in the foregoing Examples.

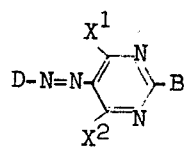

| Ex No | D | B | $X^1$ | $X^2$ | Shade of dyeing on polyester |
|---|---|---|---|---|---|
| 15 | $O_2N-C_6H_4-$ | $-C_6H_5$ | $NH-C_3H_6-OH$ | $NH-C_3H_6-OH$ | orange |
| 16 | " | " | " | $NH-C_3H_6-O-CH_3$ | " |
| 17 | " | " | " | $NH-C_2H_4-O-CH_3$ | " |
| 18 | " | " | $NH_2$ | $NH-C_3H_6-O-CH(CH_3)_2$ | golden yellow |
| 19 | o-$NO_2-C_6H_4-$ | " | $NH-C_3H_6-OH$ | $NH-C_3H_6-OH$ | " |
| 20 | " | " | " | $NH-C_2H_4-O-CH_3$ | " |
| 21 | Cl,$NO_2-C_6H_3-$ | " | $NH-CH_2-CH(OH)-CH_3$ | $NH-CH_2-CH(OH)-CH_3$ | orange |
| 22 | " | " | $NH-C_3H_6-OH$ | $NH-C_2H_4-O-CH_3$ | " |
| 23 | " | $-CH(CH_3)_2$ | " | $NH-C_3H_6-OH$ | yellow |
| 24 | $O_2N,Cl-C_6H_3-$ | $-C_6H_5$ | " | $NH-C_2H_4-O-CH_3$ | red orange |
| 25 | " | " | " | $NH-C_3H_6-O-CH_3$ | " |
| 26 | " | $-C_6H_4-CH_3$ | " | $NH-C_3H_6-O-C_2H_5$ | " |
| 27 | " | " | $NH-C_2H_4-OH$ | " | " |
| 28 | " | $-C_6H_4-OCH_3$ | " | $NH-C_3H_6-O-CH(CH_3)_2$ | scarlet |
| 29 | " | " | " | $NH-C_4H_9$ | " |
| 30 | " | " | $NH-C_2H_4-O-CH_3$ | $NH-C_2H_4-O-CH_3$ | " |
| 31 | $O_2N,Br-C_6H_3-$ | $-C_6H_5$ | $NH-C_2H_4-O-C_2H_4-OH$ | $NH-C_2H_4-O-C_2H_4-OH$ | scarlet |
| 32 | " | " | $NH-C_2H_4-OH$ | $NH-C_3H_6-O-CH_3$ | " |
| 33 | " | " | " | $NH-C_3H_6-O-CH(CH_3)_2$ | " |
| 34 | " | " | $NH_2$ | " | orange |
| 35 | " | $-C_6H_4-CH_3$ | $NH-C_2H_4-OH$ | " | scarlet |

| Ex No | D | B | $X^1$ | $X^2$ | Shade of dyeing on polyester |
|---|---|---|---|---|---|
| 36 | $O_2N$-C₆H₃(Br)- | -C₆H₄-CH₃ | $NH-C_3H_6-OH$ | $NH-C_3H_6-O-CH(CH_3)_2$ | scarlet |
| 37 | " | -C₆H₄-Cl | " | " | " |
| 38 | " | " | $NH-C_2H_4-O-C_2H_4-OH$ | $NH-C_6H_5$ | " |
| 39 | " | -C₆H₄-OCH₃ | $NH-C_3H_6-O-CH_3$ | $NH-C_3H_6-O-CH_3$ | " |
| 40 | " | " | " | $NH-C_3H_6-OH$ | " |
| 41 | " | " | " | $NH-C_2H_4-O-C_2H_4-OH$ | " |
| 42 | " | " | $NH-C_3H_6-O-C_4H_8-OH$ | $NH-C_3H_6-O-C_4H_8-OH$ | " |
| 43 | $O_2N$-C₆H₃(CN)- | -C₆H₅ | $NH-C_2H_4-O-CH_3$ | $NH-C_2H_4-O-CH_3$ | " |
| 44 | " | " | $NH-C_3H_6-O-CH_3$ | $NH-C_3H_6-O-CH_3$ | " |
| 45 | " | " | $NH-C_3H_6-O-C_2H_5$ | $NH-C_3H_6-O-C_2H_5$ | " |
| 46 | " | " | $NH-C_2H_4-OH$ | $NH-C_2H_4-OH$ | " |
| 47 | " | " | $NH-C_3H_6-OH$ | $NH-C_3H_6-OH$ | " |
| 48 | " | " | $NH-C_2H_4-O-C_2H_4-OH$ | $NH-C_2H_4-O-C_2H_4-OH$ | " |
| 49 | " | " | $NH-C_3H_6-O-C_4H_8-OH$ | $NH-C_3H_6-O-C_4H_8-OH$ | " |
| 50 | " | " | $NH_2$ | $NH-C_3H_6-O-CH(CH_3)_2$ | orange |
| 51 | " | " | $NH-C_2H_4-O-CH_3$ | $NH-C_2H_4-OH$ | scarlet |
| 52 | " | " | " | $NH-C_3H_6-OH$ | " |
| 53 | " | " | $NH-C_3H_6-O-CH_3$ | $NH-C_2H_4-OH$ | " |
| 54 | " | " | " | $NH-C_3H_6-OH$ | " |
| 55 | " | " | " | $NH-C_2H_4-O-C_2H_4-OH$ | " |
| 56 | " | " | " | $NH-C_3H_6-O-C_4H_8-OH$ | " |
| 57 | " | " | $NH-C_3H_6-O-C_2H_5$ | $NH-C_3H_6-OH$ | " |
| 58 | " | " | " | $NH-C_2H_4-OH$ | " |
| 59 | " | " | " | $NH-C_2H_4-O-C_2H_4-OH$ | " |
| 60 | " | " | $NH-C_3H_6-O-CH(CH_3)_2$ | " | " |
| 61 | " | " | $NH-C_2H_4-O-C_4H_9$ | " | " |

| Ex No | D | B | $X^1$ | $X^2$ | Shade of dyeing on polyester |
|---|---|---|---|---|---|
| 62 | $O_2N$-C₆H₃(CN)- | phenyl | $NH-C_2H_4-O-C_4H_9$ | $NH-C_2H_4-OH$ | scarlet |
| 63 | " | " | $NH-C_3H_6-O-CH_2-CH(C_2H_5)-C_4H_9$ | " | " |
| 64 | " | " | $NH-C_2H_4-O-C_2H_4-OH$ | $NH-C_3H_6-O-C_2H_4-O$-phenyl | " |
| 65 | " | " | $NH-C_2H_4-OH$ | " | " |
| 66 | " | " | $NH-C_3H_6-OH$ | $NH-C_2H_5$ | " |
| 67 | " | " | $NH-C_2H_4-OH$ | $NH-C_4H_9$ | " |
| 68 | " | " | " | $NH-C_6H_{13}$ | " |
| 69 | " | " | " | $NH-CH_2-CH(C_2H_5)-C_4H_9$ | " |
| 70 | " | " | " | $NH$-cyclohexyl | " |
| 71 | " | " | $NH-C_2H_4-O-C_2H_4-OH$ | $NH-C_2H_4$-phenyl | " |
| 72 | " | " | $NH-C_2H_4-OH$ | " | " |
| 73 | " | " | " | $NH-CH_2$-phenyl | " |
| 74 | " | " | $NH-C_3H_5-OH$ | " | " |
| 75 | " | " | $NH-C_3H_6-O-CH(CH_3)_2$ | $NH-C_3H_6-OH$ | " |
| 76 | " | " | $NH-C_2H_4-O-C_2H_4-OH$ | " | " |
| 77 | " | " | $NH-C_2H_4-O-CH_3$ | $NH-CH_2-CH(OH)$-phenyl | " |
| 78 | " | " | $NH-C_2H_4-O-C_2H_4-OH$ | $N(C_2H_5)(C_2H_4-OH)$ | " |
| 79 | " | " | $NH-C_3H_6-O-CH_3$ | $NH-C_6H_{12}-OH$ | " |
| 80 | " | C₆H₄-$CH_3$ | $NH-C_2H_4-O-CH_3$ | $NH-C_2H_4-O-CH_3$ | " |
| 81 | " | " | $NH-C_3H_6-O-CH_3$ | $NH-C_2H_4-OH$ | " |
| 82 | " | " | " | $NH-C_2H_4-O-C_2H_4-OH$ | " |
| 83 | " | " | $NH-C_3H_6-O-C_2H_5$ | $NH-C_2H_4-OH$ | " |

| Ex No | D | B | $X^1$ | $X^2$ | Shade of dyeing on polyester |
|---|---|---|---|---|---|
| 84 | O$_2$N—⌬—CN (with CH$_3$) | —⌬—CH$_3$ | NH-C$_3$H$_6$-O-CH(CH$_3$)$_2$ | NH-C$_2$H$_4$-OH | scarlet |
| 85 | " | " | " | NH-C$_2$H$_4$-O-C$_2$H$_4$-OH | " |
| 86 | " | " | " | NH-C$_3$H$_6$-OH | " |
| 87 | " | " | NH-C$_2$H$_4$-O-CH$_3$ | " | " |
| 88 | " | —⌬—OCH$_3$ | NH-C$_3$H$_6$-OH | NH-C$_3$H$_6$-OH | " |
| 89 | " | " | NH-C$_2$H$_4$-O-C$_2$H$_4$-OH | NH-C$_2$H$_4$-O-C$_2$H$_4$-OH | " |
| 90 | " | " | NH-C$_3$H$_6$-O-CH$_3$ | NH-C$_3$H$_6$-OH | " |
| 91 | " | " | " | NH-C$_2$H$_4$-O-C$_2$H$_4$-OH | " |
| 92 | " | " | NH-C$_3$H$_6$-O-CH(CH$_3$)$_2$ | NH-C$_2$H$_4$-OH | " |
| 93 | " | " | " | NH-C$_3$H$_6$-OH | " |
| 94 | " | —⌬—OC$_2$H$_5$ | " | NH-C$_2$H$_4$-OH | " |
| 95 | " | —⌬—Cl | NH-C$_2$H$_4$-O-C$_2$H$_4$-OH | NH-C$_2$H$_4$-O-C$_2$H$_4$-OH | " |
| 96 | " | " | NH-C$_2$H$_4$-O-CH$_3$ | NH-C$_2$H$_4$-O-C$_2$H$_4$-OH | " |
| 97 | " | " | NH-C$_3$H$_6$-O-CH$_3$ | " | " |
| 98 | " | " | " | NH-C$_2$H$_4$-OH | " |
| 99 | " | " | " | NH-C$_3$H$_6$-OH | " |
| 100 | " | " | NH-C$_3$H$_6$-O-CH(CH$_3$)$_2$ | " | " |
| 101 | " | " | " | NH-C$_2$H$_4$-OH | " |
| 102 | " | " | " | NH-C$_2$H$_4$-O-C$_2$H$_4$-OH | " |
| 103 | " | —⌬—O$_2$N | NH-C$_3$H$_6$-OH | NH-C$_3$H$_6$-OH | " |
| 104 | " | H | NH-C$_3$H$_6$-O-CH$_3$ | " | " |
| 105 | " | CH$_3$ | NH-C$_2$H$_4$-O-CH$_3$ | NH-C$_2$H$_4$-O-CH$_3$ | " |
| 106 | " | " | NH-C$_3$H$_6$-O-CH(CH$_3$)$_2$ | NH-C$_2$H$_4$-OH | " |
| 107 | " | " | NH-C$_3$H$_6$-OH | NH-CH$_2$-CH(OH)-⌬ | " |

| Ex No | D | B | $X^1$ | $X^2$ | Shade of dyeing on polyester |
|---|---|---|---|---|---|
| 108 | $O_2N$-C₆H₃(CN)- | $-CH(CH_3)_2$ | $NH-C_2H_4-OH$ | $NH-C_2H_4-OH$ | scarlet |
| 109 | " | " | $NH-CH_2-CH(OH)-CH_3$ | $NH-CH_2-CH(OH)-CH_3$ | " |
| 110 | " | " | $NH-C_3H_6-OH$ | $NH-C_3H_6-OH$ | " |
| 111 | " | " | $NH-C_3H_6-O-CH_3$ | $NH-C_3H_6-O-CH_3$ | " |
| 112 | " | $-C_4H_9$ | $NH-C_3H_6-OH$ | $NH-C_3H_6-OH$ | " |
| 113 | " | $-CH(C_2H_5)-C_4H_9$ | " | " | " |
| 114 | " | $-CH_2-C_6H_5$ | " | " | " |
| 115 | " | $-CH_2-O-C_2H_5$ | " | " | " |
| 116 | " | $-CH_2-O-C_6H_5$ | " | " | " |
| 117 | $O_2N$-C₆H₃(OCH₃)- | $-C_6H_5$ | $NH-C_3H_6-O-CH_3$ | $NH-C_2H_4-OH$ | " |
| 118 | " | " | " | $NH-C_2H_4-O-C_2H_4-OH$ | " |
| 119 | " | " | $NH-C_3H_6-O-CH(CH_3)_2$ | $NH-C_2H_4-OH$ | " |
| 120 | $O_2N$-C₆H₃(CH₃)- | " | " | " | orange |
| 121 | $O_2N$-C₆H₃(SO₂CH₃)- | " | $NH-C_3H_6-O-CH_3$ | $NH-C_3H_6-O-CH_3$ | " |
| 122 | " | " | $NH-C_2H_4-O-CH_3$ | $NH-C_2H_4-O-CH_3$ | red |
| 123 | " | " | $NH-C_3H_6-O-CH(CH_3)_2$ | $NH-C_3H_6-OH$ | " |
| 124 | " | " | $NH-CH_2-CH(C_2H_5)-C_4H_9$ | " | " |
| 125 | " | " | $NH-C_2H_4-C_6H_5$ | $NH-C_2H_4-O-C_2H_4-OH$ | " |
| 126 | " | " | $NH-C_4H_9$ | $NH-C_2H_4-OH$ | " |
| 127 | " | " | $NH-C_6H_{13}$ | " | " |
| 128 | " | " | $NH-C_6H_{12}-OH$ | $NH-C_6H_{12}-OH$ | " |
| 129 | " | $-C_6H_4-CH_3$ | $NH-C_3H_6-O-CH_3$ | $NH-C_3H_6-O-CH_3$ | " |

| Ex No | D | B | $X^1$ | $X^2$ | Shade of dyeing on polyester |
|---|---|---|---|---|---|
| 130 | $O_2N$-C₆H₃(SO₂-CH₃)- | -C₆H₄-CH₃ | $NH-C_3H_6-O-CH_2-CH(C_4H_9)-C_2H_5$ | $NH-C_2H_4-OH$ | red |
| 131 | " | -C₆H₄-OCH₃ | $NH-C_3H_6-O-CH_3$ | $NH-C_2H_4-O-C_2H_4-OH$ | " |
| 132 | " | -CH(CH₃)₂ | " | $NH-C_3H_6-OH$ | scarlet |
| 133 | " | " | $NH-CH_2-CH(OH)-CH_3$ | $NH-CH_2-CH(OH)-CH_3$ | " |
| 134 | $O_2N$-C₆H₃(SO₂-N(CH₃)₂)- | -C₆H₅ | $NH-C_3H_6-O-C_4H_8-OH$ | $NH-C_3H_6-OH$ | red |
| 135 | " | " | $NH-C_3H_6-O-CH(CH_3)_2$ | $NH-C_2H_4-OH$ | " |
| 136 | $O_2N$-C₆H₃(SO₂-NH-C₄H₉)- | -C₆H₅ | " | " | " |
| 137 | " | " | $NH-C_3H_6-O-C_4H_8-OH$ | $NH-C_3H_6-OH$ | " |
| 138 | $O_2N$-C₆H₃(SO₂-NH-C₂H₄-OCH₃)- | " | $NH-C_3H_6-O-C_2H_5$ | " | " |
| 139 | o-CN-C₆H₄- | " | $NH-C_2H_4-O-CH_3$ | $NH-C_2H_4-O-CH_3$ | yellow |
| 140 | " | " | $NH-C_2H_4-OH$ | $NH-C_2H_4-OH$ | " |
| 141 | " | " | $NH_2$ | $NH-C_3H_6-O-CH(CH_3)_2$ | " |
| 142 | " | " | $NH-C_3H_6-O-CH_3$ | $NH-C_2H_4-O-C_2H_4OH$ | " |
| 143 | " | -C₆H₄-CH₃ | $NH-C_3H_6-OH$ | $NH-C_3H_6-OH$ | " |
| 144 | " | -C₆H₄-Cl | $NH-C_2H_4-O-C_2H_4-OH$ | $NH-C_2H_4-O-C_2H_4-OH$ | " |
| 145 | Cl-C₆H₃(CN)- | -C₆H₅ | " | " | " |
| 146 | " | " | $NH-C_3H_6-OH$ | $NH-C_3H_6-OH$ | " |
| 147 | " | " | $NH_2$ | $NH-C_3H_6-O-CH(CH_3)_2$ | " |
| 148 | NC-C₆H₃(Cl)- | " | $NH-C_3H_6-OH$ | $NH-C_3H_6-OH$ | golden yellow |
| 149 | NC-C₆H₄(Cl)- | " | " | " | yellow |
| 150 | Cl-C₆H₄- | " | " | " | " |

| Ex No | D | B | $X^1$ | $X^2$ | Shade of dyeing on polyester |
|---|---|---|---|---|---|
| 151 | 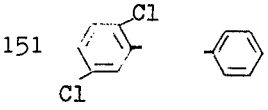 2,4-Cl<sub>2</sub>-C<sub>6</sub>H<sub>3</sub> |  C<sub>6</sub>H<sub>5</sub> | NH-C<sub>3</sub>H<sub>6</sub>-OH | NH-C<sub>3</sub>H<sub>6</sub>-OH | yellow |
| 152 | 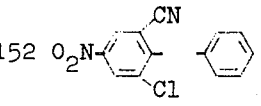 O<sub>2</sub>N-/CN/Cl-C<sub>6</sub>H<sub>2</sub> | " | NH-C<sub>3</sub>H<sub>6</sub>-O-CH<sub>3</sub> | NH-C<sub>3</sub>H<sub>6</sub>-O-CH<sub>3</sub> | red |
| 153 | " | " | NH-C<sub>2</sub>H<sub>4</sub>-O-CH<sub>3</sub> | NH-C<sub>2</sub>H<sub>4</sub>-O-CH<sub>3</sub> | " |
| 154 | " | " | NH-C<sub>3</sub>H<sub>6</sub>-O-C<sub>4</sub>H<sub>8</sub>-OH | NH-C<sub>3</sub>H<sub>6</sub>-O-C<sub>4</sub>H<sub>2</sub>-OH | red |
| 155 | " | " | NH-C<sub>3</sub>H<sub>6</sub>-O-CH<sub>3</sub> | " | " |
| 156 | " | " | " | NH-C<sub>2</sub>H<sub>4</sub>-O-C<sub>2</sub>H<sub>4</sub>-OH | " |
| 157 | " | " | " | NH-C<sub>3</sub>H<sub>6</sub>-OH | " |
| 158 | " | " | NH-C<sub>3</sub>H<sub>6</sub>-O-CH(CH<sub>3</sub>)<sub>2</sub> | NH-C<sub>3</sub>H<sub>6</sub>-OH | " |
| 159 | " | " | NH-C<sub>2</sub>H<sub>4</sub>-C<sub>6</sub>H<sub>5</sub> | NH-C<sub>2</sub>H<sub>4</sub>-O-C<sub>2</sub>H<sub>4</sub>-OH | " |
| 160 | " |  4-CH<sub>3</sub>-C<sub>6</sub>H<sub>4</sub> | NH-C<sub>3</sub>H<sub>6</sub>-OH | NH-C<sub>3</sub>H<sub>6</sub>-OH | " |
| 161 | " | " | NH-C<sub>3</sub>H<sub>6</sub>-O-CH(CH<sub>3</sub>)<sub>2</sub> | NH-C<sub>2</sub>H<sub>4</sub>-OH | " |
| 162 | " | 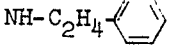 4-Cl-C<sub>6</sub>H<sub>4</sub> | NH-C<sub>2</sub>H<sub>4</sub>-O-CH<sub>3</sub> | NH-C<sub>2</sub>H<sub>4</sub>-O-C<sub>2</sub>H<sub>4</sub>-OH | " |
| 163 | " | " | NH-C<sub>3</sub>H<sub>6</sub>-O-CH<sub>3</sub> | " | " |
| 164 | " | " | " | NH-C<sub>3</sub>H<sub>6</sub>-OH | " |
| 165 | " |  4-OCH<sub>3</sub>-C<sub>6</sub>H<sub>4</sub> | " | " | " |
| 166 | " | " | " | NH-C<sub>2</sub>H<sub>4</sub>-O-C<sub>2</sub>H<sub>4</sub>-OH | " |
| 167 | " |  3-NO<sub>2</sub>-C<sub>6</sub>H<sub>4</sub> | NH-C<sub>3</sub>H<sub>6</sub>-OH | NH-C<sub>3</sub>H<sub>6</sub>-OH | " |
| 168 |  O<sub>2</sub>N-/CN/Br-C<sub>6</sub>H<sub>2</sub> |  C<sub>6</sub>H<sub>5</sub> | NH-C<sub>3</sub>H<sub>6</sub>-O-CH<sub>3</sub> | NH-C<sub>3</sub>H<sub>6</sub>-O-CH<sub>3</sub> | " |
| 169 | " | " | " | NH-C<sub>3</sub>H<sub>6</sub>-OH | " |
| 170 | " | " | NH-C<sub>3</sub>H<sub>6</sub>-O-C<sub>2</sub>H<sub>5</sub> | " | " |
| 171 | " | " | NH-C<sub>3</sub>H<sub>6</sub>-O-CH<sub>3</sub> | NH-C<sub>2</sub>H<sub>4</sub>-O-C<sub>2</sub>H<sub>4</sub>-OH | " |
| 172 | " | " | NH-C<sub>4</sub>H<sub>9</sub> | NH-C<sub>2</sub>H<sub>4</sub>-OH | " |

| Ex No | D | B | $X^1$ | $X^2$ | Shade of dyeing on polyester |
|---|---|---|---|---|---|
| 173 | 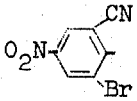 |  -CH$_3$ | NH-C$_2$H$_4$-O-CH$_3$ | NH-C$_2$H$_4$-O-C$_2$H$_4$-OH | red |
| 174 | " | -Cl | NH-C$_3$H$_6$-O-CH$_3$ | NH-C$_3$H$_6$-OH | " |
| 175 | " | -OCH$_3$ | NH-C$_3$H$_6$-OH | " | " |
| 176 | " | H | " | NH-C$_3$H$_6$-O-CH$_3$ | yellowish red |
| 177 | " | " | NH-C$_3$H$_6$-O-CH$_3$ | " | " |
| 178 | " | CH$_3$ | NH-C$_3$H$_6$-OH | NH-C$_3$H$_6$-OH | " |
| 179 | " | " | NH-C$_2$H$_4$-O-CH$_3$ | NH-C$_2$H$_4$-O-CH$_3$ | " |
| 180 | " | -CH(CH$_3$)$_2$ | NH-C$_3$H$_6$-O-CH$_3$ | NH-C$_3$H$_6$-O-CH$_3$ | " |
| 181 | " | " | NH-C$_3$H$_6$-OH | NH-C$_3$H$_6$-OH | " |
| 182 | " | " | NH-CH$_2$-CH(OH)-CH$_3$ | NH-CH$_2$-CH(OH)-CH$_3$ | " |
| 183 | " | " | NH-C$_3$H$_6$-O-CH$_3$ | NH-C$_3$H$_6$-OH | " |
| 184 | " | -CH(C$_2$H$_5$)-C$_4$H$_9$ | NH-C$_3$H$_6$-O-H | " | " |
| 185 | " | -CH$_2$- | " | " | " |
| 186 | " | -CH$_2$-O-C$_2$H$_5$ | " | " | " |
| 187 | " | -CH$_2$-O- | " | " | " |
| 188 |  |  | NH-C$_3$H$_6$-O-CH$_3$ | " | " |
| 189 | " | " | NH-C$_3$H$_6$-O-C$_2$H$_5$ | NH-C$_2$H$_4$-OH | " |
| 190 |  | " | NH-C$_3$H$_6$-OH | NH-C$_3$H$_6$-OH | red orange |
| 191 | " | " | NH-C$_2$H$_4$-O-C$_2$H$_4$-OH | NH-C$_2$H$_4$-O-C$_2$H$_4$-OH | " |
| 192 | 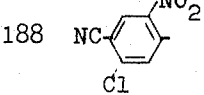 | " | " | " | " |
| 193 | " | " | NH-C$_2$H$_4$-OH | NH-C$_2$H$_4$-OH | " |

| Ex No | D | B | $X^1$ | $X^2$ | Shade of dyeing on polyester |
|---|---|---|---|---|---|
| 194 | O$_2$N-C$_6$H$_3$(NO$_2$)- | -C$_6$H$_5$ | NH-C$_3$H$_6$-O-CH$_3$ | NH-C$_3$H$_6$-O-CH$_3$ | red |
| 195 | " | " | " | NH-C$_2$H$_4$-OH | " |
| 196 | " | " | NH-C$_3$H$_6$-O-CH(CH$_3$)$_2$ | NH-C$_3$H$_6$-OH | " |
| 197 | " | " | NH-C$_4$H$_9$ | NH-C$_2$H$_4$-OH | " |
| 198 | " | -C$_6$H$_4$-CH$_3$ | NH-C$_2$H$_4$-O-CH$_3$ | NH-C$_2$H$_4$-O-CH$_3$ | " |
| 199 | " | -CH$_3$ | " | " | red orange |
| 200 | " | -CH(CH$_3$)$_2$ | NH-CH$_2$-CH(OH)-CH$_3$ | NH-CH$_2$-CH(OH)-CH$_3$ | " |
| 201 | " | " | NH-C$_3$H$_6$-O-CH$_3$ | NH-C$_3$H$_6$-O-CH$_3$ | scarlet |
| 202 | O$_2$N-C$_6$H$_3$(NO$_2$)(Cl)- | -C$_6$H$_5$ | NH-C$_2$H$_4$-O-C$_2$H$_4$-OH | " | red |
| 203 | " | " | NH-C$_6$H$_{13}$ | NH-C$_2$H$_4$-OH | " |
| 204 | " | -C$_6$H$_4$-CH$_3$ | NH-C$_2$H$_4$-O-CH$_3$ | NH-C$_2$H$_4$-OCH$_3$ | " |
| 205 | " | -CH(CH$_3$)$_2$ | NH-C$_3$H$_6$-O-CH$_3$ | NH-C$_3$H$_6$-O-CH$_3$ | scarlet |
| 206 | O$_2$N-C$_6$H$_3$(NO$_2$)(Br)- | -C$_6$H$_5$ | NH-C$_2$H$_4$-O-C$_2$H$_4$-OH | NH-C$_2$H$_4$-O-C$_2$H$_4$-OH | red |
| 207 | " | " | NH-C$_3$H$_6$-O-CH$_3$ | " | " |
| 208 | " | " | " | NH-C$_2$H$_4$-OH | " |
| 209 | " | " | NH-C$_3$H$_6$-O-CH(CH$_3$)$_2$ | " | " |
| 210 | " | " | " | NH-C$_3$H$_6$-OH | " |
| 211 | " | " | NH-C$_4$H$_9$ | " | " |
| 212 | " | " | NH-C$_3$H$_6$-O-CH$_3$ | NH-C$_3$H$_6$-N(pyrrolidon-2-yl) | " |
| 213 | " | -C$_6$H$_4$-CH$_3$ | NH-C$_3$H$_6$-O-CH$_3$ | NH-C$_3$H$_6$-O-CH$_3$ | " |
| 214 | " | -CH$_3$ | NH-C$_2$H$_4$-O-CH$_3$ | NH-C$_2$H$_4$-O-CH$_3$ | red orange |

| Ex No | D | B | $X^1$ | $X^2$ | Shade of dyeing on polyester |
|---|---|---|---|---|---|
| 215 | 4-$O_2N$-2-$NO_2$-6-Br-phenyl | -CH(CH$_3$)$_2$ | NH-CH$_2$-CH(OH)-CH$_3$ | NH-CH$_2$-CH(OH)-CH$_3$ | red orange |
| 216 | 3-$O_2N$-4-$SO_2$-$C_2H_5$-phenyl | phenyl | NH-$C_3H_6$-O-$CH_3$ | NH-$C_3H_6$-O-$CH_3$ | red |
| 217 | " | " | NH-$C_3H_6$-O-CH(CH$_3$)$_2$ | NH-$C_3H_6$-OH | " |
| 218 | 4-$O_2N$-2-$SO_2CH_3$-6-Cl-phenyl | " | " | " | " |
| 219 | 4-$O_2N$-2-$SO_2CH_3$-6-Br-phenyl | " | " | " | " |
| 220 | 4-$H_3C$-$O_2S$-2-Cl-phenyl | " | NH-$C_2H_4$-O-$CH_3$ | NH-$C_3H_6$-OH | golden yellow |
| 221 | " | " | NH-$C_3H_6$-O-$CH_3$ | " | " |
| 222 | " | " | NH-$C_3H_6$-O-$C_2H_5$ | " | " |
| 223 | " | " | NH-$C_3H_6$-O-$C_2H_5$ | NH-$C_2H_4$-O-$C_2H_4$-OH | " |
| 224 | " | " | NH-(4-OCH$_3$-phenyl) | " | orange |
| 225 | 4-$H_3C$-$O_2S$-3,5-Cl$_2$-phenyl | phenyl | NH-$C_2H_4$-O-$CH_3$ | NH-$C_3H_6$-OH | " |
| 226 | 4-$H_3C$-$O_2S$-3,4-Br$_2$-phenyl | " | " | " | " |
| 227 | 4-($H_5C_2$-O-CO)-phenyl | " | NH-$C_3H_6$-O-$CH_3$ | NH-$C_2H_4$-O-$C_2H_4$-OH | yellow |
| 228 | " | " | NH-$C_3H_6$-O-CH(CH$_3$)$_2$ | NH-$C_2H_4$-OH | " |
| 229 | " | 4-Cl-phenyl | " | $NH_2$ | " |
| 230 | 2-COOCH$_3$-phenyl | phenyl | NH-$C_3H_6$-O-$CH_3$ | NH-$C_2H_4$-O-$C_2H_4$-OH | " |
| 231 | 2-(COO-$C_2H_4$-O-$C_2H_4$-O-$CH_3$)-phenyl | " | " | " | " |
| 232 | $O_2N$-COOCH$_3$-phenyl | " | " | " | scarlet |

| Ex No | D | B | $X^1$ | $X^2$ | Shade of dyeing on polyester |
|---|---|---|---|---|---|
| 233 | $O_2N$-C$_6$H$_3$(COOCH$_3$)- | -C$_6$H$_4$- | $NH-C_3H_6-O-CH(CH_3)_2$ | $NH-C_3H_6-OH$ | scarlet |
| 234 | $O_2N$-C$_6$H$_2$(COOCH$_3$)(Br)- | " | $NH-C_2H_4-O-CH_3$ | $NH-C_2H_4-O-CH_3$ | " |
| 235 | " | " | $NH-C_3H_6-O-C_2H_5$ | $NH-C_3H_6-O-C_2H_5$ | " |
| 236 | " | " | $NH-C_3H_6-O-CH(CH_3)_2$ | $NH-C_3H_6-OH$ | " |
| 237 | " | " | $NH-C_4H_9$ | " | " |
| 238 | " | -C$_6$H$_4$-OCH$_3$ | $NH-C_3H_6-O-CH_3$ | $NH-C_3H_6-O-CH_3$ | " |
| 239 | " | " | " | $NH-C_2H_4-O-C_2H_4-OH$ | " |
| 240 | $O_2N$-C$_6$H$_2$(COOCH$_3$)(Cl)- | -C$_6$H$_4$- | " | $NH-C_3H_6-OH$ | " |
| 241 | $O_2N$-C$_6$H$_2$(COOC$_2$H$_4$-O-CH$_3$)(Cl)- | " | " | " | " |
| 242 | Cl-C$_6$H$_2$(COOC$_3$H$_7$)(Cl)- | -C$_6$H$_4$- | $NH-C_3H_6-O-CH_3$ | $NH-C_3H_6-OH$ | golden yellow |
| 243 | Br-C$_6$H$_2$(COOC$_2$H$_5$)(Br)- | " | " | " | " |
| 244 | $O_2N$-C$_6$H$_2$(COOCH$_3$)(NO$_2$)- | " | " | " | red |
| 245 | " | " | $NH-C_3H_6-OH$ | $NH-C_3H_6-OH$ | " |
| 246 | " | -CH$_3$ | $NH-C_3H_6-O-CH_3$ | " | " |
| 247 | $O_2N$-C$_6$H$_2$(COOC$_2$H$_4$-O-CH$_3$)(NO$_2$)- | -C$_6$H$_4$- | " | " | " |
| 248 | $H_5C_2OOC$-C$_6$H$_3$-COOC$_2$H$_5$ | " | " | $NH-C_2H_4-O-C_2H_4-OH$ | golden yellow |
| 249 | " | " | $NH-C_3H_6-O-CH(CH_3)_2$ | $NH-C_2H_4-OH$ | " |

| Ex No | D | B | $X^1$ | $X^2$ | Shade of dyeing on polyester |
|---|---|---|---|---|---|
| 250 | H₃COOC-⟨⟩-COOCH₃ (with CH₃) | phenyl | NH-C₃H₆-O-CH(CH₃)₂ | NH-C₂H₄-OH | golden yellow |
| 251 | ⟨phthalimide⟩N-C₂H₄-OH | " | " | " | " |
| 252 | " | " | NH-C₃H₆-O-CH₃ | NH-C₃H₆-OH | " |
| 253 | " | " | NH-⟨⟩-OCH₃ | NH-C₂H₄-O-C₂H₄-OH | orange |
| 254 | ⟨thiazole⟩ | " | NH-C₃H₆-O-CH₃ | NH-C₂H₄-OH | " |
| 255 | H₅C₂OOC-⟨thiazole⟩-CH₃ | " | " | " | red |
| 256 | " | " | " | NH-C₂H₄-O-C₂H₄-OH | " |
| 257 | H₃C-OC-⟨thiazole⟩-CH₃ | " | " | " | " |
| 258 | " | " | " | NH-C₂H₄-OH | " |
| 259 | H₃C-S-⟨thiadiazole⟩ | " | " | " | orange |
| 260 | " | " | NH-CH₂-CH(OH)-⟨phenyl⟩ | NH-C₃H₆-OH | " |
| 261 | " | ⟨⟩-CH₃ | NH-C₃H₆-O-C₄H₈-OH | NH-C₃H₆-O-C₄H₈-OH | " |
| 262 | " | ⟨⟩-Cl | " | " | " |
| 263 | H₃COOC-H₄C₂-S-⟨thiazole⟩ | phenyl | NH-C₃H₆-O-CH₃ | NH-C₂H₄-O-C₂H₄-OH | " |
| 264 | " | " | NH-C₃H₆-O-CH(CH₃)₂ | NH-C₂H₄-OH | " |
| 265 | H₅C₂OOC-H₄C₂-S-⟨thiazole⟩ | phenyl | " | " | " |
| 266 | " | " | NH-C₃H₆-O-CH₃ | NH-C₂H₄-O-C₂H₄-OH | " |
| 267 | " | " | NH-C₂H₄-O-CH₃ | NH-C₃H₆-O-C₄H₈-OH | " |

| Ex No | D | B | $X^1$ | $X^2$ | Shade of dyeing on polyester |
|---|---|---|---|---|---|
| 268 | 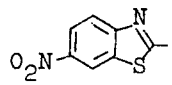 |  | $NH-C_3H_6-O-CH_3$ | $NH-C_2H_4-OH$ | red orange |
| 269 | 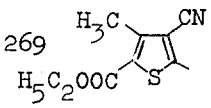 | " | $NH-C_2H_4-O-CH_3$ | $NH-C_2H_4-O-C_2H_4-OH$ | ruby |
| 270 | " | " | $NH-C_3H_6-O-CH_3$ | " | ruby |
| 271 | " | " | " | $NH-C_2H_4-OH$ | " |
| 272 | " | " | $NH-C_3H_6-OCH(CH_3)_2$ | " | " |
| 273 | " | 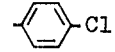-Cl | $NH-C_3H_6-O-CH_3$ | $NH-C_2H_4-O-C_2H_4-OH$ | " |
| 274 | " | " | " | $NH-C_3H_6-OH$ | " |
| 275 | " | 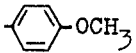-OCH_3 | " | " | " |
| 276 | " | " | " | $NH-C_2H_4-O-C_2H_4-OH$ | " |
| 277 | 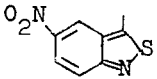 |  | $NH-C_3H_6-O-C_2H_5$ | $NH-C_3H_6-O-C_2H_5$ | blue |
| 278 | " | " | $NH-C_3H_6-O-CH(CH_3)_2$ | $NH-C_3H_6-OH$ | " |
| 279 | " | 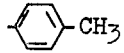-CH_3 | $NH-C_3H_6-O-CH_3$ | $NH-C_3H_6-O-CH_3$ | " |
| 280 | 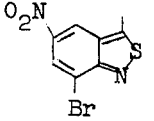 |  | " | $NH-C_2H_4-OH$ | " |
| 281 | " | " | $NH-C_3H_6-O-CH(CH_3)_2$ | " | " |
| 282 | 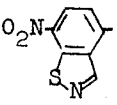 | " | $NH-C_3H_6-O-CH_3$ | $NH-C_3H_6-O-CH_3$ | ruby |
| 283 | " | " | $NH-C_2H_4-O-CH_3$ | $NH-C_3H_6-OH$ | " |
| 284 | " | " | $NH-C_3H_6-O-CH_3$ | " | " |
| 285 | " | " | " | $NH-C_2H_4-OH$ | " |
| 286 | " | " | $NH-C_3H_6-O-CH(CH_3)_2$ | " | " |
| 287 | " | " | $NH-C_3H_6-O-C_2H_5$ | $NH-C_3H_6-OH$ | " |

| Ex No | D | B | $X^1$ | $X^2$ | Shade of dyeing on polyester |
|---|---|---|---|---|---|
| 288 | $O_2N$-[isothiazole fused benzene] | [phenyl]-$CH_3$ | $NH-C_2H_4-O-CH_3$ | $NH-C_2H_4-OH$ | ruby |
| 289 | " | " | $NH-C_3H_6-O-CH_3$ | $NH-C_2H_4-O-C_2H_4-OH$ | " |
| 290 | $O_2N$-[Br-isothiazole fused benzene] | [phenyl] | $NH-C_2H_4-O-CH_3$ | $NH-C_2H_4-O-CH_3$ | violet |
| 291 | " | " | " | $NH-C_3H_6-OH$ | " |
| 292 | " | " | " | $NH-C_2H_4-O-C_2H_4-OH$ | " |
| 293 | " | " | $NH-C_3H_6-O-CH_3$ | " | " |
| 294 | " | " | " | $NH-C_3H_6-OH$ | " |
| 295 | " | " | $NH-C_3H_6-O-CH(CH_3)_2$ | $NH-C_2H_4-OH$ | " |
| 296 | " | " | $NH-C_3H_6-O-C_4H_8-OH$ | $NH-C_3H_6-O-C_4H_8-OH$ | " |
| 297 | [phenyl]-N=N-[phenyl] | " | $NH-C_2H_4-O-CH_3$ | $NH-C_2H_4-OH$ | orange |
| 298 | " | " | " | $NH-C_2H_4-O-C_2H_4OH$ | " |
| 299 | " | " | $NH-C_3H_6-O-CH_3$ | " | " |
| 300 | " | " | " | $NH-C_2H_4-OH$ | " |
| 301 | " | " | $NH-C_3H_6-O-CH(CH_3)_2$ | " | " |
| 302 | [2-CH_3-phenyl]-N=N-[3-CH_3-phenyl] | " | $NH-C_2H_4-O-CH_3$ | " | scarlet |
| 303 | " | " | $NH-C_3H_6-O-CH_3$ | $NH-C_3H_6-OH$ | " |
| 304 | " | [phenyl]-$CH_3$ | $NH-C_3H_6-O-CH(CH_3)_2$ | $NH-C_2H_4-OH$ | " |
| 305 | [3-CH_3-phenyl]-N=N-[3-CH_3-phenyl, N-CH_3] | " | $NH-C_2H_4-O-CH_3$ | " | " |
| 306 | HO-[phenyl]-N=N-[phenyl] | " | " | " | " |
| 307 | [phenyl]-N=N-[2-OCH_3, 5-CH_3, 3-H_3C-phenyl] | " | " | " | red |
| 308 | Cl-[phenyl]-N=N-[2-OCH_3, 5-CH_3, 3-H_3C-phenyl] | " | " | " | " |

| Ex No | D | B | $X^1$ | $X^2$ | Shade of dyeing on polyester |
|---|---|---|---|---|---|
| 309 | $H_3CO-\langle\rangle-N=N-\langle\rangle$ (with $CH_3$ and $H_3C$ substituents) | $-\langle\rangle-CH_3$ | $NH-C_2H_4-O-CH_3$ | $NH-C_2H_4-OH$ | scarlet |
| 310 | $O_2N-\langle\rangle-N=N-\langle\rangle-$ | " | " | " | claret |
| 311 | $-\langle\rangle-N=N-\langle\rangle$ (with $OCH_3$ and $H_3CO$) | " | " | " | ruby |
| 312 | $\langle\rangle-N=N-$ naphthyl with $OC_2H_5$ | " | " | " | violet |
| 313 | anthraquinonyl | $-\langle\rangle$ | " | $NH-C_2H_4-O-C_2H_4-OH$ | brown orange |
| 314 | " | $-\langle\rangle-CH_3$ | " | $NH-C_2H_4-OH$ | " |

DYE MIXTURES:

| Ex No | D | B | $X^1$, $X^2$ | Shade of dyeing on polyester |
|---|---|---|---|---|
| 315 | $O_2N-\langle\rangle-$ with CN | $-\langle\rangle$ | $NH-C_2H_4-O-CH_3$, $NH-C_2H_4-O-C_2H_4-OH$ | scarlet |
| 316 | " | " | $NH-C_2H_4-OH$, $NH-\langle\rangle-CH_3$ | " |
| 317 | " | " | " $NH-\langle\rangle-Cl$ | " |
| 318 | " | " | $NH_2$, $NH-C_2H_4-O-C_2H_4-OH$ | " |
| 319 | " | " | $NH-C_2F_4-O-C_2H_4-OH$, $NH-C_3H_6-O-C_2H_4-O-\langle\rangle$ | " |
| 320 | $O_2N-\langle\rangle-$ with CN and Cl | " | $NH-C_2H_4-O-CH_3$, $NH-C_2H_4-O-C_2H_4-OH$ | red |
| 321 | $O_2N-\langle\rangle-$ with $NO_2$ and Cl | " | $NH-C_3H_6-O-C_2H_5$, $NH-C_2H_4-OH$ | " |
| 322 | " | " | " , $NH-C_3H_6-OH$ | " |
| 323 | $\langle\rangle-$ with CN | $Cl-\langle\rangle-$ | $NH-C_2H_4-O-CH_3$, $NH-C_2H_4-O-C_2H_4-OH$ | yellow |
| 324 | " | $\langle\rangle-$ | $NH-C_3H_6-O-CH_3$, $NH-C_3H_6-OH$ | " |

EXAMPLE 325

12.5 parts of the coupling component obtained according to Example 7 is dissolved in a mixture of 100 parts by volume of formamide and 100 parts by volume of methanol. After 500 parts of ice and 20 parts by volume 10% hydrochloric acid have been added the diazonium salt solution prepared by a conventional method from 9 parts of 2,4-dinitroaniline is poured into the solution of the pyrimidine derivative. The pH of the mixture is kept at from 3 to 4 by adding sodium acetate. After coupling is over the reaction mixture is stirred for another 4 hours. The precipitated dye of the formula:

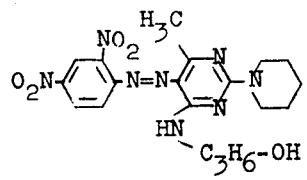

is then filtered off, washed with hot water and dried. A brown powder is obtained which gives deep and fast red shades on polyester materials.

EXAMPLE 326

8 parts of 2-amino-5-nitrobenzonitrile is diazotized for 5 hours in a mixture of 46 parts of concentrated sulfuric acid and 16 parts of nitrosylsulfuric acid. The diazonium salt solution is then added to ice-water and filtered into a mixture of 12.5 parts of 2-diethylamino-4($\beta$-methoxyethylamino-6-methylpyrimidine, 75 parts by volume of N-methylpyrrolidone and 500 parts of ice, the pH being kept at about 4 with sodium acetate. The whole is stirred for a few hours and the dye suspension is then filtered. The azo compound obtained corresponds in its composition to the formula:

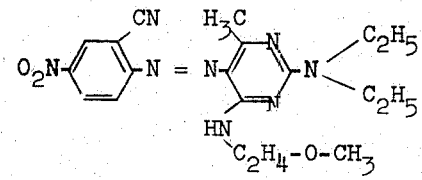

It gives orange shades having good allround fastness properties when dyed on polyethylen glycol terephthalate.

The dyes given in the following Table are prepared by methods described in the foregoing.

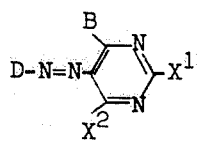

| Ex No | D | B | $X^1$ | $X^2$ | Shade of dyeing on polyester |
|---|---|---|---|---|---|
| 327 | $O_2N-\langle\rangle-$ | $-CH_3$ | $NH-C_3H_6-O-CH_3$ | $NH-C_3H_6-O-CH_3$ | orange |
| 328 | " | " | $N\langle{}^{C_2H_5}_{C_2H_5}$ | " | " |
| 329 | " | " | " | $NH-C_3H_6-O-C_4H_8-OH$ | " |
| 330 | " | " | $N\langle{}^{C_4H_9}_{C_4H_9}$ | $NH-C_3H_6-OH$ | " |
| 331 | $\langle{}^{NO_2}\rangle-$ | " | $NH-C_3H_6-OH$ | " | yellow |
| 332 | $Cl-\langle{}^{NO_2}_{Cl}\rangle-$ | " | $NH-C_3H_6-O-CH_3$ | $NH-C_3H_6-O-CH_3$ | " |
| 333 | $O_2N-\langle\rangle-$ | " | " | " | orange |
| 334 | " | " | $NH-C_2H_5$ | $NH-C_2H_5$ | " |
| 335 | " | " | $N\langle{}^{C_2H_5}_{C_2H_5}$ | $NH-C_2H_4-OH$ | " |
| 336 | " | " | " | $NH-C_3H_6-OH$ | " |
| 337 | " | " | " | $NH-C_2H_4-O-C_2H_4-OH$ | " |
| 338 | " | " | " | $NH-C_6H_{12}-OH$ | " |
| 339 | " | " | $N\langle\rangle$ | $NH-C_2H_4-OH$ | " |
| 340 | " | " | " | $NH-C_3H_6-OH$ | " |
| 341 | " | " | " | $NH-C_3H_6-O-CH_3$ | " |
| 342 | " | $-CH_3$ | $N\langle\rangle$ | $NH-C_2H_4-OH$ | " |
| 343 | " | " | " | $NH-C_2H_4-O-CH_3$ | " |
| 344 | " | " | " | $NH-C_3H_6-O-CH_3$ | " |
| 345 | " | " | $N\langle\rangle O$ | " | " |

| Ex No | D | B | $X^1$ | $X^2$ | Shade of dyeing on polyester |
|---|---|---|---|---|---|
| 346 | $O_2N$-⟨Cl⟩ | $-C_3H_7$ | N⟨piperidine⟩ | $NH-C_3H_6-OH$ | orange |
| 347 | " | $-CH(C_2H_5)-C_4H_9$ | " | " | " |
| 348 | " | ⟨phenyl⟩ | $N(C_2H_5)_2$ | $NH-C_2H_4-O-C_2H_4-OH$ | " |
| 349 | $O_2N$-⟨Br⟩ | $-CH_3$ | " | " | " |
| 350 | " | " | $N(C_4H_9)_2$ | " | " |
| 351 | " | $-C_3H_7$ | " | $NH-C_3H_6-OH$ | " |
| 352 | " | " | N⟨piperidine⟩ | " | " |
| 353 | $O_2N$-⟨CN⟩ | $-CH_3$ | $NH-C_3H_6-O-CH(CH_3)_2$ | $NH-C_3H_6-O-CH(CH_3)_2$ | " |
| 354 | " | " | $N(CH_3)_2$ | $NH-C_3H_6-OH$ | " |
| 355 | " | " | $N(C_2H_5)_2$ | " | " |
| 356 | " | " | " | $NH-C_2H_4-OH$ | " |
| 357 | " | " | " | $NH-C_2H_4-O-C_2H_4-OH$ | " |
| 358 | " | " | " | $NH-C_3H_6-O-C_4H_8-OH$ | " |
| 359 | " | " | " | $NH-C_6H_{12}-OH$ | " |
| 360 | " | " | " | $NH-C_3H_6-N$⟨pyrrolidine⟩ | " |
| 361 | " | " | $N(C_3H_7)_2$ | $NH-C_3H_6-OH$ | " |
| 362 | " | " | $N-(CH_2-CH(CH_3)_2)_2$ | " | " |
| 363 | " | " | $N(C_2H_5)((CH_2)_5-CH_3)$ | $NH-C_3H_6-OH$ | " |
| 364 | " | " | $N-(CH_2-CH(C_2H_5)-C_4H_9)_2$ | " | " |
| 365 | " | " | $N-((CH_2)_5-CH(CH_3)_2)$ | " | " |
| 366 | " | " | N⟨piperidine⟩ | $NH-C_2H_4-OH$ | " |

| Ex No | D | B | $X^1$ | $X^2$ | Shade of dyeing on polyester |
|---|---|---|---|---|---|
| 367 | O$_2$N–C$_6$H$_3$(CN)– | –CH$_3$ | N-piperidyl | NH–C$_3$H$_6$–O–CH$_3$ | orange |
| 368 | " | " | " | NH–C$_3$H$_6$–OH | " |
| 369 | " | " | N-pyrrolidyl | " | " |
| 370 | " | " | " | NH–C$_2$H$_4$–O–C$_2$H$_4$–OH | " |
| 371 | " | " | " | NH–C$_2$H$_4$–O–CH$_3$ | " |
| 372 | " | " | " | NH–C$_3$H$_6$–O–CH$_3$ | " |
| 373 | " | " | " | NH–C$_3$H$_6$–O–C$_4$H$_8$–OH | " |
| 374 | " | " | " | NH–CH$_2$–CH(OH)–C$_6$H$_5$ | " |
| 375 | " | " | N-morpholinyl | NH–C$_3$H$_6$–O–CH$_3$ | " |
| 376 | " | –C$_3$H$_7$ | N-piperidyl | NH–C$_3$H$_6$–OH | " |
| 377 | " | " | N(C$_4$H$_9$)$_2$ | NH–C$_2$H$_4$–O–C$_2$H$_4$–OH | " |
| 378 | " | –CH(C$_2$H$_5$)–C$_4$H$_9$ | N-piperidyl | NH–C$_3$H$_6$–OH | " |
| 379 | " | –C$_6$H$_5$ | N(C$_2$H$_5$)$_2$ | NH–C$_2$H$_4$–O–C$_2$H$_4$–OH | red orange |
| 380 | " | " | " | NH–C$_2$H$_4$–OH | " |
| 381 | " | –CH$_2$–O–C$_2$H$_5$ | " | NH–C$_3$H$_6$–OH | orange |
| 382 | " | –CH$_2$–O–C$_6$H$_5$ | N(C$_2$H$_5$)$_2$ | NH–C$_2$H$_4$–O–C$_2$H$_4$–OH | " |
| 383 | O$_2$N–C$_6$H$_3$(OCH$_3$)– | –CH$_3$ | " | " | " |
| 384 | O$_2$N–C$_6$H$_4$(SO$_2$–CH$_3$)– | " | " | NH–C$_3$H$_6$–OH | scarlet |
| 385 | " | " | N(C$_4$H$_9$)$_2$ | " | " |
| 386 | " | " | " | NH–C$_2$H$_4$–O–C$_2$H$_4$–OH | " |
| 387 | " | " | N(C$_2$H$_5$)((CH$_2$)$_5$–CH$_3$) | NH–C$_3$H$_6$–OH | " |
| 388 | " | " | N-piperidyl | NH–C$_3$H$_6$–O–CH$_3$ | " |

| Ex No | D | B | $X^1$ | $X^2$ | Shade of dyeing on polyester |
|---|---|---|---|---|---|
| 389 | $O_2N$-C$_6$H$_3$(SO$_2$-CH$_3$)- | -CH$_3$ | N(pyrrolidine) | NH-C$_3$H$_6$-O-CH$_3$ | scarlet |
| 390 | " | " | " | NH-C$_3$H$_6$-O-C$_4$H$_8$-OH | " |
| 391 | " | -C$_3$H$_7$ | N(C$_4$H$_9$)$_2$ | NH-C$_2$H$_4$-O-C$_2$H$_4$-OH | " |
| 392 | " | -CH(C$_2$H$_5$)-C$_4$H$_9$ | N(piperidine) | NH-C$_3$H$_6$-OH | " |
| 393 | $O_2N$-C$_6$H$_3$(SO$_2$-N(CH$_3$)$_2$)-CH$_3$ | " | N(C$_2$H$_5$)$_2$ | " | " |
| 394 | 2-CN-C$_6$H$_4$- | " | " | NH-C$_2$H$_4$-O-C$_2$H$_4$-OH | yellow |
| 395 | " | " | " | NH-C$_3$H$_6$-O-C$_4$H$_8$-OH | " |
| 396 | " | " | N(piperidine) | NH-C$_2$H$_4$-O-C$_2$H$_4$-OH | " |
| 397 | " | " | N(pyrrolidine) | NH-CH$_2$-CH(OH)-C$_6$H$_5$ | " |
| 398 | " | -CH(C$_2$H$_5$)-C$_4$H$_9$ | N(piperidine) | NH-C$_3$H$_6$-OH | " |
| 399 | 4-Cl-2-CN-C$_6$H$_3$- | -CH$_3$ | N(C$_2$H$_5$)$_2$ | NH-C$_2$H$_4$-O-C$_2$H$_4$-OH | " |
| 400 | 4-Cl-3-CN-C$_6$H$_3$- | " | " | " | " |
| 401 | 2-Cl-C$_6$H$_4$- | " | " | " | " |
| 402 | 2-CN-3-Cl-5-$O_2N$-C$_6$H$_2$- | " | NH-C$_4$H$_9$ | NH-C$_4$H$_9$ | red |
| 403 | " | " | NH-C$_3$H$_6$-O-CH$_3$ | NH-C$_3$H$_6$-O-CH$_3$ | " |
| 404 | " | " | N(CH$_3$)$_2$ | NH-C$_3$H$_6$-OH | " |
| 405 | " | " | N(C$_2$H$_5$)$_2$ | " | " |
| 406 | " | " | " | NH-C$_2$H$_4$-O-C$_2$H$_4$-OH | " |
| 407 | " | " | " | NH-C$_3$H$_6$-O-C$_4$H$_8$-OH | " |
| 408 | " | " | " | NH-CH$_2$-CH(OH)-C$_6$H$_5$ | " |
| 409 | " | " | N(C$_4$H$_9$)$_2$ | NH-C$_3$H$_6$-OH | " |

| Ex No | D | B | $X^1$ | $X^2$ | Shade of dyeing on polyester |
|---|---|---|---|---|---|
| 410 | $O_2N$-C$_6$H$_3$(CN)(Cl) | $-CH_3$ | $N-[(CH_2)_5-CH(CH_3)_2]$ | $NH-C_3H_6-OH$ | red |
| 411 | " | " | pyrrolidino | " | " |
| 412 | " | " | " | $NH-C_2H_4-O-C_2H_4-OH$ | red |
| 413 | " | " | " | $NH-CH_2-CH(OH)-C_6H_5$ | red |
| 414 | " | " | piperidino | $NH-C_3H_6-OH$ | " |
| 415 | " | $-C_3H_7$ | " | " | " |
| 416 | " | $-CH_2-O-C_2H_5$ | $N(C_2H_5)_2$ | " | " |
| 417 | " | $-CH_2-O-C_6H_5$ | " | $NH-C_2H_4-O-C_2H_4-OH$ | red |
| 418 | $O_2N$-C$_6$H$_3$(CN)(Br) | $-CH_3$ | $NH-C_3H_6-O-CH(CH_3)_2$ | $NH-C_3H_6-O-CH(CH_3)_2$ | red |
| 419 | " | " | $N(C_2H_5)_2$ | $NH-C_3H_6-OH$ | red |
| 420 | " | " | " | $NH-C_2H_4-O-C_2H_4-OH$ | " |
| 421 | " | " | " | $NH-C_6H_{12}-OH$ | " |
| 422 | " | " | $N(C_4H_9)_2$ | $NH-C_3H_6-OH$ | " |
| 423 | " | " | $N(C_2H_5)((CH_2)_5-CH_3)$ | " | " |
| 424 | " | " | pyrrolidino | " | " |
| 425 | " | " | " | $NH-C_2H_4-O-C_2H_4-OH$ | " |
| 426 | " | " | " | $NH-C_3H_6-O-CH_3$ | " |
| 427 | " | " | " | $NH-C_3H_6-O-C_4H_8-OH$ | " |
| 428 | " | " | piperidino | $NH-C_3H_6-OH$ | " |
| 429 | " | " | " | $NH-C_2H_4-O-CH_3$ | " |
| 430 | " | " | " | $NH-C_3H_6-O-CH_3$ | " |
| 431 | " | $-C_3H_7$ | " | $NH-C_3H_6-OH$ | " |
| 432 | " | $-CH-C_4H_9$ | " | " | " |

| Ex No | D | B | $X^1$ | $X^2$ | Shade of dyeing on polyester |
|---|---|---|---|---|---|
| 433 | NC-, NO$_2$, Cl phenyl | -CH$_3$ | N(C$_2$H$_5$)$_2$ | NH-C$_2$H$_4$-O-C$_2$H$_4$-OH | red orange |
| 434 | O$_2$N-, NO$_2$ phenyl | " | N-piperidinyl | NH-C$_3$H$_6$-O-CH$_3$ | red |
| 435 | " | " | N-pyrrolidinyl | NH-C$_2$H$_4$-OH | " |
| 436 | O$_2$N-, NO$_2$, Cl phenyl | " | N(C$_2$H$_5$)$_2$ | NH-C$_2$H$_4$-O-C$_2$H$_4$-OH | " |
| 437 | O$_2$N-, NO$_2$, Br phenyl | " | N(C$_2$H$_5$)$_2$ | NH-C$_2$H$_4$-O-C$_2$H$_4$-OH | " |
| 438 | " | " | N-pyrrolidinyl | NH-C$_3$H$_6$-OH | " |
| 439 | " | " | N-piperidinyl | NH-C$_3$H$_6$-O-CH$_3$ | " |
| 440 | " | " | " | NH-C$_3$H$_6$-OH | " |
| 441 | O$_2$N-, SO$_2$-CH$_3$, Cl phenyl | " | N(C$_2$H$_5$)$_2$ | " | " |
| 442 | " | " | " | NH-C$_3$H$_6$-O-CH$_2$-CH(C$_2$H$_5$)-C$_4$H$_9$ | " |
| 443 | H$_3$C-O$_2$S-, Cl phenyl | " | " | NH-C$_2$H$_4$-O-C$_2$H$_4$-OH | yellow |
| 444 | " | " | " | NH-C$_3$H$_6$-O-C$_2$H$_4$-O-phenyl | " |
| 445 | " | -C$_3$H$_7$ | N-piperidinyl | NH-C$_3$H$_6$-OH | " |
| 446 | H$_5$C$_2$-C(=O)-phenyl | -CH$_3$ | N(C$_2$H$_5$)$_2$ | NH-C$_2$H$_4$-O-C$_2$H$_4$-OH | " |
| 447 | 2-COOC$_2$H$_5$-phenyl | -CH$_3$ | " | " | " |
| 448 | O$_2$N-, COOCH$_3$ phenyl | " | " | " | red orange |
| 449 | O$_2$N-, COOCH$_3$, Br phenyl | " | " | " | scarlet |

| Ex No | D | B | $X^1$ | $X^2$ | Shade of dyeing on polyester |
|---|---|---|---|---|---|
| 450 | $O_2N$-(phenyl with $COO-C_2H_4-OCH_3$ and Cl substituents) | $-CH_3$ | $N(C_2H_5)_2$ | $NH-C_2H_4-O-C_2H_4-OH$ | scarlet |
| 451 | $H_3COOC$-(phenyl)-$COOCH_3$ | " | " | " | yellow |
| 452 | (phthalimide with $N-C_2H_4-OH$) | " | $N(C_2H_5)((CH_2)_5-CH_3)$ | $NH-C_3H_6-OH$ | " |
| 453 | (thiazole) | " | " | " | orange |
| 454 | (thiazole with $H_3C-OC$ and $H_3C$ substituents) | " | $N(C_2H_5)_2$ | " | red orange |
| 455 | " | " | (piperidino) | $NH-C_2H_4-O-C_2H_4-OH$ | " |
| 456 | $H_5C_2OOC-H_4C_2-S$-(thiadiazole) | " | " | " | orange |
| 457 | " | " | $N(C_2H_5)_2$ | $NH-C_3H_6-O-C_4H_8-OH$ | " |
| 458 | " | " | $N(C_3H_7)_2$ | $NH-C_3H_6-OH$ | " |
| 459 | " | $-C_3H_7$ | (piperidino) | " | " |
| 460 | (thiophene with $H_3C$, $CN$, $H_5C_2OOC$ substituents) | $-CH_3$ | $N(C_2H_5)_2$ | $NH-C_2H_4-O-C_2H_4-OH$ | red |
| 461 | " | " | " | $NH-C_3H_6-OH$ | " |
| 462 | " | " | " | $NH-C_3H_6-O-CH_3$ | " |
| 463 | " | " | (piperidino) | $NH-C_2H_4-O-C_2H_4-OH$ | " |
| 464 | $O_2N$-(benzisothiazole) | " | " | " | " |
| 465 | " | " | $N(CH_3)_2$ | $NH-C_3H_6-OH$ | " |
| 466 | " | " | $N(C_2H_5)_2$ | " | " |
| 467 | " | " | " | $NH-C_2H_4-O-C_2H_4-OH$ | " |
| 468 | $O_2N$-(benzisothiazole with Br) | " | " | $NH-C_3H_6-OH$ | violet |

| Ex No | D | B | $X^1$ | $X^2$ | Shade of dyeing on polyester |
|---|---|---|---|---|---|
| 469 | 4-Br, 7-$O_2N$-benzisothiazol-3-yl | $-CH_3$ | $N(C_2H_5)_2$ | $NH-C_2H_4-O-C_2H_4OH$ | violet |
| 470 | " | " | piperidino | " | " |
| 471 | phenyl-N=N-phenyl- | " | " | " | orange |
| 472 | 2-CH₃-phenyl-N=N-2-CH₃-phenyl- | " | " | " | " |
| 473 | 2,3-(CH₃)₂-phenyl-N=N-2-CH₃-phenyl- | " | " | " | " |
| 474 | 4-Cl-phenyl-N=N-2,5-(OCH₃,CH₃)-phenyl- | " | " | " | red |
| 475 | phenyl-N=N-2,5-(OCH₃,CH₃)-phenyl- | " | " | " | " |
| 476 | 4-H₃CO-phenyl-N=N-2,5-(CH₃)₂-phenyl- | " | " | " | scarlet |

EXAMPLE 477

7 parts of the azo dye obtained according to Example 46 is heated to 100°C in a mixture of 100 parts of glacial acetic acid and 50 parts of acetic anhydride for 3 hours. The mixture is then stirred into 800 parts of water and the dye precipitated, which has a composition corresponding to the formula:

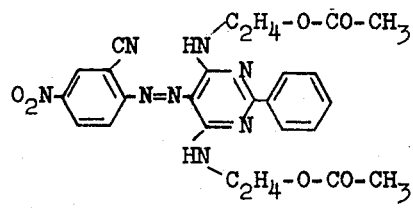

is suction filtered and freed from adherent acetic anhydride by washing with ethanol. The dye dyes polyester material clear yellowish scarlet shades having outstanding fastness properties.

EXAMPLE 478

A solution of 6 parts of the compound of the formula:

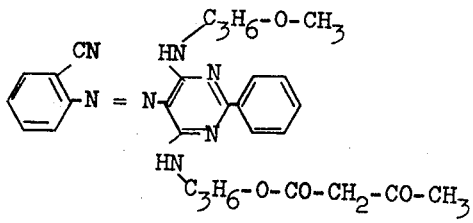

in 50 parts of glacial acetic acid is heated to 80°C and 4 parts of diketene is dripped in. The temperature of the reaction mixture is kept at 80°C for another 2 hours, is then diluted with 500 parts of water and the acylation product is isolated by a conventional method. The dye corresponds in composition to the formula:

It dyes polyethylene glycol terephthalate material fast yellow shades.

EXAMPLE 479

7 parts of the dye of the formula:

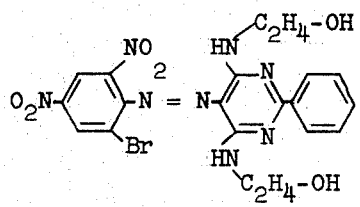

is heated in 100 parts of formic acid at 100°C until according to a thin layer chromatogram complete reaction to the bisformic ester has taken place. After isolation by a conventional method, the dye gives fast red shades when dyed onto polyethylene glycol terephthalate.

EXAMPLE 480

A mixture of 250 parts by volume of the chlorobenzene, 15.2 parts of phenoxyacetic acid, 0.5 parts of p-toluenesulfonic acid and 15.2 parts of the dye specified in Example 428 is heated under reflux for 2 hours. Then to complete the esterification 200 parts by volume of chlorobenzene is distilled off together with the water of reaction in the course of 5 hours. To isolate the dye 500 parts by volume of methanol is added to the residue and the precipitated dye of the formula:

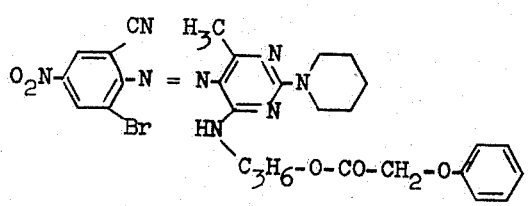

is suction filtered, washed with methanol and dried. The red powder obtained gives fast red shades on polyester cloth.

EXAMPLE 481

4.2 parts of benzoyl chloride is added to a solution of 8.8 parts of the dye of the formula:

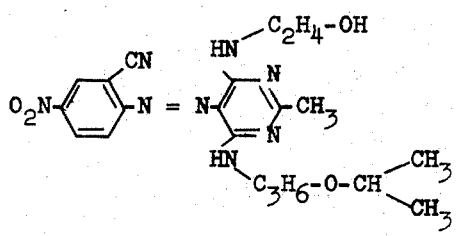

in 50 parts by volume of pyridine and the whole is heated at 60°C until the starting material has been esterified quantitatively. The product is worked up by pouring the acylation mixture into 500 parts by volume of 10% acetic acid. The precipitated dye of the formula:

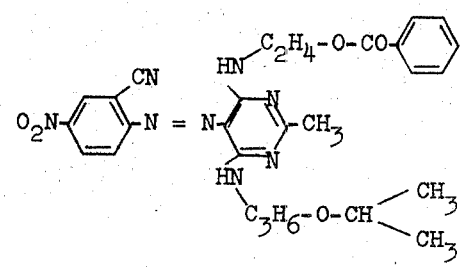

is suction filtered, washed with water and dried. Dyeing with the product on polyester materials gives fast orange shades.

EXAMPLE 482

10.5 parts of ethyl chloroformate is introduced into a solution of 10.5 parts of 2-p-chlorophenyl-4-(γ-hydroxypropylamino)-6-(γ-methoxypropylamino)-pyrimidine in 30 parts by volume of pyridine and the reaction mixture is stirred for 8 hours at room temperature. When the esterification is over the reaction mixture is diluted with 200 parts by volume of methanol and 300 parts of ice-water. The diazonium salt solution of 5 parts of 2-amino-5-nitrobenzonitrile prepared by a conventional method is then added with vigorous stirring and the pH of the coupling mixture is brought to about 3 with sodium acetate. To complete the reaction the whole is stirred for a few hours and the red precipitate is filtered off. Its composition corresponds to the formula:

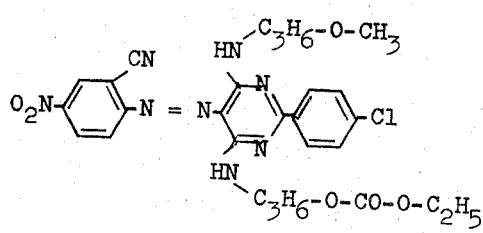

The dye dyes polyethylene glycol terephthalate fibers scarlet shades having very good fastness to light and dry-heat pleating and setting.

EXAMPLE 483

11.6 parts of the azo compound of the formula:

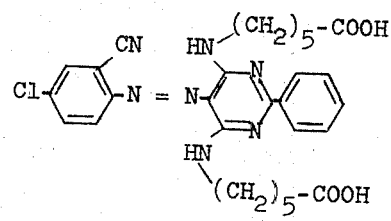

(prepared by a conventional method from diazotized 2-amino-5-chlorobenzonitrile and the reaction product of 2-phenyl-4,6-dichloropyrimidine with the sodium salt of ω-aminocaproic acid) is heated to refluxing temperature with 1 part of p-toluenesulfonic acid in 700 parts by volume of ethanol while slowly distilling off the solvent until esterification is complete. 200 parts of water is then added to the solution and the precipitated dye of the formula:

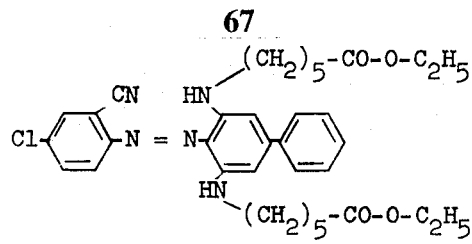

is suction filtered, dried and ground. An orange powder is obtained which gives fast yellow shades on polyester cloth.

The dyes set out in the following Table may also be prepared by the said methods:

| Ex No | Dye | | Shade of dyeing on polyester |
|---|---|---|---|
| 484 | (structure with O₂N-, CN, HN-C₂H₄-O-Y groups on pyrimidine-phenyl) | Y = -CO-H | red orange |
| 485 | (structure with HN-CH₂-CH(OY)-CH₃ groups) | Y = -CO-H | " |
| 486 | " " | " " | Y = -CO-CH₃ | " |
| 487 | " " | " " | Y = -CO-CH₂-CO-CH₃ | " |
| 488 | (structure with HN-C₃H₆-O-CH₃ and HN-C₂H₄-O-Y) | Y = -CO-CH₂-O-C₆H₅ | " |
| 489 | (structure with HN-C₃H₆-O-C₄H₈-O-Y groups) | Y = -CO-H | scarlet |
| 490 | " " | Y = -CO-CH(C₂H₅)-C₄H₉ | " |

| Ex No | Dye | | Shade of dyeing on polyester |
|---|---|---|---|
| 491 | 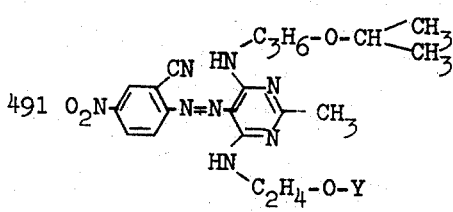 | Y = -CO-H | orange |
| 492 | 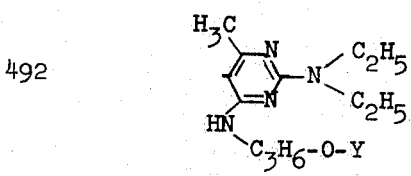 | Y = -CO-H | " |
| 493 | " | " | Y = -CO-C$_2$H$_5$ | " |
| 494 | " | " | Y = -CO-CH$_2$-CO-CH$_3$ | " |
| 495 | " | " | Y = -CO-CH$_2$-CH$_2$-COOH | " |
| 496 | " | " |  | " |
| 497 | " | " |  | " |
| 498 | " | " |  | " |
| 499 | 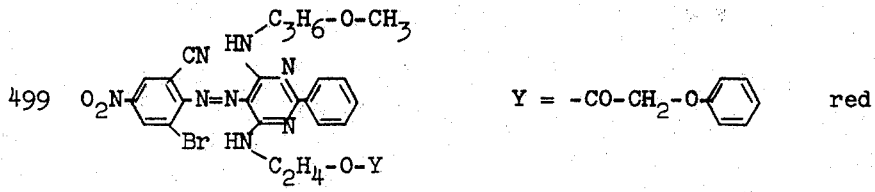 |  | red |
| 500 | " | " | Y = -CO-O-C$_2$H$_5$ | " |
| 501 | " | " | Y = -CO-CH$_2$-CH$_2$-CO-O-C$_2$H$_5$ | red |
| 502 | 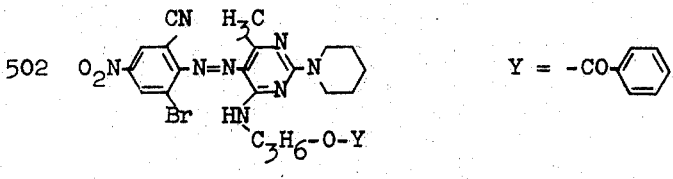 |  | red |
| 503 | " | " | Y = -CO-CH$_2$- ⌬ | red |
| 504 | " | 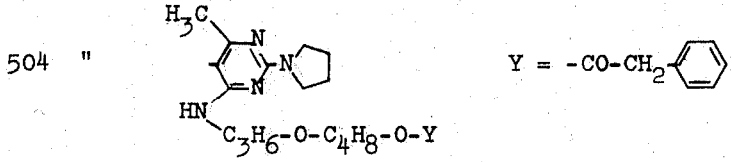 | Y = -CO-CH$_2$- ⌬ | " |

| Ex No | Dye | | Shade of dyeing on polyester |
|---|---|---|---|
| 505 | 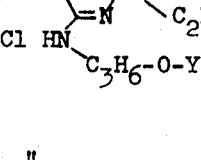 | Y = -CO-CH$_2$-C$_6$H$_5$ | red |
| 506 | " " | Y = -CO-CH$_2$-C$_6$H$_5$ | " |
| 507 | " " | Y = -CO-NH-C$_6$H$_5$ | " |
| 508 |  | Y = -CO-H | " |
| 509 | " " | Y = -CO-CH$_2$-O-C$_6$H$_5$ | " |
| 510 |  | Y = -CO-CH$_2$-O-C$_6$H$_5$ | " |
| 511 |  | Y = -CO-CH$_2$-O-C$_6$H$_5$ | " |
| 512 | 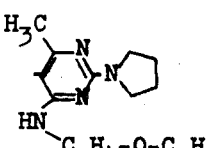 | Y = -CO-H | yellowish red |
| 513 | " " | Y = -CO-CH$_2$-CO-CH$_3$ | " |
| 514 |  | Y = -CO-H | " |
| 515 | " " | Y = -CO-CH$_2$-CO-CH$_3$ | " |
| 516 | " " | Y = -CO-CH$_2$-O-C$_6$H$_5$ | " |

| Ex No | Dye | | Shade of dyeing on polyester |
|---|---|---|---|
| 517 | O₂N–C₆H₄–N=N– pyrimidine with HN-C₂H₄-O-CH₃ and phenyl and HN-C₃H₆-O-Y | Y = –CO–CH₂–O–C₆H₅ | orange |
| 518 | " with H₃C, N(C₄H₉)₂ pyrimidine, HN–C₃H₆–O–Y | Y = " | " |
| 519 | 2-CN–C₆H₄–N=N– pyrimidine with HN–C₃H₆–O–CH₃, phenyl, HN–C₂H₄–O–C₂H₄–O–Y | Y = –CO–H | yellow |
| 520 | " | Y = –CO–CH₃ | " |
| 521 | " | Y = –CO–CH₂–CO–CH₃ | " |
| 522 | " | Y = –CO–CH₂–O–C₆H₅ | " |
| 523 | " | Y = –CO–CH₂–CH₂–CO–O–C₂H₅ | " |
| 524 | 2-CN–C₆H₄–N=N– pyrimidine with H₃C, pyridyl, HN–C₂H₄–O–C₂H₄–O–Y | Y = –CO–CH₂–O–C₆H₅ | yellow |
| 525 | " | Y = –CO–H | " |
| 526 | 4-Cl, 2-CN–C₆H₃–N=N– pyrimidine with HN–C₃H₆–O–Y, phenyl, HN–C₃H₆–O–Y | Y = –CO–H | " |
| 527 | " | Y = –CO–O–C₂H₅ | " |
| 528 | " | Y = –CO–CH₂–CO–CH₃ | " |
| 529 | 2-C₂H₅OOC–C₆H₄–N=N– pyrimidine with HN–C₃H₆–O–CH₃, phenyl, HN–C₂H₄–O–C₂H₄–O–Y | Y = –CO–H | " |

| Ex No | Dye | | Shade of dyeing on polyester |
|---|---|---|---|
| 530 | [thiazole]-N=N-[pyrimidine with HN-C₃H₆-O-CH₃ and HN-C₂H₄-O-Y, phenyl] | Y = -CO-H | orange |
| 531 | H₃C-S-[thiadiazole]-N=N-[pyrimidine with HN-C₃H₆-O-CH₃ and HN-C₂H₄-O-C₂H₄-O-Y, phenyl] | Y = " | " |
| 532 | " " | Y = -CO-CH₂-O-[phenyl] | " |
| 533 | [phenyl]-N=N-[phenyl]-N=N-[pyrimidine with HN-C₂H₄-O-CH₃ and HN-C₂H₄-O-Y, phenyl] | Y = -CO-CH₃ | " |
| 534 | " " | Y = -CO-H | " |
| 535 | Cl-[phenyl-CN]-N=N-[pyrimidine with HN-(CH₂)₅-CO-O-C₂H₄-O-C₂H₄-OH (×2), phenyl] | | yellow |
| 536 | O₂N-[phenyl-CN]-N=N-[pyrimidine with HN-(CH₂)₅-CO-O-C₂H₅ (×2), phenyl] | | scarlet |
| 537 | O₂N-[phenyl-CN]-N=N-[pyrimidine with HN-(CH₂)₅-CO-O-C₂H₄-O-CH₃ (×2), phenyl] | | scarlet |
| 538 | O₂N-[phenyl-CN,Cl]-N=N-[pyrimidine with HN-(CH₂)₅-CO-O-C₂H₄-O-CH₃ (×2), phenyl] | | red |
| 539 | O₂N-[phenyl-CN,Cl]-N=N-[pyrimidine with HN-C₂H₄-CO-O-C₂H₅ (×2), phenyl] | | red |

EXAMPLE 540

31.7 parts of 2-piperidino-4-methyl-6-chloropyrimidine and 20.2 parts of 2-phenylpropylamine-1 are slowly heated to 145°C while stirring; at this temperature the condensation begins which envolves a large amount of heat. The reaction mixture is heated for another 2 hours at 170°C to complete the reaction. After cooling the solidified product which probably has the formula:

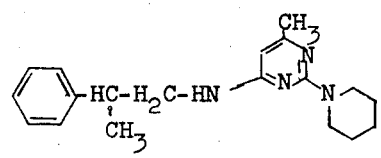

EXAMPLE 541

A solution of 5.9 parts of 2-amino-3-chloro-5-nitrobenzonitrile in 18 parts of concentrated sulfuric acid is cooled to 0°C and 10 parts of nitrosyl sulfuric is added to it. To complete diazotization the mixture is stirred for another 2 hours while cooling well, excess nitrosylsulfuric acid is destroyed and the solution is then added to a mixture of 9.3 parts of the coupling component obtained according to Example 540, 30 parts by volume of 30% acetic acid and 500 parts of ice-water. Excess sulfuric acid is buffered by 200 parts by volume of saturated sodium acetate solution. Coupling is then ended within a short time. After isolation the dye of the formula:

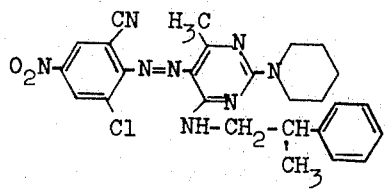

is obtained as a brown powder which produces red shades having outstanding fastness properties when dyed onto polyethylene glycol terephthalate.

EXAMPLE 542

4.5 parts of 2-amino-5-chlorobenzonitrile is diazotized in the usual way in 200 parts of ice-water and 10 parts by volume of concentrated hydrochloric acid with sodium nitrite. The clear diazonium salt solution is then added to 9.3 parts of 2-dimethylamino-4-methyl-6-(3'-phenyl-n-butylamino)-pyrimidine which has been dissolved in 30 parts by volume of acetic acid and 500 parts of ice-water; the pH of the mixture is then raised to about 6. After coupling is ended the deposited dye whose composition corresponds to the formula:

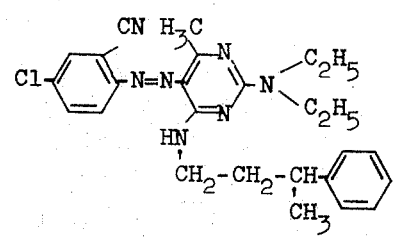

is filtered off, washed with water and dried. A golden yellow powder is obtained which dyes polyester material greenish yellow shades having outstanding fastness to light and dry-heat pleating and setting.

The dyes which are identified by reference to their substituents in the following Table may be obtained by methods analogous to those described above.

| Ex. | D | B | $X^1$ | $X^2$ | Shade of dyeing on polyester |
|---|---|---|---|---|---|
| 543 | $O_2N-C_6H_4-$ | H | $N(C_2H_5)_2$ | $NH-CH_2-CH(C_6H_5)(CH_3)$ | orange |
| 544 | " | $CH_3$ | " | " | " |
| 545 | " | " | " | $NH-CH_2-CH_2-CH(C_6H_5)(CH_3)$ | " |
| 546 | " | " | " | $NH-(CH_2)_3-O-CH_2-C_6H_5$ | " |
| 547 | " | " | " | $NH-CH(CH_3)-CH_2-CH_2-C_6H_4-OH$ | " |
| 548 | " | " | $N(CH_3)_2$ | " | " |
| 549 | " | " | " | $NH-CH_2-CH(C_6H_5)(CH_3)$ | " |
| 550 | " | " | $N(C_3H_7)_2$ | " | " |
| 551 | " | " | $N(C_4H_9)_2$ | " | " |
| 552 | $O_2N-C_6H_4-$ | $-CH_3$ | $N(C_2H_5)((CH_2)_5-CH_3)$ | $NH-CH_2-CH(C_6H_5)(CH_3)$ | " |
| 553 | " | " | $N[CH_2-CH(CH_3)(CH_3)]_2$ | " | " |

| Ex. | D | B | $X^1$ | $X^2$ | Shade of dyeing on polyester |
|---|---|---|---|---|---|
| 554 | $O_2N-\langle\rangle-$ | $-CH_3$ | 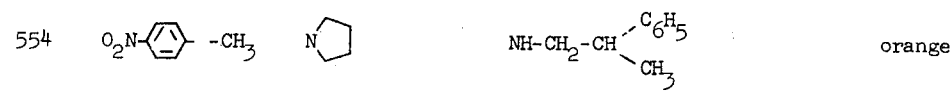 pyrrolidine | $NH-CH_2-CH\begin{smallmatrix}C_6H_5\\CH_3\end{smallmatrix}$ | orange |
| 555 | " | " |  piperidine | " | " |
| 556 | " | " |  morpholine | " | " |
| 557 | " | $-C_3H_7$ | $N(C_2H_5)_2$ | " | " |
| 558 | " | $-CH(C_2H_5)-C_4H_9$ | " | " | " |
| 559 | " | $-C_6H_5$ | " | " | " |
| 560 | 2-$NO_2$-$C_6H_4-$ | $-CH_3$ | $N(C_2H_5)_2$ | $NH-CH_2-CH\begin{smallmatrix}C_6H_5\\CH_3\end{smallmatrix}$ | yellow |
| 561 | 4-Cl-2-$NO_2$-$C_6H_3-$ | " | " | " | " |
| 562 | 3-Cl-4-$O_2N$-$C_6H_3-$ | $-CH_3$ | $N(C_2H_5)_2$ | $NH-CH_2-CH\begin{smallmatrix}C_6H_5\\CH_3\end{smallmatrix}$ | orange |
| 563 | 3-Br-4-$O_2N$-$C_6H_3-$ | " | " | " | " |
| 564 | 3-$OCH_3$-4-$O_2N$-$C_6H_3-$ | " | " | " | " |
| 565 | 3-CN-4-$O_2N$-$C_6H_3-$ | H | " | " | " |
| 566 | " | $-CH_3$ | " | $NH-CH_2-CH_2-CH\begin{smallmatrix}C_6H_5\\CH_3\end{smallmatrix}$ | " |
| 567 | " | " | " | $NH-(CH_2)_3-O-CH_2-C_6H_5$ | " |

| Ex. | D | B | $X^1$ | $X^2$ | Shade of dyeing on polyester |
|---|---|---|---|---|---|
| 568 | $O_2N$–C₆H₃(CN)– | –$CH_3$ | $N(C_2H_5)_2$ | NH–CH(CH$_3$)–CH$_2$–CH$_2$–C$_6$H$_4$–OH | orange |
| 569 | " | " | " | NH–CH(C$_3$H$_7$)–CH$_2$–CH$_2$–C$_6$H$_4$–OH | " |
| 570 | " | " | " | NH–CH(CH$_3$)–CH$_2$–CH$_2$–C$_6$H$_3$(CH$_3$)–OH | " |
| 571 | " | " | $N(CH_3)_2$ | NH–CH(CH$_3$)–CH$_2$–CH$_2$–C$_6$H$_4$–OH | " |
| 572 | " | " | " | NH–CH$_2$–CH(C$_6$H$_5$)(CH$_3$) | " |
| 573 | " | " | $N(C_3H_7)_2$ | " | " |
| 574 | " | " | pyrrolidinyl | " | " |
| 575 | " | " | " | NH–CH(CH$_3$)–CH$_2$–CH$_2$–C$_6$H$_4$–OH | " |
| 576 | " | " | piperidinyl | " | " |
| 577 | " | –$C_3H_7$ | $N(C_2H_5)_2$ | NH–CH$_2$–CH(C$_6$H$_5$)(CH$_3$) | " |
| 578 | $O_2N$–C₆H₃(SO$_2$CH$_3$)– | –$CH_3$ | " | " | red |
| 579 | " | " | " | NH–C$_3$H$_6$–O–CH$_2$–C$_6$H$_5$ | " |
| 580 | " | " | " | NH–CH(CH$_3$)–CH$_2$–CH$_2$–C$_6$H$_4$–OH | " |

| Ex. | D | B | $X^1$ | $X^2$ | Shade of dyeing on polyester |
|---|---|---|---|---|---|
| 581 | $O_2N$-C$_6$H$_3$(SO$_2$CH$_3$)- | -CH$_3$ | pyrrolidino | NH-CH(CH$_3$)-CH$_2$-CH$_2$-C$_6$H$_4$-OH | red |
| 582 | " | " | " | NH-CH$_2$-CH(C$_6$H$_5$)(CH$_3$) | " |
| 583 | $O_2N$-C$_6$H$_3$(SO$_2$CH$_3$)- | -CH$_3$ | piperidino | NH-CH$_2$-CH(C$_6$H$_5$)(CH$_3$) | " |
| 584 | $O_2N$-C$_6$H$_3$(SO$_2$NHC$_4$H$_9$)- | " | $N(C_2H_5)_2$ | " | " |
| 585 | o-CN-C$_6$H$_4$- | H | " | " | yellow |
| 586 | " | -CH$_3$ | " | NH-C$_3$H$_6$-O-CH$_2$-C$_6$H$_5$ | " |
| 587 | " | " | " | NH-CH(CH$_3$)-CH$_2$-CH$_2$-C$_6$H$_4$-OH | " |
| 588 | " | " | $N(CH_3)_2$ | NH-C$_3$H$_6$-O-CH$_2$-C$_6$H$_5$ | yellow |
| 589 | " | " | " | NH-CH$_2$-CH(C$_6$H$_5$)(CH$_3$) | " |
| 590 | " | " | $N(C_3H_7)_2$ | " | " |
| 591 | " | " | piperidino | " | " |
| 592 | " | " | morpholino | " | " |
| 593 | Cl-C$_6$H$_3$(CN)- | " | $N(C_2H_5)$ | NH-CH(CH$_3$)-CH$_2$-CH$_2$-C$_6$H$_4$-OH | " |

| Ex. | D | B | X$^1$ | X$^2$ | Shade of dyeing on polyester |
|---|---|---|---|---|---|
| 594 | Cl-C$_6$H$_3$(CN)- | -CH$_3$ | pyrrolidino | NH-CH$_2$-CH(C$_6$H$_5$)(CH$_3$) | yellow |
| 595 | " | H | N(C$_2$H$_5$)$_2$ | " | " |
| 596 | Cl-C$_6$H$_4$- | -CH$_3$ | pyrrolidino | " | " |
| 597 | O$_2$N-C$_6$H$_2$(CN)(Cl)- | " | N(C$_2$H$_5$)$_2$ | " | red |
| 598 | " | " | " | NH-CH(CH$_3$)-CH$_2$-C$_6$H$_4$-OH | " |
| 599 | " | " | N(CH$_3$)$_2$ | NH-C$_3$H$_6$-O-CH$_2$-C$_6$H$_5$ | " |
| 600 | " | " | N(C$_3$H$_7$)$_2$ | NH-CH$_2$-CH(C$_6$H$_5$)(CH$_3$) | " |
| 601 | " | " | piperidino | " | " |
| 602 | " | -C$_3$H$_7$ | N(C$_2$H$_5$)$_2$ | " | " |
| 603 | O$_2$N-C$_6$H$_2$(CN)(Br)- | -CH$_3$ | " | " | " |
| 604 | " | " | " | NH-CH(CH$_3$)-CH$_2$-CH$_2$-C$_6$H$_4$-OH | " |
| 605 | " | " | pyrrolidino | NH-CH$_2$-CH(C$_6$H$_5$)(CH$_3$) | " |
| 606 | NC-C$_6$H$_2$(NO$_2$)(Cl)- | " | N(C$_2$H$_5$)$_2$ | " | red orange |

| Ex. | D | B | $X^1$ | $X^2$ | Shade of dyeing on polyester |
|---|---|---|---|---|---|
| 607 | 3-NO₂, 4-O₂N-phenyl | -CH₃ | N(C₂H₅)₂ | NH-CH₂-CH(C₆H₅)(CH₃) | red |
| 608 | " | " | piperidino | " | " |
| 609 | 3,5-dinitro-2-Cl-phenyl | " | " | " | " |
| 610 | 3,5-dinitro-2-Br-phenyl | " | " | " | " |
| 611 | 4-O₂N-2-SO₂CH₃-6-Cl-phenyl | " | N(C₂H₅)₂ | " | " |
| 612 | 4-(H₃C-O₂S)-2-Cl-phenyl | " | " | " | yellow |
| 613 | 4-(H₅C₂OOC)-phenyl | " | " | " | " |
| 614 | 2-(COOCH₃)-phenyl | " | " | " | " |
| 615 | 5-O₂N-2-(COOCH₃)-phenyl | " | " | " | red orange |
| 616 | 2-CH₃-3,6-bis(H₅C₂OOC)-phenyl (H₅C₂OOC—⟨⟩—COOC₂H₅ with CH₃) | " | " | " | yellow |
| 617 | 8-methyl-2-(2-hydroxyethyl)-1,3-dioxo-isoindoline (N-C₂H₄-OH) | " | " | " | " |
| 618 | thiazol-2-yl | " | " | " | orange |
| 619 | 4-(H₃C-OC)-5-CH₃-thiazol-2-yl | " | " | " | red orange |
| 620 | 5-(H₅C₂OOC-H₄C₂-)-4-CH₃-thiazol-2-yl | " | " | " | orange |

| Ex. | D | B | $x^1$ | $x^2$ | Shade of dyeing on polyester |
|---|---|---|---|---|---|
| 621 | $H_5C_2OOC$-[thiophene with $H_3C$, CN]- | $CH_3$ | $N(C_2H_5)_2$ | $NH-CH_2-CH(C_6H_5)(CH_3)$ | red |
| 622 | $O_2N$-[benzothiazole]- | " | " | " | " |
| 623 | " | " | $N(C_3H_7)_2$ | " | " |
| 624 | " | " | $N(CH_3)_2$ | $NH-C_3H_6-O-CH_2-C_6H_5$ | " |
| 625 | $O_2N$-[Br-benzothiazole]- | " | $N(C_2H_5)_2$ | $NH-CH_2-CH(C_6H_5)(CH_3)$ | violet |
| 626 | " | " | piperidino | " | " |
| 627 | $C_6H_5-N=N-C_6H_4-$ | " | $N(C_2H_5)_2$ | $NH-CH_2-CH(C_6H_5)(CH_3)$ | orange |
| 628 | " | " | " | $NH-CH_2-CH_2-CH(C_6H_5)(CH_3)$ | " |
| 629 | " | " | " | $NH-C_3H_6-O-CH_2-C_6H_5$ | " |
| 630 | [2-CH$_3$-C$_6$H$_4$]-N=N-[2-CH$_3$-C$_6$H$_3$]- | " | " | $NH-CH_2-CH(C_6H_5)(CH_3)$ | " |
| 631 | [2-CH$_3$-C$_6$H$_4$]-N=N-[2-CH$_3$-C$_6$H$_3$]- | " | " | " | " |
| 632 | Cl-C$_6$H$_4$-N=N-[2-OCH$_3$, 5-CH$_3$-C$_6$H$_2$]- | " | " | " | red |

EXAMPLE 633

A solution of 10.1 parts of triethylamine, 13.5 parts of 2-phenylpropylamine-1 and 22.5 parts of 2-phenyl-4,6-dichloropyrimidine in 50 parts by volume of ethanol is boiled for 4 hours. Quantitative reaction to the pyrimidine derivative of the formula:

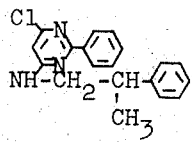

takes place. The reaction mixture is worked up by adding it to 400 parts by volume of water; the product separated as an oil which crystallizes throughout after a short time and is isolated by filtration. The yield is 30 parts.

16 parts of the compound thus obtained is heated with 12 parts of monoethanolamine at 160°C until a thin-layer chromatogram shows quantitative reaction to have taken place. The mixture is then introduced into 200 parts by volume of water and the oily diaminopyrimidine of the formula:

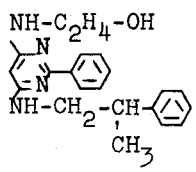

formed is separated by decanting the aqueous phase. The product may be used immediately for coupling after it has been dissolved in formamide.

EXAMPLE 634

5.9 parts of o-aminobenzonitrile is dissolved in 150 parts by volume of water and 15 parts of volume of concentrated hydrochloric acid and then after 150 parts of iced has been added diazotization is carried out in the usual way with sodium nitrite. The diazonium salt solution obtained is clarified and added at 0°to 5°C to a solution of the pyrimidine derivative obtained according to Example 633 in 200 parts by volume of formamide and 500 parts of ice-water. The pH is then raised to 4 to 5 and the mixture is stirred with efficient cooling until coupling is over. The isolated dye whose composition corresponds to the formula:

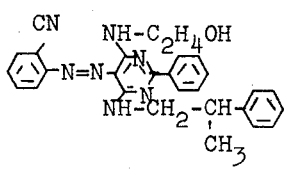

dyes polyester cloth fast yellow shades.

EXAMPLE 635

9.5 parts of the dye from Example 634 is heated in 100 parts of formic acid at 100°C until complete esterification has taken place according to a thin-layer chromatogram. To isolate the dye of the formula:

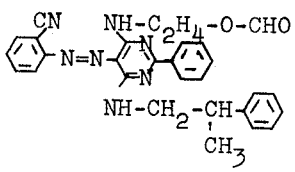

the reaction mixture is diluted with 500 parts by volume of water and the precipitate is filtered off, dried and ground. A golden yellow powder is obtained which gives fast yellow shades when dyed onto polyester materials.

EXAMPLE 636

8 parts of 2-amino-5-nitrobenzonitrile is diazotized during five hours in a mixture of 46 parts of concentrated sulfuric acid and 16 parts of nitroxylsulfuric acid. The diazonium salt solution is then added in portions to a mixture of 19.6 parts of 2-phenyl-4-β-methoxyethylamino-6-γ-benzyloxypropylaminopyrimidine, 100 parts by volume of 30% acetic acid and 500 parts by volume of ice-water and a pH of from 2 to 3 is maintained by adding sodium acetate. When coupling is over the deposited dye of the formula:

is filtered off, washed with water and dried. When it is used for dyeing polyethylene glycol terephthalate fibers scarlet shades are obtained having outstanding fastness to light and dry-heat pleating and setting.

EXAMPLE 637

A diazonium salt solution prepared at 0°C by reaction of 9 parts of 2,4-dinitroaniline with 16 parts of nitrosylsulfuric acid in 30 parts of concentrated sulfuric acid is added in portions to a mixture of 19 parts of 2-phenyl-4-hydroxyethylamino-6-γ-benzyloxypropylaminopyrimidine, 100 parts by volume of 30% acetic acid and 500 parts by volume of ice-water, the pH of the solution being kept at from 1 to 2. When coupling is over the dye of the formula:

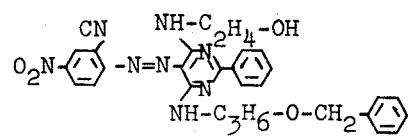

is isolated by a conventional method. A red brown powder is obtained which dyes polyester materials fast red shades.

EXAMPLE 638

A solution of 11.5 parts of the dye obtained in the preceding Example in 50 parts of pyridine has 4 parts of acetyl chloride added to it and is heated at 50°C until esterification is ended as shown by thin-layer chromatography. The reaction mixture is then added to 500 parts by volume of ice-water and the deposited dye of the formula:

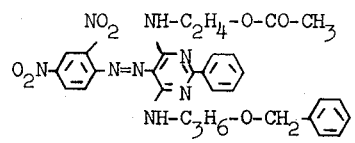

is filtered off, washed with water, dried and ground. A red powder is obtained which gives fast red shades on polyester cloth.

The methods described in the foregoing Examples may also be used for the production of the dyes given in the following Table:

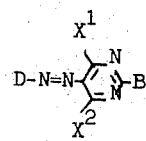
| Ex. No. | D | B | $X^1$ | $X^2$ | Shade |
|---|---|---|---|---|---|
| 639 | $O_2N-$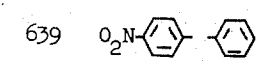 | 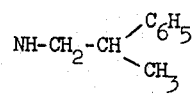 | $NH-CH_2-CH\begin{smallmatrix}C_6H_5\\CH_3\end{smallmatrix}$ | $NH-C_2H_4-OH$ | orange |
| 640 | " | " | " | $NH-C_3H_6-OH$ | " |
| 641 | " | " | " | $NH-C_3H_6-O-CH_3$ | " |
| 642 | " | " | " | $NH-C_2H_5$ | " |
| 643 | " | " | $NH-CH_2-CH_2-CH\begin{smallmatrix}C_6H_5\\CH_3\end{smallmatrix}$ | $NH-C_2H_4-O-CH_3$ | " |
| 644 | " | " | $NH-C_3H_6-O-CH_2-C_6H_5$ | $NH-C_2H_4-O-CH_3$ | " |
| 645 | " | " | $NH-CH-CH_2-CH_2-$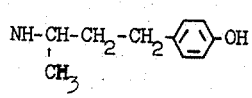$-OH$ with $CH_3$ | " | " |
| 646 | " | 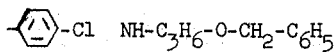$-Cl$ | $NH-C_3H_6-O-CH_2-C_6H_5$ | " | " |

| Ex. No. | D | B | $X^1$ | $X^2$ | Shade |
|---|---|---|---|---|---|
| 647 | $O_2N-\langle\bigcirc\rangle-$ | $\langle\bigcirc\rangle-CH_3$ | $NH-C_3H_6-O-CH_2-C_6H_5$ | $NH-C_2H_4-O-CH_3$ | orange |
| 648 | " | $\langle\bigcirc\rangle-OCH_3$ | " | " | " |
| 649 | " | $-CH_3$ | $NH-CH_2-CH\begin{smallmatrix}C_6H_5\\CH_3\end{smallmatrix}$ | $NH-C_2H_4-O-CH_3$ | yellow |
| 650 | " | " | " | $NH-C_2H_4-OH$ | " |
| 651 | " | $-CH\begin{smallmatrix}CH_3\\CH_3\end{smallmatrix}$ | " | " | " |
| 652 | " | " | " | $NH-C_3H_6-OH$ | " |
| 653 | " | " | " | $NH-C_2H_5$ | " |
| 654 | " | $-C_4H_9$ | " | $NH-C_2H_4-OH$ | " |
| 655 | $\begin{smallmatrix}NO_2\\\langle\bigcirc\rangle\end{smallmatrix}$ | $-\langle\bigcirc\rangle$ | $NH-C_3H_6-O-CH_2-C_6H_5$ | $NH-C_2H_4-O-CH_3$ | golden yellow |
| 656 | $Cl-\langle\bigcirc\rangle^{NO_2}$ | " | " | " | " |
| 657 | $O_2N-\langle\bigcirc\rangle^{Cl}$ | " | " | $NH_2$ | " |
| 658 | " | " | " | $NH-C_2H_4-O-CH_3$ | orange |
| 659 | " | " | $NH-CH_2-CH\begin{smallmatrix}C_6H_5\\CH_3\end{smallmatrix}$ | " | " |
| 660 | " | $-\langle\bigcirc\rangle$ | " | $NH-C_2H_4-OH$ | " |
| 661 | " | " | " | $NH-C_2H_4-O-C_2H_9-OH$ | " |

| Ex. No. | D | B | $x^1$ | $x^2$ | Shade |
|---|---|---|---|---|---|
| 662 | $O_2N$-⟨Cl⟩ | -⟨⟩ | NH-CH$_2$-CH(C$_6$H$_5$)(CH$_3$) | NH-C$_3$H$_6$-O-C$_2$H$_5$ | orange |
| 663 | $O_2N$-⟨Br⟩ | " | " | NH-C$_2$H$_4$-OH | scarlet |
| 664 | " | " | " | NH-C$_2$H$_4$-O-CH$_3$ | " |
| 665 | " | " | NH-CH(CH$_3$)-CH$_2$-CH$_2$-⟨⟩-OH | " | " |
| 666 | " | ⟨⟩-Cl | NH-CH$_2$-CH(C$_6$H$_5$)(CH$_3$) | NH-C$_3$H$_6$-OH | " |
| 667 | " | -CH$_3$ | " | " | orange |
| 668 | " | -CH(CH$_3$)$_2$ | " | " | " |
| 669 | " | ⟨H⟩ | " | " | " |
| 670 | $O_2N$-⟨CN⟩ | " | " | " | scarlett |
| 671 | " | " | " | NH-C$_2$H$_4$-OH | " |
| 672 | " | " | " | NH-C$_2$H$_4$-O-C$_2$H$_4$-OH | " |
| 673 | " | " | " | NH-C$_3$H$_6$-O-CH$_3$ | " |
| 674 | " | " | " | NH-C$_2$H$_5$ | " |
| 675 | " | " | " | NH$_2$ | orange |

| Ex. No. | D | B | $x^1$ | $x^2$ | Shade |
|---|---|---|---|---|---|
| 676 | $O_2N$-C$_6$H$_3$(CN)- | -C$_6$H$_5$ | NH-CH(CH$_3$)-CH$_2$-CH$_2$-C$_6$H$_4$-OH | NH-C$_2$H$_4$-O-CH$_3$ | scarlet |
| 677 | " | " | " | NH-C$_3$H$_6$-O-CH$_3$ | " |
| 678 | " | " | NH-C$_3$H$_6$-O-CH$_2$-C$_6$H$_5$ | NH-C$_2$H$_4$-OH | " |
| 679 | " | -C$_6$H$_4$-CH$_3$ | " | " | " |
| 680 | " | " | NH-CH$_2$-CH(C$_6$H$_5$)(CH$_3$) | " | " |
| 681 | " | -C$_6$H$_4$-Cl | " | NH-C$_3$H$_6$-OH | " |
| 682 | " | " | NH-C$_3$H$_6$-O-CH$_2$-C$_6$H$_5$ | NH-C$_2$H$_4$-O-CH$_3$ | " |
| 683 | " | -C$_6$H$_4$-OCH$_3$ | NH-CH$_2$-CH(C$_6$H$_5$)(CH$_3$) | NH-C$_2$H$_4$-OH | scarlet |
| 684 | " | H | " | " | orange |
| 685 | " | -CH$_3$ | " | " | " |
| 686 | " | -CH(CH$_3$)$_2$ | " | " | " |
| 687 | " | " | " | NH-C$_3$H$_6$-OH | " |
| 688 | " | " | " | NH-C$_2$H$_4$-O-CH$_3$ | " |
| 689 | " | -C$_4$H$_9$ | " | NH-C$_2$H$_4$-OH | " |

| Ex. No. | D | B | $X^1$ | $X^2$ | Shade |
|---|---|---|---|---|---|
| 690 | $O_2N$-(phenyl with CN) | -H | $NH-CH_2-CH(C_6H_5)(CH_3)$ | $NH-C_3H_6-OH$ | orange |
| 691 | " | $-CH_2-C_6H_5$ | " | " | " |
| 692 | " | $-CH_2-O-C_2H_5$ | " | " | " |
| 693 | $O_2N$-(phenyl with $OCH_3$) | phenyl | " | $NH-C_2H_4-OH$ | scarlet |
| 694 | " | " | $NH-CH(CH_3)-CH_2-CH_2-OH$ | $NH-C_3H_6-O-CH_3$ | " |
| 695 | $O_2N$-(phenyl with $CH_3$) | phenyl | $NH-CH_2-CH(C_6H_5)(CH_3)$ | $NH-C_2H_4-OH$ | orange |
| 696 | $O_2N$-(phenyl with $SO_2CH_3$) | " | " | " | red |
| 697 | " | " | " | $NH-C_3H_6-O-CH_2$ | " |
| 698 | " | " | $NH-C_3H_6-O-CH_2-C_6H_5$ | $NH-C_2H_4-O-CH_3$ | " |
| 699 | " | phenyl-$CH_3$ | $NH-CH_2-CH(C_6H_5)(CH_3)$ | $NH-C_3H_6-OH$ | " |
| 700 | " | $-CH(CH_3)_2$ | " | " | scarlet |
| 701 | $O_2N$-(phenyl with $SO_2NHC_4H_9$) | " | " | " | red |
| 702 | $O_2N$-(phenyl with $SO_2NHC_2H_4OCH_3$) | " | " | " | " |

| Ex. No. | D | B | $X^1$ | $X^2$ | Shade |
|---|---|---|---|---|---|
| 703 | 2-CN-C6H4- | C6H5- | NH-CH2-CH(C6H5)(CH3) | NH-C3H6-OH | yellow |
| 704 | " | " | " | NH-C2H4-O-C2H4-OH | " |
| 705 | " | " | " | NH2 | " |
| 706 | " | " | " | NH-C2H5 | " |
| 707 | " | " | NH-C3H6-O-CH2-C6H5 | NH-C3H6-OH | " |
| 708 | " | " | NH-C3H6-O-C2H4-C6H5 | NH-C2H4-O-CH3 | " |
| 709 | " | 4-Cl-C6H4- | NH-C3H6-O-CH2-C6H5 | " | " |
| 710 | " | " | NH-CH2-CH(C6H5)(CH3) | NH-C3H6-OH | " |
| 711 | " | " | NH-CH-CH2-CH2-C6H4-OH | NH-C2H4-O-CH3 | " |
| 712 | " | 4-CH3-C6H4- | NH-CH2-CH(C6H5)(CH3) | NH-C2H4-OH | " |
| 713 | 4-Cl-2-CN-C6H3- | C6H5- | " | NH-C2H5 | " |
| 714 | " | " | " | NH-C2H4-OH | " |
| 715 | " | " | " | NH-C3H6-OH | " |
| 716 | " | " | " | NH-C2H4-O-CH3 | " |

| Ex. No. | D | B | $X^1$ | $X^2$ | Shade |
|---|---|---|---|---|---|
| 717 | Cl–⟨⟩–CN (2-CN, Cl) | –C$_6$H$_5$ | NH-CH$_2$-CH$_2$-CH(C$_6$H$_5$)(CH$_3$) | NH-C$_2$H$_4$-O-CH$_3$ | yellow |
| 718 | " | " | NH-C$_3$H$_6$-O-C$_2$H$_4$-C$_6$H$_5$ | " | " |
| 719 | " | " | NH-C$_3$H$_6$-O-CH$_2$-C$_6$H$_5$ | NH-C$_2$H$_4$-OH | " |
| 720 | " | " | NH-CH(CH$_3$)-CH$_2$-CH$_2$-⟨⟩-OH | NH-C$_2$H$_4$-O-CH$_3$ | " |
| 721 | " | " | " | NH-C$_3$H$_6$-O-CH$_3$ | " |
| 722 | " | " | NH-CH(CH$_3$)-CH$_2$-CH$_2$-⟨⟩(CH$_3$)-OH | NH-C$_2$H$_4$-O-CH$_3$ | " |
| 723 | " | ⟨⟩-CH$_3$ | NH-CH$_2$-CH(C$_6$H$_5$)(CH$_3$) | NH-C$_2$H$_4$-OH | " |
| 724 | " | ⟨⟩-O-CH$_3$ | " | " | " |
| 725 | " | ⟨⟩-Cl | " | " | " |
| 726 | " | " | " | NH-C$_3$H$_6$-OH | " |
| 727 | " | -H | " | NH-C$_2$H$_4$-OH | " |
| 728 | " | -CH$_3$ | " | " | " |
| 729 | " | -CH(CH$_3$)$_2$ | " | " | " |
| 730 | " | ⟨H⟩ (cyclohexyl) | " | NH-C$_3$H$_6$-OH | " |

| Ex. No. | D | B | $X^1$ | $X^2$ | Shade |
|---|---|---|---|---|---|
| 731 | 2-Cl, 6-CN phenyl | $-CH_2-C_6H_5$ | $NH-CH_2-CH(C_6H_5)-CH_3$ | $NH-C_3H_6-OH$ | yellow |
| 732 | " | $-CH_2-O-C_2H_5$ | " | " | " |
| 733 | 2-Cl, 4-CN phenyl | phenyl | $NH-C_3H_6-O-CH_2-C_6H_5$ | $NH-C_2H_4-OH$ | " |
| 734 | 2-Cl phenyl | " | " | " | " |
| 735 | 2,4-diCl phenyl | " | " | " | " |
| 736 | 3-Cl, 4-NO$_2$, 6-CN phenyl (?) 3-CN, 4-Cl, 6-NO$_2$ | " | " | " | red |
| 737 | " | " | $NH-CH_2-CH(C_6H_5)-CH_3$ | " | " |
| 738 | " | " | " | $NH-C_3H_6-O-CH_3$ | " |
| 739 | 3-CN, 4-Cl, 6-NO$_2$, with -OCH$_3$ on B | $-C_6H_4-OCH_3$ | " | $NH-C_2H_4-OH$ | " |
| 740 | 3-CN, 4-Br, 6-NO$_2$ phenyl | phenyl | $NH-CH_2-CH(C_6H_5)-CH_3$ | " | " |
| 741 | " | " | $NH-C_3H_6-O-CH_2-C_6H_5$ | " | " |
| 742 | 2-CN, 3-NO$_2$, 6-Cl phenyl | " | " | " | " |
| 743 | 2,4-diNO$_2$ phenyl | " | " | $NH-C_3H_6-OH$ | " |

| Ex. No. | D | B | $X^1$ | $X^2$ | Shade |
|---|---|---|---|---|---|
| 744 | 4-$O_2N$-2-$NO_2$-phenyl | -CH(CH$_3$)$_2$ | NH-CH$_2$-CH(C$_6$H$_5$)CH$_3$ | NH-C$_2$H$_4$-OH | red orange |
| 745 | 4-$O_2N$-2-$NO_2$-6-Cl-phenyl | C$_6$H$_5$ | " | NH-C$_3$H$_6$-OH | red |
| 746 | 4-$O_2N$-2-$NO_2$-6-Br-phenyl | " | " | " | " |
| 747 | 4-$O_2N$-2-Cl-6-Br-phenyl | " | " | " | red orange |
| 748 | 4-$O_2N$-2-$SO_2C_2H_5$-phenyl | " | " | " | red |
| 749 | 4-$O_2N$-2-$SO_2CH_3$-6-Cl-phenyl | " | " | " | " |
| 750 | 4-$H_3CO_2S$-2-Cl-phenyl | C$_6$H$_5$ | NH-CH$_2$-CH(C$_6$H$_5$)CH$_3$ | NH-C$_3$H$_6$-OH | golden yellow |
| 751 | " | " | NH-C$_3$H$_6$-O-CH$_2$-C$_6$H$_5$ | NH-C$_2$H$_4$-OH | " |
| 752 | " | " | NH-CH(CH$_3$)-CH$_2$-CH$_2$-C$_6$H$_4$-OH | NH-C$_2$H$_4$-O-CH$_3$ | " |
| 753 | " | -CH$_3$ | NH-CH$_2$-CH(C$_6$H$_5$)CH$_3$ | NH-C$_2$H$_4$OH | yellow |
| 754 | " | -CH(CH$_3$)$_2$ | " | " | " |
| 755 | " | -CH$_2$-C$_6$H$_5$ | " | NH-C$_3$H$_6$-OH | " |
| 756 | 4-$H_5C_2OOC$-phenyl | C$_6$H$_5$ | " | NH-C$_2$H$_4$-OH | " |
| 757 | 2-$COOCH_3$-phenyl | C$_6$H$_5$ | NH-CH$_2$-CH(C$_6$H$_5$)CH$_3$ | NH-C$_2$H$_4$-OH | yellow |

| Ex. No. | D | B | $X^1$ | $X^2$ | Shade |
|---|---|---|---|---|---|
| 758 | $O_2N$-C₆H₃(COOCH₃)(CH₃)- | " | " | " | scarlet |
| 759 | " | " | NH-C₃H₆-O-CH₂-C₆H₅ | " | " |
| 760 | " | " | " | NH-C₂H₄-O-CH₃ | " |
| 761 | $O_2N$-C₆H₂(COOC₂H₄-O-CH₃)(Cl)- | " | NH-CH₂-CH(C₆H₅)(CH₃) | NH-C₂H₄-OH | " |
| 762 | Cl-C₆H₃(COOC₃H₇)(Cl)- | " | " | " | golden yellow |
| 763 | $O_2N$-C₆H₂(NO₂)(COOCH₃)- | " | " | " | red |
| 764 | H₅C₂OOC-C₆H₃(CH₃)-COOC₂H₅ | " | " | " | golden yellow |
| 765 | " | " | NH-C₃H₆-O-CH₂-C₆H₅ | " | " |
| 766 | (8-methyl-isoquinoline-1,4-dione-N-C₂H₄-OH) | " | " | " | " |
| 767 | " | " | NH-CH₂-CH(C₆H₅)(CH₃) | " | " |
| 768 | " | C₆H₄-Cl | NH-C₃H₆-O-CH₂-C₆H₅ | NH-C₂H₄-O-CH₃ | " |
| 769 | H₅C₂OOC-H₄C₂-S-(thiadiazolyl-CH₃) | " | NH-CH₂-CH(C₆H₅)(CH₃) | NH-C₂H₄-OH | orange |
| 770 | H₅C₂OOC-(thiophene-CH₃,CN,CH₃)- | C₆H₅ | NH-CH₂-CH(C₆H₅)(CH₃) | NH-C₂H₄-OH | ruby |
| 771 | $O_2N$-benzothiazolyl- | C₆H₅ | " | " | " |
| 772 | $O_2N$-(methyl-benzothiazolyl)- | " | " | " | blue |
| 773 | C₆H₅-N=N-C₆H₄- | " | " | " | orange |
| 774 | " | " | " | NH-C₂H₅-O-CH₃ | " |
| 775 | " | -CH₃ | " | NH-C₂H₄-OH | " |
| 776 | (2-CH₃-C₆H₄)-N=N-(2-CH₃-C₆H₃)- | " | " | " | " |
| 777 | (CH₃-C₆H₄)-N=N-(CH₃-C₆H₄)- | " | " | " | " |

| Ex.No. | Dye | Radical | Shade |
|---|---|---|---|
| 778 | 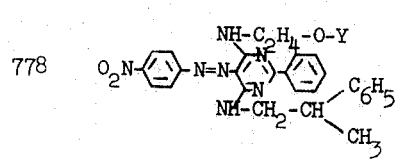 | Y= -CO-H | orange |
| 779 | " | Y = CO-CH₃ | " |
| 780 | 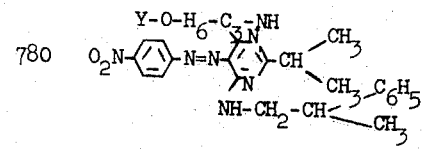 | Y= -CO-CH₃ | yellow |
| 781 | " | Y= -COCH₂COCH₃ | " |
| 782 | 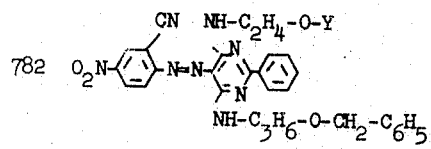 | Y= -CO-CH₃ | scarlet |
| 783 | 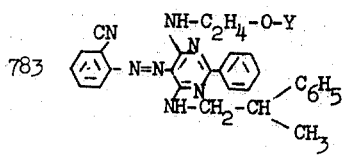 | Y= -CO-CH₃ | yellow |
| 784 | " | Y= -CO-C₂H₅ | " |
| 785 | 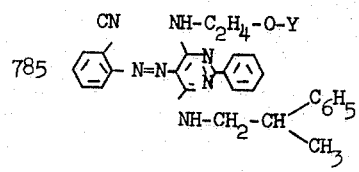 | Y= -CO-C₆H₅ | " |
| 786 | " | Y= COC₂H₄-COOC₂H₅ | " |
| 787 | " | Y= -COCH₂COCH₃ | " |
| 788 | 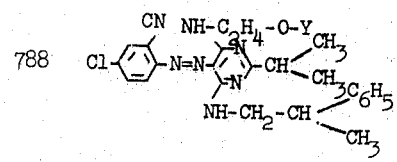 | Y= -CO-H | " |
| 789 | " | Y= -CO-CH₂-O-C₆H₅ | " |

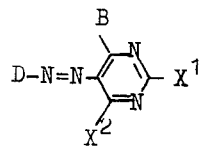

| Example | D | B | X¹ | X² | Shade |
|---|---|---|---|---|---|
| 790 | O₂N-C₆H₄- | H | N(C₂H₅)₂ | NH-CH(CH₃)-(CH₂)₂-C(CH₃)₂-OH | orange |
| 791 | " | " | " | NH-(CH₂)₃-O-C₂H₄-O-CH₂-C₆H₅ | " |
| 792 | " | -CH₃ | N(CH₃)₂ | " | " |
| 793 | " | " | N(C₂H₅)₂ | " | " |
| 794 | " | " | " | NH-CH(CH₃)-(CH₂)₂-C(CH₃)₂-OH (with extra CH₃) | " |
| 795 | " | " | " | NH-(CH₂)₃-O-(CH₂)₆-OH | " |
| 796 | " | " | " | NH-(CH₂)₃-O-C₆H₁₁ | " |
| 797 | " | " | " | NH-(CH₂)₅-OH | " |
| 798 | " | " | N(C₃H₇)₂ | NH-(CH₂)₃-O-C₂H₄-O-CH₂-C₆H₅ | " |
| 799 | " | " | N(C₄H₉)₂ | " | " |
| 800 | " | " | morpholino | " | " |
| 801 | " | " | piperidino | " | " |
| 802 | " | " | pyrrolidino | " | " |
| 803 | " | -C₃H₇ | N(C₂H₅)₂ | " | " |
| 804 | " | -CH(C₂H₅)-C₄H₉ | " | " | " |
| 805 | " | -C₆H₅ | " | " | " |
| 806 | o-O₂N-C₆H₄- | -CH₃ | " | " | yellow |
| 807 | 4-O₂N-2-Cl-C₆H₃- | " | " | " | orange |
| 808 | " | " | " | NH-CH(CH₃)-(CH₂)₃-C(CH₃)₂-OH | " |

| Example | D | B | $X^1$ | $X^2$ | Shade |
|---|---|---|---|---|---|
| 809 | $O_2N$-C$_6$H$_3$(Cl)- (3-Cl-4-) | $-CH_3$ | $N(C_2H_5)_2$ | $NH-(CH_2)_3-O-(CH_2)_6-OH$ | orange |
| 810 | $O_2N$-C$_6$H$_3$(Br)- | " | " | $NH-CH(CH_3)-(CH_2)_3-C(CH_3)_2-OH$ | " |
| 811 | $O_2N$-C$_6$H$_3$(OCH$_3$)- $-CH_3$ | " | " | $NH-(CH_2)_3-O-C_2H_4-O-CH_2-C_6H_5$ | " |
| 812 | $O_2N$-C$_6$H$_3$(CN)- | H | " | " | " |
| 813 | " | $-CH_3$ | $N(CH_3)_2$ | " | " |
| 814 | " | " | " | $NH-CH(CH_3)-(CH_2)_3-C(CH_3)_2-OH$ | " |
| 815 | " | " | " | $NH-(CH_2)_3-O-(CH_2)_6-OH$ | " |
| 816 | " | " | " | $N(C_2H_5)_2$ " | " |
| 817 | " | " | " | $NH-CH(CH_3)-(CH_2)_3-C(CH_3)_2-OH$ | " |
| 818 | " | " | " | $NH-(CH_2)_3-O-C_6H_{11}$ | " |
| 819 | " | " | " | $NH-(CH_2)_5-CN$ | " |
| 820 | " | " | $N(CH_2-CH(CH_3)-CH_3)_2$ | $NH-CH(CH_3)-(CH_2)_3-C(CH_3)_2-OH$ | " |
| 821 | " | " | pyrrolidino-N | " | " |
| 822 | " | " | $N(C_2H_5)((CH_2)_5-CH_3)$ | " | " |
| 823 | " | $-C_3H_7$ | $N(C_2H_5)_2$ | " | " |
| 824 | " | $-CH(C_2H_5)-C_4H_9$ | " | " | " |
| 825 | " | $-C_6H_5$ | " | " | " |
| 826 | " | " | " | $NH-(CH_2)_5-CN$ | " |
| 827 | $O_2N$-C$_6$H$_3$(SO$_2$-CH$_3$)- $-CH_3$ | " | $N(C_2H_5)_2$ | $NH-(CH_2)_5-CN$ | red |
| 828 | " | " | " | $NH-CH(CH_3)-(CH_2)_3-C(CH_3)_2-OH$ | " |

| Example | D | B | $X^1$ | $X^2$ | Shade |
|---|---|---|---|---|---|
| 829 | $O_2N$-C₆H₃(SO₂-CH₃)- | -CH₃ | $N(C_2H_5)_2$ | $NH-(CH_2)_3-O-C_6H_{11}$ | red |
| 830 | " | -C₃H₇ | " | $NH-C_3H_6-O-(CH_2)_6-OH$ | " |
| 831 | " | -CH₃ | $N(C_3H_7)_2$ | $NH-CH(CH_3)-(CH_2)_3-C(CH_3)_2-OH$ | " |
| 832 | " | " | $N(C_4H_9)_2$ | " | " |
| 833 | " | " | piperidino | " | " |
| 834 | " | " | pyrrolidino | " | " |
| 835 | 2-CN-C₆H₄- | H | $N(C_2H_5)_2$ | " | yellow |
| 836 | " | " | " | $NH-(CH_2)_3-O-C_2H_4-O-CH_2-C_6H_5$ | " |
| 837 | " | " | " | $NH-(CH_2)_3-O-(CH_2)_6-OH$ | " |
| 838 | " | -CH₃ | " | " | " |
| 839 | " | " | " | $NH-(CH_2)_3-O-C_2H_4-O-CH_2-C_6H_5$ | " |
| 840 | " | " | $N(CH_3)_2$ | " | " |
| 841 | " | " | morpholino | " | " |
| 842 | 4-Cl-2-CN-C₆H₃- | H | $N(C_2H_5)_2$ | $NH-CH(CH_3)-(CH_2)_3-C(CH_3)_2-OH$ | " |
| 843 | " | " | " | $NH-(CH_2)_3-O-C_2H_4-O-CH_2-C_6H_5$ | " |
| 844 | " | " | " | $NH-(CH_2)_3-O-(CH_2)_6-OH$ | " |
| 845 | " | -CH₃ | " | " | " |
| 846 | " | " | " | $NH-(CH_2)_3-O-C_2H_4-O-CH_2-C_6H_5$ | " |
| 847 | " | " | morpholino | " | " |
| 848 | $O_2N$-, Cl-, CN-C₆H₂- | " | $N(C_2H_5)_2$ | $NH-(CH_2)_3-O-C_6H_{11}$ | red |
| 849 | " | " | " | $NH-(CH_2)_5-CN$ | " |
| 850 | " | " | " | $NH-CH(CH_3)-(CH_2)_3-C(CH_3)_2-OH$ | " |
| 851 | " | " | piperidino | " | " |

| Example | D | B | $X^1$ | $X^2$ | Shade |
|---|---|---|---|---|---|
| 852 | $O_2N$-C6H2(Br)(CN)- | $-CH_3$ | $N(C_2H_5)_2$ | $NH-CH(CH_3)-(CH_2)_3-C(CH_3)_2-OH$ | red |
| 853 | " | " | " | $NH-(CH_2)_3-O-(CH_2)_6-OH$ | " |
| 854 | " | " | N | $NH-CH(CH_3)-(CH_2)_3-C(CH_3)_2-OH$ | " |
| 855 | $NC$-C6H2($NO_2$)(Cl)- | " | $N(C_2H_5)_2$ | " | " |
| 856 | $O_2N$-C6H3($NO_2$)- | " | " | " | " |
| 857 | " | " | " | $NH-(C_3H_6)_3-O-(CH_2)_6-OH$ | " |
| 858 | $O_2N$-C6H2($NO_2$)(Cl)- | " | " | $NH-CH(CH_3)-(CH_2)_3-C(CH_3)_2-OH$ | " |
| 859 | $O_2N$-C6H2($NO_2$)(Br)- | " | " | " | " |
| 860 | $O_2N$-C6H2($SO_2-CH_3$)(Cl)- | " | " | " | " |
| 861 | $H_3C-O_2S$-C6H3(Cl)- | " | " | " | yellow |
| 862 | " | " | " | $NH-(CH_2)_3-O-C_6H_{11}$ | " |
| 863 | " | " | morpholino | $NH-CH(CH_3)-(CH_2)_3-C(CH_3)_2-OH$ | " |
| 864 | $H_5C_2OOC$-C6H4- | " | $N(C_2H_5)_2$ | " | " |
| 865 | o-COOCH3-C6H4- | " | " | " | " |
| 866 | $O_2N$-C6H3(COOCH3)- | " | " | " | red orange |
| 867 | $H_5C_2OOC$-C6H3($COOC_2H_5$)-$CH_3$ | " | " | " | yellow |

| Example | D | B | X¹ | Y² | Shade |
|---|---|---|---|---|---|
| 868 | phthalimide-N-C₂H₄-OH | -CH₃ | N(C₂H₅)₂ | NH-CH(CH₃)-(CH₂)₃-C(CH₃)₂-OH | yellow |
| 869 | 4,5-dimethyl(H₃C-OC-)thiazol-2-yl | " | " | " | red orange |
| 870 | H₅C₂OOC-H₄C₂-S-(1,2,4-thiadiazol-3-yl) | -CH₃ | " | " | orange |
| 871 | 3-CN-4-CH₃-5-OC₂H₅-thien-2-yl (H₅C₂OOC-, H₃C-, CN-thienyl) | " | " | " | red |
| 872 | 7-O₂N-benzisothiazol-3-yl | " | " | " | " |
| 873 | " | " | " | NH-(CH₂)₅-CN | " |
| 874 | 7-O₂N-4-CH₃-benzisothiazol-3-yl | " | " | " | violet |
| 875 | " | " | " | NH-CH(CH₃)-(CH₂)₃-C(CH₃)₂-OH | " |
| 876 | " | " | pyrrolidino | " | " |
| 877 | C₆H₅-N=N-C₆H₄- | H | N(C₂H₅)₂ | " | orange |
| 878 | " | -CH₃ | " | " | " |
| 879 | " | " | N(C₃H₇)₂ | " | " |
| 880 | " | " | pyrrolidino | " | " |
| 881 | 2-CH₃-C₆H₄-N=N-3-CH₃-C₆H₃- | " | N(C₂H₅)₂ | " | " |
| 882 | 3-CH₃-C₆H₄-N=N-2-CH₃-4-CH₃-C₆H₂- -CH₃ | " | " | " | " |

| Example | D | B | $X^1$ | $X^2$ | Shade |
|---|---|---|---|---|---|
| 883 | 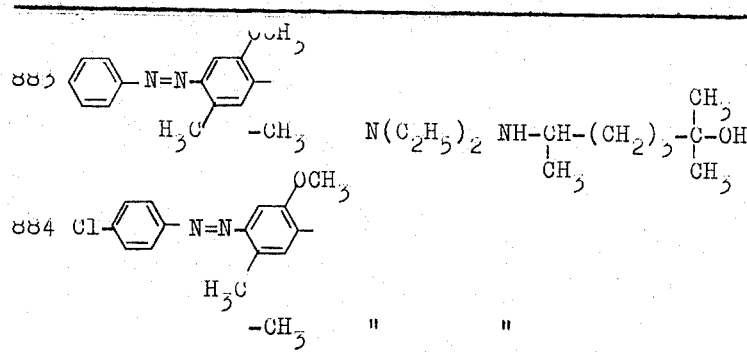 | $-CH_3$ | $N(C_2H_5)_2$ | $NH-CH-(CH_2)_3-\underset{CH_3}{\underset{|}{\overset{CH_3}{\overset{|}{C}}}}-OH$ <br> $\quad\ \ \|$ <br> $\quad CH_3$ | red |
| 884 | 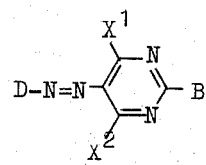 $-CH_3$ | " | " | " | " |

$$D-N=N-\underset{X^2}{\overset{X^1}{\underset{\|}{\overset{\|}{\underset{N}{\overset{N}{\bigcirc}}}}}}-B$$

| Example | D | B | $X^1$ | $X^2$ | Shade |
|---|---|---|---|---|---|
| 885 | $O_2N-\langle\ \rangle-$ | H | $NH-(CH_2)_3-O-C_2H_4-O-CH_2-C_6H_5$ | $NH-C_2H_4-OH$ | yellow |
| 886 | " | $-CH_3$ | " | " | " |
| 887 | " | " | $NH-(CH_2)_3-O-(CH_2)_6-OH$ | $NH-C_2H_4-OH$ | " |
| 888 | " | $-CH\underset{CH_3}{\overset{CH_3}{\diagup}}$ | " | " | " |
| 889 | " | 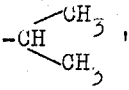 | " | " | " |
| 890 | " | $-CH_2-\langle\ \rangle$ | $NH-CH-(CH_2)_3-\underset{CH_3}{\overset{CH_3}{\overset{|}{C}}}-OH$ <br> $\quad\ \|$ <br> $\quad CH_3$ | $NH-C_3H_6-OH$ | " |
| 891 | " | $-CH_2-O-C_2H_5$ | $NH-CH-(CH_2)_3-\underset{CH_3}{\overset{CH_3}{\overset{|}{C}}}-OH$ <br> $\quad\ \|$ <br> $\quad CH_3$ | $NH-C_3H_6OH$ | " |
| 892 | " | $\langle\ \rangle$ | " | $NH-C_2H_4-OCH_3$ | orange |
| 893 | " | " | $NH-(CH_2)_5-CN$ | $NH-C_2H_4-OH$ | " |
| 894 | " | " | $NH-(CH_2)_3-O-(CH_2)_6-OH$ | $NH-C_2H_4-OCH_3$ | " |
| 895 | " | " | $NH-(CH_2)_3-O-\langle H\rangle$ | $NH-C_2H_4-OH$ | " |

| Example | D | B | X¹ | X² | Shade |
|---|---|---|---|---|---|
| 896 | O₂N-C₆H₄- | -C₆H₄-CH₃ | NH-CH(CH₃)-(CH₂)₃-C(CH₃)-OH | NH-C₂H₄-OH | orange |
| 897 | " | -C₆H₄-Cl | " | " | " |
| 898 | " | -C₆H₄-OCH₃ | " | " | " |
| 899 | Cl,NO₂,Cl-C₆H₂- | -C₆H₅ | " | NH-C₃H₆-OH | golden yellow |
| 900 | O₂N-C₆H₄- | " | " | " | orange |
| 901 | " | " | " | NH-C₂H₄-OH | " |
| 902 | " | " | " | NH-C₂H₄-O-C₂H₄-OH | " |
| 903 | " | " | " | NH-C₃H₆-O-CH₃ | " |
| 904 | " | " | NH-(CH₂)₃-O-C₂H₄-O-CH₂-C₆H₅ | " | " |
| 905 | " | " | " | NH-C₂H₅ | " |
| 906 | " | " | " | NH₂ | golden yellow |
| 907 | " | " | NH-(CH₂)₃-O-(CH₂)₆-OH | " | " |
| 908 | O₂N,Br-C₆H₃- | " | NH-CH(CH₃)-(CH₂)₃-C(CH₃)₂-OH | NH-C₂H₄-OH | orange |
| 909 | O₂N,OCH₃-C₆H₃- | " | " | " | " |
| 910 | O₂N-C₆H₄- | -C₆H₅ | " | " | scarlet |
| 911 | " | " | " | NH-C₃H₆-OH | " |
| 912 | " | " | " | NH-C₂H₄-O-C₂H₄-OH | " |
| 913 | " | " | " | NH-C₂H₄-O-CH₃ | " |
| 914 | " | " | " | NH-C₂H₄-O-C₂H₅ | " |
| 915 | " | " | " | NH-C₃H₆-O-CH₃ | " |
| 916 | " | " | " | NH-C₃H₇ | " |
| 917 | " | " | NH-(CH₂)₃-O-(CH₂)₆-OH | NH-C₂H₄-OH | " |
| 918 | " | " | NH-(CH₂)₃-O-C₂H₄-O-CH₂-C₆H₅ | " | " |

| Example | D | B | X¹ | X² | Shade |
|---|---|---|---|---|---|
| 919 | $O_2N$-(C₆H₃)(CN)- | -C₆H₅ | NH-(CH$_2$)$_3$-O-⟨H⟩ | NH-C$_2$H$_4$-OH | scarlet |
| 920 | " | " | NH-(CH$_2$)$_5$-CN | " | " |
| 921 | " | -C₆H₄-CH$_3$ | " | NH-C$_3$H$_6$-OH | " |
| 922 | " | " | NH-CH(CH$_3$)-(CH$_2$)$_3$-C(CH$_3$)$_2$-OH | " | " |
| 923 | " | " | " | NH-C$_2$H$_4$-OH | " |
| 924 | " | -C₆H₄-OCH$_3$ | " | " | " |
| 925 | " | " | NH-(CH$_2$)$_3$-O-⟨H⟩ | " | " |
| 926 | " | -C₆H₄-Cl | " | NH-C$_3$H$_6$-OH | " |
| 927 | " | " | NH-(CH$_2$)$_5$-CN | " | " |
| 928 | " | " | NH-CH(CH$_3$)-(CH$_2$)$_3$-C(CH$_3$)$_2$-OH | NH-C$_2$H$_4$-OH | " |
| 929 | " | H | " | " | orange |
| 930 | " | -CH$_3$ | " | " | " |
| 931 | " | -⟨H⟩ | NH-CH(CH$_3$)-(CH$_2$)$_3$-C(CH$_3$)$_2$-OH | NH-C$_2$H$_4$-OH | " |
| 932 | " | -CH$_2$-C₆H₅ | " | " | " |
| 933 | $O_2N$-C₆H$_3$(SO$_2$-CH$_3$)- | -C₆H₅ | " | NH-C$_2$H$_4$-O-CH$_3$ | red |
| 934 | " | " | " | NH-C$_3$H$_6$-O-C$_2$H$_5$ | " |
| 935 | " | " | NH-(CH$_2$)$_5$-CN | NH-C$_3$H$_6$-OH | " |
| 936 | " | " | NH-(CH$_2$)$_3$-O-⟨H⟩ | " | " |
| 937 | $O_2N$-C₆H$_2$(SO$_2$-CH$_3$)(Cl)- | " | NH-CH(CH$_3$)-(CH$_2$)$_3$-C(CH$_3$)$_2$-OH | " | " |
| 938 | $O_2N$-C₆H$_4$(SO$_2$-C$_2$H$_5$)- | " | " | " | " |
| 939 | $O_2N$-C₆H$_4$(SO$_2$-NH-C$_2$H$_4$-OCH$_3$)- | " | " | " | " |

| Example | D | B | $X^1$ | $X^2$ | Shade |
|---|---|---|---|---|---|
| 940 | 2-CN-C₆H₄- | phenyl | NH-CH(CH₃)-(CH₂)₃-C(CH₃)₂-OH | NH-C₂H₄-OH | yellow |
| 941 | " | " | NH-(CH₂)₃-O-(CH₂)₆-OH | " | " |
| 942 | " | " | NH-(CH₂)₃-O-C₂H₄-O-CH₂-C₆H₅ | " | " |
| 943 | " | -C₆H₄-Cl | " | " | " |
| 944 | " | " | NH-(CH₂)₃-O-(CH₂)₆-OH | " | " |
| 945 | " | " | NH-CH(CH₃)-(CH₂)₃-C(CH₃)₂-OH | " | " |
| 946 | " | -CH₂-C₆H₅ | " | " | " |
| 947 | Cl-(CN)-C₆H₃- | phenyl | " | " | " |
| 948 | " | " | " | NH-C₂H₄-O-CH₃ | " |
| 949 | " | " | " | NH-C₂H₄-O-C₂H₄-OH | " |
| 950 | " | " | " | NH-C₃H₆-OH | " |
| 951 | " | H | NH-(CH₂)₃-O-C₂H₄-O-CH₂-C₆H₅ | NH-C₂H₄-OH | " |
| 952 | " | -CH₃ | " | " | " |
| 953 | " | " | NH-(CH₂)₃-O-(CH₂)₆-OH | " | " |
| 954 | " | -CH(CH₃)₂ | " | " | " |
| 955 | " | -C₆H₁₁ (cyclohexyl) | " | " | " |
| 956 | " | -CH₂-C₆H₅ | " | " | " |
| 957 | " | -CH₂-O-C₂H₅ | " | " | " |
| 958 | O₂N-(CN)(Cl)-C₆H₂- | -C₆H₅ | NH-CH(CH₃)-(CH₂)₃-C(CH₃)₂-OH | NH-C₂H₄-OH | red |
| 959 | " | " | " | NH-C₃H₆-OH | " |
| 960 | " | " | NH-(CH₂)₃-O-C₆H₅ | NH-C₂H₄-OH | " |

| Example | D | B | $X^1$ | $X^2$ | Shade |
|---|---|---|---|---|---|
| 961 | Cl-C₆H₃(CN)- (2-CN, 4-Cl) | phenyl | NH-CH-(CH₂)₅-CN | NH-C₂H₄-OH | red |
| 962 | O₂N-C₆H₃(CN)(Br)- | " | " | " | " |
| 963 | " | " | NH-CH(CH₃)-(CH₂)₃-C(CH₃)₂-OH | " | " |
| 964 | " | -CH₃ | NH-(CH₂)₃-O-(CH₂)₆-OH | " | " |
| 965 | NC-C₆H₂(NO₂)(Cl)- | phenyl | NH-CH(CH₃)-(CH₂)₃-C(CH₃)₂-OH | " | " |
| 966 | O₂N-C₆H₄(NO₂)- | " | " | " | " |
| 967 | O₂N-C₆H₃(NO₂)(Cl)- | " | " | " | " |
| 968 | O₂N-C₆H₃(NO₂)(Br)- | " | " | " | " |
| 969 | O₂N-C₆H₃(Cl)(Cl)- | " | " | " | orange |
| 970 | O₂N-C₆H₃(Cl)(Br)- | " | " | " | " |
| 971 | H₃C-O₂S-C₆H₃(Cl)- | " | " | " | yellow |
| 972 | " | " | NH-(CH₂)₃-O-(CH₂)₆-OH | NH-C₃H₆-OH | " |
| 973 | " | " | NH-(CH₂)₅-CN | NH-C₂H₄-OH | " |
| 974 | " | -C₆H₄-Cl | NH-(CH₂)₃-O-(CH₂)₆-OH | " | " |
| 975 | " | " | NH-CH(CH₃)-(CH₂)₃-C(CH₃)₂-OH | " | " |
| 976 | C₆H₄(COOCH₃)- | phenyl | " | " | " |
| 977 | O₂N-C₆H₃(COOCH₃)- | " | " | " | scarlet |

| Example | D | B | X¹ | X² | Shade |
|---|---|---|---|---|---|
| 978 | 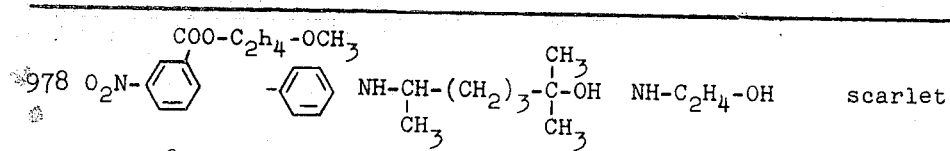 O₂N- with COO-C₂H₄-OCH₃ | -phenyl- | NH-CH(CH₃)-(CH₂)₃-C(CH₃)₂-OH | NH-C₂H₄-OH | scarlet |
| 979 |  phthalimide-C₂H₄- | " | " | " | yellow |
| 980 | " | 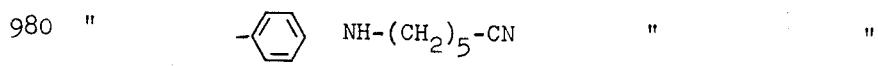 -phenyl- | NH-(CH₂)₅-CN | " | " |
| 981 | 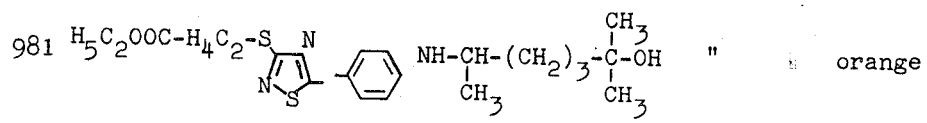 H₅C₂OOC-H₄C₂-S-isothiazole | -phenyl- | NH-CH(CH₃)-(CH₂)₃-C(CH₃)₂-OH | " | orange |
| 982 |  H₅C₂OOC-thiophene-CN,CH₃ | " | " | " | ruby |
| 983 |  O₂N-indole-S | " | " | " | " |
| 984 | 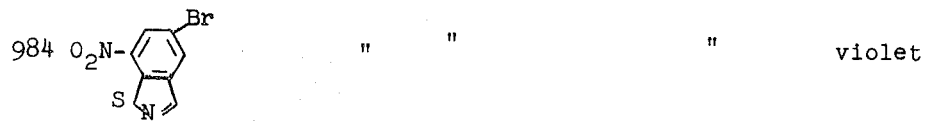 O₂N-, Br-isoindole | " | " | " | violet |
| 985 |  NO₂-benzothiazole | " | " | " | blue |
| 986 |  phenyl-N=N-phenyl | " | " | " | orange |
| 987 |  CH₃-phenyl-N=N-phenyl-CH₃ | " | " | " | " |

| Ex. | Dye | Y = | Shade |
|---|---|---|---|
| 988 | 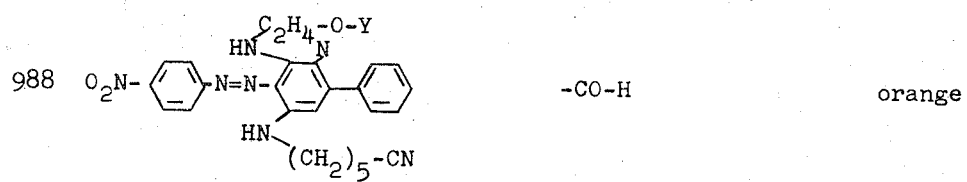 O₂N-phenyl-N=N-[phenyl with HN-C₂H₄-O-Y and HN-(CH₂)₅-CN, phenyl subst.] | -CO-H | orange |
| 989 | "  CN, HN-C₂H₄-O-Y | -CO-CH₃ | " |
| 990 | 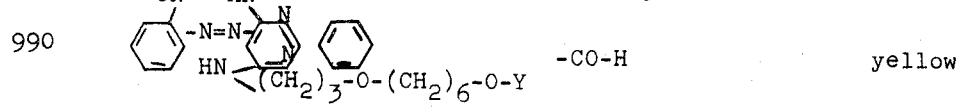 phenyl-N=N-pyrimidine with HN-(CH₂)₃-O-(CH₂)₆-O-Y | -CO-H | yellow |

| Ex. | Dye | Y = | Shade |
|---|---|---|---|
| 991 | 2-Cl, 6-CN-C$_6$H$_3$-N=N-[pyrimidine: 4-CH$_3$, 2-HN-C$_2$H$_4$-O-Y, 6-HN-(CH$_2$)$_3$-O-C$_2$H$_4$-O-CH$_2$-C$_6$H$_5$] | -CO-CH$_3$ | yellow |
| 992 | " | -CO-C$_2$H$_5$ | " |
| 993 | " | -CO-CH$_2$-CO-CH$_3$ | " |
| 994 | 4-O$_2$N, 2-CN-C$_6$H$_3$-N=N-[pyrimidine: 2-phenyl, 4-HN-C$_2$H$_4$-O-Y, 6-HN-(CH$_2$)$_5$-CN] | -CO-H | scarlet |
| 995 | " | -CO-CH$_2$-CO-CH$_3$ | " |
| 996 | " | -CO-C$_2$H$_4$-COOC$_2$H$_5$ | " |
| 997 | O$_2$N-C$_6$H$_4$-N=N-[pyrimidine: 5-CH$_3$, 4-N(C$_2$H$_5$)$_2$, 6-HN-(CH$_2$)$_3$-O-(CH$_2$)$_6$-O-Y] | -CO-H | orange |
| 998 | " | -CO-CH$_3$ | " |
| 999 | " | -CO-CH$_2$-O-C$_6$H$_5$ | |
| 1000 | " | -CO-C$_6$H$_5$ | " |
| 1001 | 2-CN-C$_6$H$_4$-N=N-[pyrimidine: 2-N(C$_2$H$_5$)$_2$, HN-(CH$_2$)$_3$-O-(CH$_2$)$_6$-O-Y] | -CO-H | yellow |
| 1002 | " | -CO-CH$_2$-O-C$_6$H$_5$ | |
| 1003 | " | -CO-CH$_2$-CO-CH$_3$ | |

EXAMPLE 1004

19.7 parts of 2-pyrrolidino-4-methyl-6-chloropyrimidine and 11.1 parts of norbornylamine are heated at 170°C for 2 hours. The reaction mixture is then cooled to room temperature, the solidified oil is pulverized and the product recrystallized from dilute acetic acid. The yield of the diaminopyrimidine of the formula:

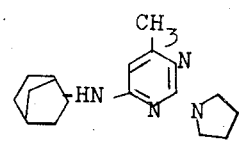

is 13 parts. The melting point of the compound is 75° to 76°C.

EXAMPLE 1005

A solution of 10.1 parts of triethylamine, 13.3 parts of norbornylamine and 22.5 parts of 2-phenyl-4,6-dichloropyrimidine in 35 parts by volume of ethanol is boiled for 7½ hours. In this period quantitative conversion into 2-phenyl-4-chloro-6-norbornyl takes place as shown by thin-layer chromatography. It is isolated by pouring the reaction mixture into 400 parts by volume of water and decanting off the aqueous phase. The crude product is then heated with 15.2 parts of monoethanolamine for 6 hours at 170°C and the mixture is again poured into water. The pyrimidine derivative of the formula:

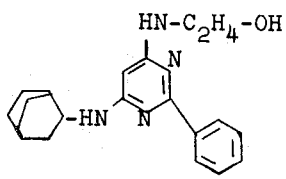

which at first is oily crystallizes within a short time. It is filtered off, washed with water and dried. The crude product has a melting point of 87°C.

EXAMPLE 1006

3 parts of o-aminobenzonitrile is dissolved in 75 parts by volume of water and 7.5 parts by volume of concentrated hydrochloric acid, the mixture is cooled to 0°C and the amine is diazotized for 2 hours with the calculated amount of sodium nitrite. After diazotization is complete the solution is filtered and added to 6.8 parts of the coupling component obtained according to Example 1004 (previously dissolved in 100 parts by volume of water and 10 parts by volume of glacial acetic acid) and 200 parts of ice. A pH of about 5 is then set up with sodium acetate and the mixture is stirred until coupling is over. The dye precipitated which has the formula:

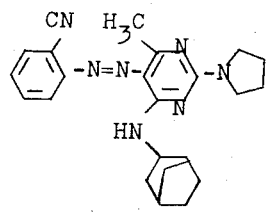

is then filtered off, washed with water and dried. A yellow powder is obtained which dyes polyester cloth fast greenish yellow shades.

EXAMPLE 1007

4.5 parts of 2-amino-5-chlorobenzonitrile is diazotized in 200 parts of water and 10 parts by volume of concentrated hydrochloric acid with sodium nitrite at 0°C during 2 hours. The pH is then buffered with saturated sodium acetate solution to about 4 and a solution of 10 parts of 2-phenyl-4-β-hydroxyethylamino-6-norbornylaminopyrimidine (Example 1005) in 50 parts by volume of glacial acetic acid is dripped in. The mixture is stirred for several hours more until coupling is complete and the deposited dye of the formula:

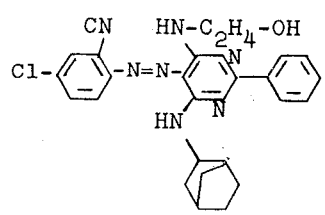

is isolated by filtration. After drying and grinding an orange powder is obtained which produces fast reddish yellow shades on polyethylene glycol terephthalic material.

EXAMPLE 1008

5 parts of acetic anhydride is added to a solution of 5.5 parts of the coupling product from 2-chloro-4-methylsulfonylaniline and 2-phenyl-4-γ-hydroxypropylamino-6-norbornylaminopyrimidine in 50 parts by volume of pyridine and the whole is heated to 60°C. Esterification is continuously monitored by thin layer chromatography. After the end of the reaction the mixture is introduced into 500 parts by volume of water and the dye of the formula:

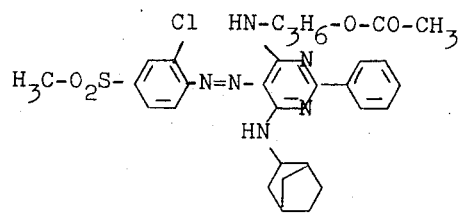

is isolated in conventional manner. Dyeings on polyester cloth are in golden yellow shades which are fast to light and dry-heat pleating and setting.

The dyes which are identified in the following Table by specifying their substituents are also obtained analogously to the said methods.

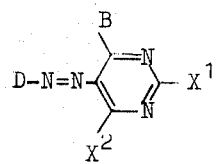

| Ex. | D | B | $X^1$ | $X^2$ | Shade of dyeing on polyester |
|---|---|---|---|---|---|
| 1009 | $O_2N-\langle\rangle-$ | H | $N(C_2H_5)_2$ | $NH-\triangle$ | orange |
| 1010 | " | $-CH_3$ | " | " | " |
| 1011 | " | " | $N(CH_3)_2$ | " | " |
| 1012 | " | " | $N(C_3H_7)_2$ | " | " |
| 1013 | " | " | $N(C_4H_9)_2$ | " | " |
| 1014 | " | " | $N\begin{smallmatrix}C_2H_5\\(CH_2)_5-CH_3\end{smallmatrix}$ | " | " |
| 1015 | " | " | $N\bigcirc$ (piperidine) | " | " |
| 1016 | " | " | $N\bigcirc$ (pyrrolidine) | " | " |
| 1017 | " | " | $N\bigcirc O$ (morpholine) | " | " |
| 1018 | " | " | $N(C_2H_5)_2$ | $NH-\triangle-Cl$ | " |
| 1019 | " | " | " | $NH-\triangle-CH_2CH_2OH$ | " |
| 1020 | " | " | " | $NH-\triangle-CH_2Cl$ | " |
| 1021 | " | " | " | $NH-\triangle\triangle$ | " |
| 1022 | " | " | " | $NH-\triangle\triangle$ | " |
| 1023 | " | $-C_3H_7$ | $N(C_2H_5)_2$ | $NH-\triangle$ | " |
| 1024 | $\begin{smallmatrix}NO_2\\\langle\rangle-\end{smallmatrix}$ | $-CH_3$ | " | " | yellow |

| Ex. | D | B | $X^1$ | $X^2$ | Shade of dyeing on polyester |
|---|---|---|---|---|---|
| 1025 | 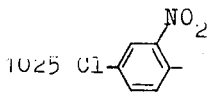 | $-CH_3$ | $N(C_2H_5)_2$ | NH— | yellow |
| 1026 | 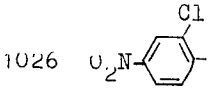 | H | " | " | orange |
| 1027 | " | $-CH_3$ |  | " | " |
| 1028 | " | " | $N(C_2H_5)_2$ | NH—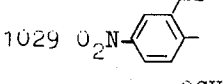 | " |
| 1029 |  | " | " | NH—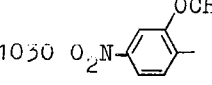 | " |
| 1030 | 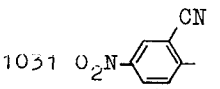 | " | " | " | " |
| 1031 | 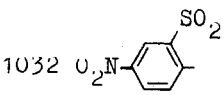 | " | " | " | " |
| 1032 | 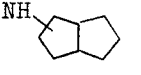 | " | " | " | red |
| 1033 | " | " | " | NH—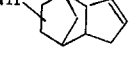 | " |
| 1034 | " | " | " | NH—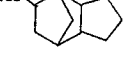 | " |
| 1035 | " | " | " | NH—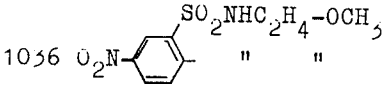 | " |
| 1036 |  | " | " | NH—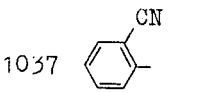 | " |
| 1037 |  | H | " | " | yellow |
| 1038 | " | " | 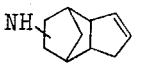 | " | " |
| 1039 | " | " | $N(C_2H_5)_2$ | NH— | " |
| 1040 | " | $-CH_3$ | " | " | " |
| 1041 | " | " |  | " | " |

| Ex. | D | B | X¹ | X² | Shade of dyeing on polyester |
|---|---|---|---|---|---|
| 1042 | 2-CN-C₆H₄ | -CH₃ | N(C₂H₅)₂ | NH-norbornyl | yellow |
| 1043 | " | " | " | NH-norbornyl-Cl | " |
| 1044 | " | " | " | NH-norbornyl-CH₂CH₂OH | " |
| 1045 | " | " | " | NH-norbornyl-CH₂Cl | " |
| 1046 | " | " | " | NH-bicyclic | " |
| 1047 | " | " | " | NH-dicyclopentadienyl | " |
| 1048 | " | " | " | NH-bicyclic | " |
| 1049 | " | " | " | NH-bicyclic-OH | " |
| 1050 | " | " | N(C₃H₇)₂ | NH-norbornyl | " |
| 1051 | " | " | N(C₂H₅)((CH₂)₅-CH₃) | " | " |
| 1052 | " | " | piperidino | " | " |
| 1053 | " | " | " | NH-bicyclic | " |
| 1054 | " | " | morpholino | NH-norbornyl | " |
| 1055 | 2-CN-5-Cl-C₆H₃ | " | N(CH₃)₂ | " | " |
| 1056 | " | " | " | NH-bicyclic | " |
| 1057 | " | " | pyrrolidino | NH-norbornenyl | " |

| Ex. | D | B | $X^1$ | $X^2$ | Shade of dyeing on polyester |
|---|---|---|---|---|---|
| 1058 | 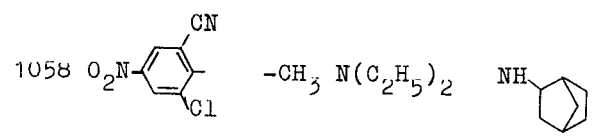 | -CH$_3$ | N(C$_2$H$_5$)$_2$ | NH-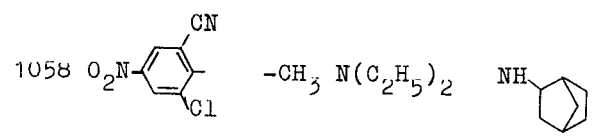 | red |
| 1059 |  | " | " | " | " |
| 1060 | 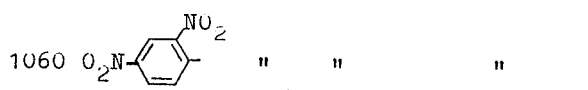 | " | " | " | " |
| 1061 | 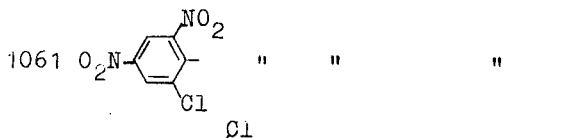 | " | " | " | " |
| 1062 |  | " | " | " | yellow |
| 1063 | " | " | " | NH- | " |
| 1064 | " | " | " | NH-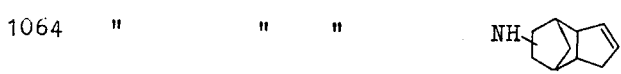 | " |
| 1065 | " | " | 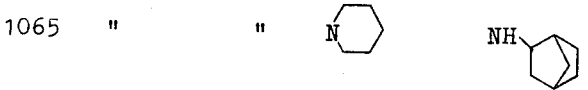 | NH-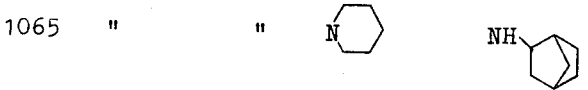 | " |
| 1066 | " | " | 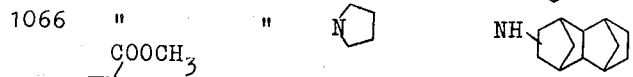 | NH-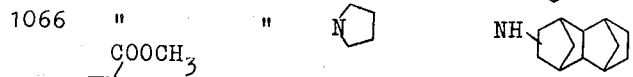 | " |
| 1067 | 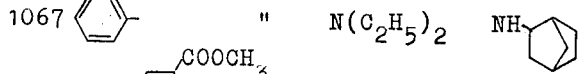 | " | N(C$_2$H$_5$)$_2$ | NH-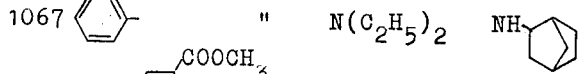 | " |
| 1068 |  | " | " | " | red orange |
| 1069 |  | " | " | " | yellow |
| 1070 |  | " | " | " | orange |
| 1071 |  | " | " | " | red |
| 1072 |  | " | " | " | violet |
| 1073 |  | " | " | " | orange |
| 1074 | 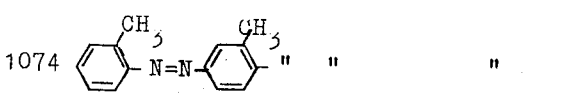 | " | " | " | " |

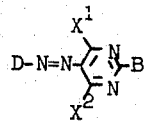
| Ex. No. | D | B | $X^1$ | $X^2$ | Shade |
|---|---|---|---|---|---|
| 1075 | $O_2N$-⟨⟩- | -⟨⟩ | NH-⟨norbornyl⟩ | $NH-C_2H_4-OH$ | orange |
| 1076 | " | " | " | $NH-C_2H_4-O-C_2H_4-OH$ | " |
| 1077 | " | " | " | $NH-C_3H_6-OH$ | " |
| 1078 | " | " | " | $NH_2$ | " |
| 1079 | " | " | NH-⟨indanyl⟩ | $NH-C_2H_4-OH$ | " |
| 1080 | " | -⟨⟩-Cl | NH-⟨norbornyl⟩ | " | " |
| 1081 | " | -⟨⟩-$CH_3$ | " | " | " |
| 1082 | " | -⟨⟩-$OCH_3$ | " | " | " |
| 1083 | " | $-CH_3$ | " | " | yellow |
| 1084 | " | " | NH-⟨norbornyl-Cl⟩ | " | " |
| 1085 | " | " | NH-⟨norbornyl-$CH_2CH_2OH$⟩ | " | " |

| Ex. No. | D | B | $X^1$ | $X^2$ | Shade |
|---|---|---|---|---|---|
| 1086 | $O_2N-\langle\phantom{}\rangle-$ | $-CH_3$ | 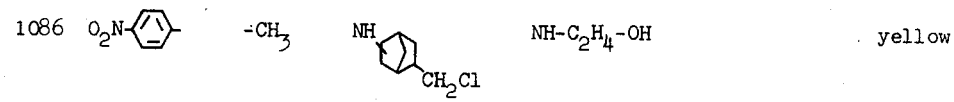 NH-, CH₂Cl | $NH-C_2H_4-OH$ | yellow |
| 1087 | " | " |  NH- | " | " |
| 1088 | " | " | 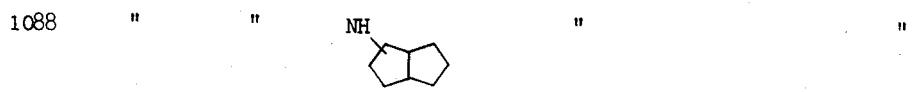 NH- | " | " |
| 1089 | " | $-CH\begin{matrix}CH_3\\CH_3\end{matrix}$ | " | " | " |
| 1090 | " | " |  NH- | $NH-C_3H_6-OH$ | " |
| 1091 | " | " | " | $NH-C_2H_4-O-C_2H_4-OH$ | " |
| 1092 | " | " | " | $NH-(CH_2)_5-O-(CH_2)_4-OH$ | " |
| 1093 | " | " | " | $NH-C_2H_4-O-CH_3$ | " |
| 1094 | " | $-C_4H_9$ |  NH- | $NH-C_2H_4-OH$ | " |
| 1095 | $Cl-\underset{NO_2}{\langle\phantom{}\rangle}-$ | $-\langle\phantom{}\rangle$ | " | " | golden yellow |
| 1096 | $O_2N-\underset{Cl}{\langle\phantom{}\rangle}-$ | " | " | " | orange |
| 1097 | $O_2N-\underset{Br}{\langle\phantom{}\rangle}-$ | " | " | " | " |

| Ex. No. | D | B | $X^1$ | $X^2$ | Shade |
|---|---|---|---|---|---|
| 1098 | $O_2N$-C₆H₃(OCH₃)- | -C₆H₅ | NH-norbornenyl | $NH-C_2H_4-O-C_2H_4-OH$ | orange |
| 1099 | $O_2N$-C₆H₃(CN)- | " | " | $NH-C_2H_4-OH$ | scarlet |
| 1100 | " | $-CH_3$ | " | " | orange |
| 1101 | " | $-CH(CH_3)_2$ | " | " | " |
| 1102 | " | cyclohexyl | " | " | " |
| 1103 | " | $-CH_2-C_6H_5$ | " | " | " |
| 1104 | " | $CH_2-O-C_2H_5$ | " | " | " |
| 1105 | $O_2N$-C₆H₃($SO_2CH_3$)- | -C₆H₅ | " | $NH-C_3H_6-OH$ | red |
| 1106 | " | " | " | $NH-C_2H_4-O-CH_3$ | " |
| 1107 | " | " | " | $NH-C_3H_6-O-CH_3$ | " |
| 1108 | " | " | NH-bicyclo[3.3.0] | $NH-C_3H_6-OH$ | " |
| 1109 | " | " | NH-indanyl | " | " |
| 1110 | " | " | NH-dicyclopentadienyl | " | " |

| Ex. No. | D | B | $X^1$ | $X^2$ | Shade |
|---|---|---|---|---|---|
| 1111 | ⌬-CN | ⌬ | NH-[norbornenyl] | $NH-C_2H_4-OH$ | yellow |
| 1112 | " | " | " | $NH_2$ | " |
| 1113 | " | " | NH-[indanyl] | $NH-C_2H_4-OH$ | " |
| 1114 | " | " | " | $NH-C_3H_6-OH$ | " |
| 1115 | " | " | NH-[indenyl] | $NH-C_2H_4-OH$ | " |
| 1116 | " | " | NH-[norbornyl-CH$_2$CH$_2$OH] | " | " |
| 1117 | " | " | " | $NH_2$ | " |
| 1118 | " | " | NH-[norbornyl-CH$_2$Cl] | $NH-C_2H_4-OH$ | " |
| 1119 | " | " | NH-[bicyclic] | " | " |
| 1120 | " | " | " | $NH-C_3H_6-OH$ | " |
| 1121 | " | ⌬-Cl | NH-[cyclohexenyl] | " | " |
| 1122 | " | $-CH_3$ | " | $NH_2$ | " |

| Ex. No. | D | B | $X^1$ | $X^2$ | Shade |
|---|---|---|---|---|---|
| 1123 |  (2-CN-phenyl) | -CH$_3$ | NH- (norbornyl) | NH-(CH$_2$)$_3$-O-(CH$_2$)$_4$-OH | yellow |
| 1124 | " | -CH(CH$_3$)$_2$ | " | NH-C$_2$H$_4$-OH | " |
| 1125 | " |  (cyclohexyl) | " | " | " |
| 1126 | " | -CH$_2$- | " | " | " |
| 1127 | " | -CH$_2$-O-C$_2$H$_5$ | " | " | " |
| 1128 | " | -CH$_2$-O- | " | " | " |
| 1129 |  (Cl, CN-phenyl) |  | " | NH-C$_2$H$_4$-O-C$_2$H$_4$-OH | " |
| 1130 | " | " | " | NH-C$_2$H$_4$-O-CH$_3$ | " |
| 1131 | " | " | NH- | NH$_2$ | " |
| 1132 | " | -Cl | NH- | NH-C$_3$H$_6$-OH | " |
| 1133 | " | -CH$_3$ | " | NH$_2$ | " |
| 1134 |  (NC, Cl-phenyl) |  | " | NH-C$_2$H$_4$-OH | " |
| 1135 |  (O$_2$N, CN, Cl-phenyl) | " | " | " | red |

| Ex. No. | D | B | $x^1$ | $x^2$ | Shade |
|---|---|---|---|---|---|
| 1136 | 2-CN, 4-O$_2$N, 6-Cl phenyl | -CH$_3$ | NH-norbornenyl | NH-C$_3$H$_6$-OH | red |
| 1137 | 2-CN, 4-O$_2$N, 6-Br phenyl | phenyl | " | NH-C$_2$H$_4$-OH | " |
| 1138 | 2-NO$_2$, 4-O$_2$N, 6-Cl phenyl | " | " | " | " |
| 1139 | 2-Br, 4-O$_2$N, 6-Cl phenyl | " | " | " | red orange |
| 1140 | H$_3$C-O$_2$S-, Cl phenyl | " | " | NH-C$_3$H$_6$-OH | golden yellow |
| 1141 | " | " | NH-indenyl | " | " |
| 1142 | " | -CH(CH$_3$)$_2$ | " | NH-C$_2$H$_4$-O-C$_2$H$_4$-OH | yellow |
| 1143 | " | " | " | NH-C$_3$H$_6$-OH | " |
| 1144 | " | " | NH-norbornenyl | NH-C$_2$H$_4$-OH | " |
| 1145 | 2-COOCH$_3$ phenyl | phenyl | " | " | " |
| 1146 | 2-COOCH$_3$, 4-O$_2$N phenyl | phenyl | NH-norbornenyl | NH-C$_2$H$_4$-OH | red orange |
| 1147 | N-(2-hydroxyethyl)phthalimidyl | " | " | " | yellow |

| Ex. No. | D | B | $X^1$ | $X^2$ | Shade |
|---|---|---|---|---|---|
| 1148 | 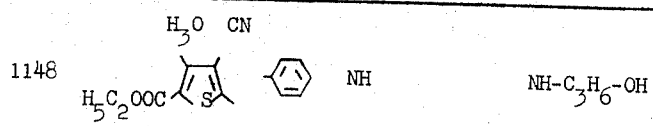 | 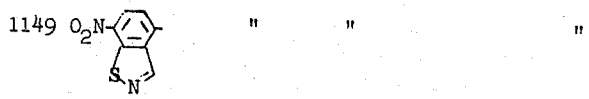 | NH | $NH-C_3H_6-OH$ | ruby |
| 1149 |  | " | " | " | " |
| 1150 | -N=N-- | " | " | " | orange |

| Ex. No. | Dye | | Shade |
|---|---|---|---|
| 1151 | 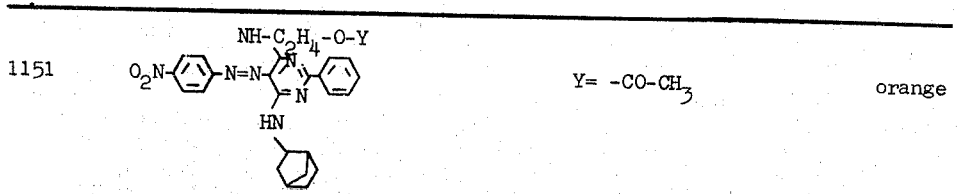 | $Y= -CO-CH_3$ | orange |
| 1152 | " | $Y= -CO-H$ | " |
| 1153 | " | $Y= -CO-CH_2-CO-CH_3$ | " |
| 1154 |  | $Y= -CO-CH_3$ | yellow |
| 1155 | " | $Y= -CO-C_2H_4-COOC_2H_5$ | " |

What we claim is:
1. A dye of the formula

D—N=N—A wherein:
D is phenyl substituted by chlorine, bromine, trifluoromethyl, methyl, methoxy, nitro, cyano, methylsulfonyl, ethylsulfonyl, phenylsulfonyl, carbalkoxy of a total of 2 to 5 carbon atoms, carbo-β-hydroxyethoxy, carbo-β-alkoxyethoxy in which said alkoxy has 1 to 4 carbon atoms, or N,N-dialkyl-substituted sulfamoyl in which each alkyl has 1 to 3 carbon atoms, with the proviso that at least one phenyl substituent is an electron-attracting substituent; phenylazophenyl; phenylazophenyl substituted by methyl, chlorine, bromine or nitro; benzthiazolyl; benzthiazolyl substituted by nitro, cyano, methylsulfonyl or ethylsulfonyl; benzisothiazolyl substituted by chlorine, bromine, cyano or nitro; thiazolyl substituted by cyano or nitro; thienyl substituted by methyl, cyano, nitro or carbalkoxy of a total of 2 to 5 carbon atoms; or thiadiazolyl substituted by phenyl, methyl, chlorine, bromine, methylmercapto, ethylmercapto or alkoxycarbonylethylmercapto, said alkoxy having 1 to 4 carbon atoms;

A is

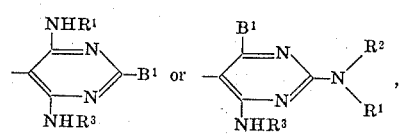

$B^1$ is hydrogen, methyl, ethyl, propyl, butyl, α-ethylpentyl, benzyl, phenyl or phenyl substituted by methyl, ethyl, methoxy, ethoxy, chloro or nitro;

$R^1$ is hydrogen, alkyl of one to eight carbon atoms, cyanoalkyl of two to seven carbon atoms, hydroxyalkyl of two to nine carbon atoms, alkoxyalkyl of a total of three to 13 carbon atoms, cyclohexyloxypropyl, benzyloxypropyl, β-phenylethoxypropyl, phenoxyethyl, phenoxypropyl, phenyl, phenyl substituted by hydroxy, chloro, methyl, ethyl, β-hydroxyethyl, methoxy, ethoxy, β-hydroxyethoxy, cyano or dialkylamino in which each alkyl has 1 to 2 carbon atoms, cycloalkyl of 5 to 8 ring members, norbornyl, phenylalkyl or tolylalkyl in which said alkyl has 1 to 4 carbon atoms,

—CH₂—CH—C₆H₅, —CH₂CH₂OCH₂CH₂OH, —(CH₂)₃O(CH₂)₂OH,
  |
  OH

—(CH₂)₃O(CH₂)₄OH, —(CH₂)₃O(CH₂)₆OH, —(CH₂)₃(OCH₂CH₂)ₘOT,

—(CH₂)₃(OCH—CH₂)ₘOT, —CH₂COOE, —CH₂CH₂COOE,
       |
       CH₃

—(CH₂)₅COOE, —CH₂CH₂OCOCH₂CH₂COOE,

—CH₂CH₂—O—acyl, —(CH₂)₃—O—acyl, —CH₂—CH—O—acyl,
                                      |
                                      CH₃

—(CH₂)₆—O—acyl, —CH₂CH₂—OCH₂CH₂—O—acyl,

—(CH₂)₃O(CH₂)₄O-acyl, or —(CH₂)ₙ—N⟨ ⟩=O

E is hydrogen, alkyl of 1 to 3 carbon atoms, benzyl, β-hydroxyethyl, ω-hydroxyhexyl, δ-hydroxybutyl, β-methoxyethyl, γ-methoxypropyl, γ-ethoxypropyl, β-phenoxyethyl or β-hydroxyethoxyethyl, acyl is CHO—, CH₃CO—, CH₃COCH₂CO—, C₆H₅OCH₂CO—, C₆H₅CH₂CO— or C₆H₅CO—, m is 1 or 2 n is 2, 3 or 6,

T is hydrogen, alkyl of 1 to 4 carbon atoms, cyclohexyl, benzyl, phenylethyl or phenyl;

R² is hydrogen or alkyl of 1 to 8 carbon atoms;

R³ has the same meanings given for R¹; and

R¹ and R² together with the nitrogen may also be pyrrolidino, piperidino, morpholino, piperazino, N-methylpiperazino or N-β-hydroxyethylpiperazino, with the proviso that one of R¹, R² or R³ is different from hydrogen.

2. A dye as claimed in claim 1 of the formula

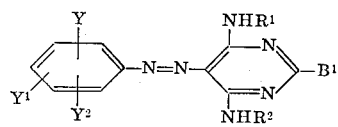

or

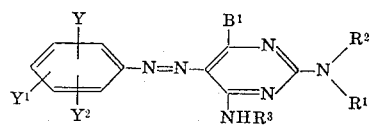

wherein:

B¹ is hydrogen, methyl, ethyl, propyl, butyl, α-ethylpentyl, benzyl, phenyl or phenyl bearing methyl, ethyl, methoxy, ethoxy, chloro or nitro as a substituent;

Y is nitro, cyano, chloro, carbomethoxy, carboethoxy, methylsulfonyl, ethylsulfonyl, methyl, methoxy, phenylazo, p-nitrophenylazo, p-hydroxyphenylazo, p-methoxyphenylazo, p-chlorophenylazo or methylphenylazo;

Y¹ is hydrogen, nitro, chloro, bromo, cyano, methyl methoxy, carbomethoxy, carboethoxy, methylsulfonyl or ethylsulfonyl;

Y² is hydrogen, chloro, bromo, cyano, methyl, methoxy, carbomethoxy or carboethoxy; and R¹, R² and R³ have the same meanings as in claim 1.

3. A dye as claimed in claim 1 wherein:

D has the same meanings as in claim 1;

B¹ is hydrogen, alkyl of 1 to 4 carbon atoms, benzyl or phenyl;

R¹ is hydrogen, alkyl of 1 to 4 carbon atoms, cyclohexyl, phenylalkyl of 1 to 3 carbon atoms in said alkyl, phenyl, methylphenyl, methoxyphenyl, hydroxy of 2 to 6 carbon atoms, alkoxyalkyl of 1 to 4 atoms in said alkoxy and 2 or 3 carbon atoms in said alkyl, benzyloxypropyl, β-phenylethoxypropyl, phenoxypropyl, —CH₂CHOHC₆H₅, —(CH₂)₂O(CH₂)₂OH, —(CH₂)₃O(CH₂)₂OH, —(CH₂)₃O(CH₂)₄OH, —(CH₂)₃OC₂H₄OCH₃, —(CH₂)₃OC₂H₄OC₄H₉ or —(CH₂)₃OC₂H₄OC₆H₅;

R² is hydrogen or alkyl of 1 to 4 carbon atoms;

R³ is the same as R¹; and

R¹ and R² together with the nitrogen may also be pyrrolidino, piperidino or morpholino;

with the proviso that one of R¹, R² and R³ is different from hydrogen.

4. The dye of the formula

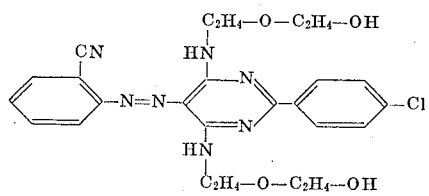

5. The dye of the formula

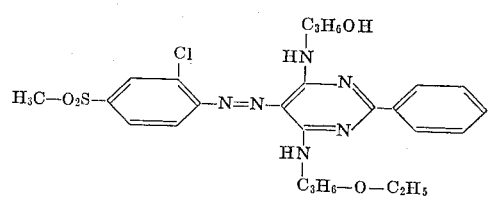

6. The dye of the formula

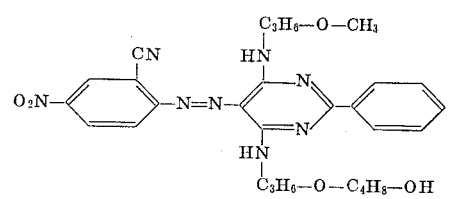

7. The dye of the formula

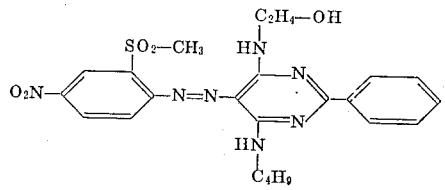

8. The dye of the formula

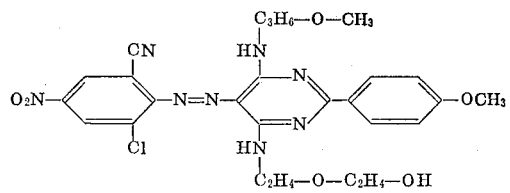

9. The dye of the formula
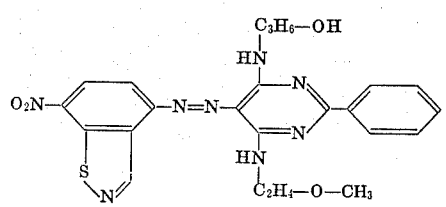
10. The dye of the formula
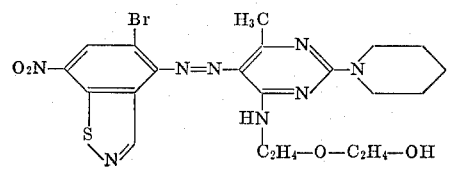
* * * * *

UNITED STATES PATENT OFFICE
CERTIFICATE OF CORRECTION

PATENT NO. : 3,856,772

DATED : December 24, 1974

INVENTOR(S) : Guenter Dunkelmann, et al

It is certified that error appears in the above-identified patent and that said Letters Patent are hereby corrected as shown below:

In the Heading, insert -- [30] Foreign Application Priority Data    January 21, 1972  Germany  P 22 02 820.2

November 30, 1972  Germany  P 22 58 609.0    December 16, 1972

Germany  P 22 61 755.6 --

In Column 9, Line 25, delete " -($\beta$-hydroxybutoxy)" and substitute -- -($\alpha$-hydroxybutoxy) --

In Column 14, Line 62, delete "6" and substitute -- 6- --

In Column 27, under the heading $X^1$ of Example 129, delete "$NH-C_3H_6-O-OH_3$" and substitute -- $NH-C_3H_6-O-CH_3$ --

In Column 75, Line 5 of Example 540, delete "envolves" and substitute --evolves--

In Column 92, Line 28, delete "-4-hydroxyethylamino" and substitute -- -4-$\beta$-hydroxyethylamino--

In Column 164, Lines 3 and 4, delete "hydroxy" and substitute --hydroxyalkyl--

UNITED STATES PATENT OFFICE
CERTIFICATE OF CORRECTION

PATENT NO. : 3,856,772                                        Page 2 of 2
DATED      : December 24, 1974
INVENTOR(S) : Guenter Dunkelmann, et al It is certified that error appears in the above-identified patent and that said Letters Patent are hereby corrected as shown below:

In Column 164, Line 5, after the number 4, insert --carbon--

Signed and Sealed this first Day of June 1976

[SEAL]

Attest:

RUTH C. MASON
Attesting Officer

C. MARSHALL DANN
Commissioner of Patents and Trademarks